United States Patent
Chandrashekhar et al.

(10) Patent No.: US 11,029,982 B2
(45) Date of Patent: *Jun. 8, 2021

(54) CONFIGURATION OF LOGICAL ROUTER

(71) Applicant: Nicira, Inc., Palo Alto, CA (US)

(72) Inventors: Ganesan Chandrashekhar, Campbell, CA (US); Rahul Korivi Subramaniyam, Sunnyvale, CA (US); Ram Dular Singh, San Jose, CA (US); Vivek Agarwal, Campbell, CA (US); Howard Wang, Cupertino, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/680,432

(22) Filed: Nov. 11, 2019

(65) Prior Publication Data

US 2020/0081728 A1    Mar. 12, 2020

Related U.S. Application Data

(63) Continuation of application No. 15/984,486, filed on May 21, 2018, now Pat. No. 10,528,373, which is a
(Continued)

(51) Int. Cl.
*H04L 12/28* (2006.01)
*G06F 9/455* (2018.01)
(Continued)

(52) U.S. Cl.
CPC .......... *G06F 9/455* (2013.01); *G06F 9/45558* (2013.01); *H04L 45/44* (2013.01);
(Continued)

(58) Field of Classification Search
None
See application file for complete search history.

(56) References Cited

U.S. PATENT DOCUMENTS

| 5,504,921 A | 4/1996 | Dev et al. |
| 5,550,816 A | 8/1996 | Hardwick et al. |

(Continued)

FOREIGN PATENT DOCUMENTS

| CN | 1929397 A | 3/2007 |
| CN | 101232339 A | 7/2008 |

(Continued)

OTHER PUBLICATIONS

Aggarwal, R., et al., "Data Center Mobility based on E-VPN, BGP/MPLS IP VPN, IP Routing and NHRP," draft-raggarwa-data-center-mobility-05.txt, Jun. 10, 2013, 24 pages, Internet Engineering Task Force, IETF, Geneva, Switzerland.
(Continued)

*Primary Examiner* — Kwang B Yao
*Assistant Examiner* — Juvena W Loo
(74) *Attorney, Agent, or Firm* — Adeli LLP

(57) ABSTRACT

Some embodiments provide a method of operating several logical networks over a network virtualization infrastructure. The method defines a managed physical switching element (MPSE) that includes several ports for forwarding packets to and from a plurality of virtual machines. Each port is associated with a unique media access control (MAC) address. The method defines several managed physical routing elements (MPREs) for the several different logical networks. Each MPRE is for receiving data packets from a same port of the MPSE. Each MPRE is defined for a different logical network and for routing data packets between different segments of the logical network. The method provides the defined MPSE and the defined plurality of MPREs to a plurality of host machines as configuration data.

20 Claims, 41 Drawing Sheets

Related U.S. Application Data continuation of application No. 14/137,877, filed on Dec. 20, 2013, now Pat. No. 9,977,685.

(60) Provisional application No. 61/962,298, filed on Oct. 31, 2013, provisional application No. 61/890,309, filed on Oct. 13, 2013.

(51) Int. Cl.
*H04L 12/749* (2013.01)
*H04L 29/12* (2006.01)
*H04L 12/721* (2013.01)

(52) U.S. Cl.
CPC .......... *H04L 45/741* (2013.01); *H04L 61/103* (2013.01); *G06F 2009/45595* (2013.01)

(56) References Cited

U.S. PATENT DOCUMENTS

| | | | |
|---|---|---|---|
| 5,751,967 A | 5/1998 | Raab et al. | |
| 6,006,275 A | 12/1999 | Picazo et al. | |
| 6,104,699 A | 8/2000 | Holender et al. | |
| 6,219,699 B1 | 4/2001 | McCloghrie et al. | |
| 6,359,909 B1 | 3/2002 | Ito et al. | |
| 6,456,624 B1 | 9/2002 | Eccles et al. | |
| 6,493,767 B1 | 12/2002 | Ishida et al. | |
| 6,512,745 B1 | 1/2003 | Abe et al. | |
| 6,539,432 B1 | 3/2003 | Taguchi et al. | |
| 6,631,137 B1 | 10/2003 | Lorrain et al. | |
| 6,640,251 B1 | 10/2003 | Wiget et al. | |
| 6,680,934 B1 | 1/2004 | Cain | |
| 6,785,843 B1 | 8/2004 | McRae et al. | |
| 6,941,487 B1 | 9/2005 | Balakrishnan et al. | |
| 6,950,428 B1 | 9/2005 | Horst et al. | |
| 6,963,585 B1 | 11/2005 | Pennec et al. | |
| 6,999,454 B1 | 2/2006 | Crump | |
| 7,046,630 B2 | 5/2006 | Abe et al. | |
| 7,197,572 B2 | 3/2007 | Matters et al. | |
| 7,200,144 B2 | 4/2007 | Terrell et al. | |
| 7,209,439 B2 | 4/2007 | Rawlins et al. | |
| 7,215,637 B1 | 5/2007 | Ferguson et al. | |
| 7,260,648 B1 | 8/2007 | Tingley et al. | |
| 7,283,473 B2 | 10/2007 | Arndt et al. | |
| 7,339,929 B2 | 3/2008 | Zelig et al. | |
| 7,342,916 B2 | 3/2008 | Das et al. | |
| 7,391,771 B2 | 6/2008 | Orava et al. | |
| 7,450,598 B2 | 11/2008 | Chen et al. | |
| 7,463,579 B2 | 12/2008 | Lapuh et al. | |
| 7,478,173 B1 | 1/2009 | Delco | |
| 7,555,002 B2 | 6/2009 | Arndt et al. | |
| 7,606,260 B2 | 10/2009 | Oguchi et al. | |
| 7,643,488 B2 | 1/2010 | Khanna et al. | |
| 7,649,851 B2 | 1/2010 | Takashige et al. | |
| 7,710,874 B2 | 5/2010 | Balakrishnan et al. | |
| 7,760,735 B1 | 7/2010 | Chen et al. | |
| 7,764,599 B2 | 7/2010 | Doi et al. | |
| 7,792,987 B1 | 9/2010 | Vohra et al. | |
| 7,802,000 B1 | 9/2010 | Huang et al. | |
| 7,818,452 B2 | 10/2010 | Matthews et al. | |
| 7,826,482 B1 | 11/2010 | Minei et al. | |
| 7,839,847 B2 | 11/2010 | Nadeau et al. | |
| 7,885,276 B1 | 2/2011 | Lin | |
| 7,936,770 B1 | 5/2011 | Frattura et al. | |
| 7,937,438 B1 | 5/2011 | Miller et al. | |
| 7,948,986 B1 | 5/2011 | Ghosh et al. | |
| 7,953,865 B1 | 5/2011 | Miller et al. | |
| 7,991,859 B1 | 8/2011 | Miller et al. | |
| 7,995,483 B1 | 8/2011 | Bayar et al. | |
| 8,027,354 B1 | 9/2011 | Portolani et al. | |
| 8,031,633 B2 | 10/2011 | Bueno et al. | |
| 8,046,456 B1 | 10/2011 | Miller et al. | |
| 8,054,832 B1 | 11/2011 | Shukla et al. | |
| 8,055,789 B2 | 11/2011 | Richardson et al. | |
| 8,060,875 B1 | 11/2011 | Lambeth | |
| 8,131,852 B1 | 3/2012 | Miller et al. | |
| 8,149,737 B2 | 4/2012 | Metke et al. | |
| 8,155,028 B2 | 4/2012 | Abu-Hamdeh et al. | |
| 8,166,201 B2 | 4/2012 | Richardson et al. | |
| 8,190,767 B1 | 5/2012 | Maufer et al. | |
| 8,194,674 B1 | 6/2012 | Pagel et al. | |
| 8,199,750 B1 | 6/2012 | Schultz et al. | |
| 8,223,668 B2 | 7/2012 | Allan et al. | |
| 8,224,931 B1 | 7/2012 | Brandwine et al. | |
| 8,224,971 B1 | 7/2012 | Miller et al. | |
| 8,239,572 B1 | 8/2012 | Brandwine et al. | |
| 8,265,075 B2 | 9/2012 | Pandey | |
| 8,281,067 B2 | 10/2012 | Stolowitz | |
| 8,312,129 B1 | 11/2012 | Miller et al. | |
| 8,320,388 B2 | 11/2012 | Louati et al. | |
| 8,339,959 B1 | 12/2012 | Moisand et al. | |
| 8,339,994 B2 | 12/2012 | Gnanasekaran et al. | |
| 8,351,418 B2 | 1/2013 | Zhao et al. | |
| 8,370,834 B2 | 2/2013 | Edwards et al. | |
| 8,401,024 B2 | 3/2013 | Christensen et al. | |
| 8,456,984 B2 | 6/2013 | Ranganathan et al. | |
| 8,504,718 B2 | 8/2013 | Wang et al. | |
| 8,565,108 B1 | 10/2013 | Marshall et al. | |
| 8,611,351 B2 | 12/2013 | Gooch et al. | |
| 8,611,352 B2 | 12/2013 | Mizrahi et al. | |
| 8,612,627 B1 | 12/2013 | Brandwine | |
| 8,625,594 B2 | 1/2014 | Safrai et al. | |
| 8,625,603 B1 | 1/2014 | Ramakrishnan et al. | |
| 8,625,616 B2 | 1/2014 | Vobbilisetty et al. | |
| 8,627,313 B2 | 1/2014 | Edwards et al. | |
| 8,644,188 B1 | 2/2014 | Brandwine et al. | |
| 8,660,129 B1 | 2/2014 | Brendel et al. | |
| 8,837,281 B2 | 9/2014 | Sultan et al. | |
| 8,848,508 B2 | 9/2014 | Moreno et al. | |
| 8,856,518 B2 | 10/2014 | Sridharan et al. | |
| 8,923,155 B2 | 12/2014 | Qu et al. | |
| 8,958,298 B2 | 2/2015 | Zhang et al. | |
| 8,989,183 B2 | 3/2015 | Bansal et al. | |
| 9,008,097 B2 | 4/2015 | Bloch et al. | |
| 9,059,999 B2 | 6/2015 | Koponen et al. | |
| 9,137,052 B2 | 9/2015 | Koponen et al. | |
| 9,225,636 B2 | 12/2015 | Krishnan et al. | |
| 9,246,821 B1 | 1/2016 | Li et al. | |
| 9,306,837 B1 | 4/2016 | Jain et al. | |
| 9,407,450 B2 | 8/2016 | Singh | |
| 9,413,644 B2 | 8/2016 | Agarwal et al. | |
| 9,448,821 B2 | 9/2016 | Wang | |
| 9,575,782 B2 | 2/2017 | Chandrashekhar et al. | |
| 9,768,980 B2 | 9/2017 | Subramaniyam et al. | |
| 9,785,455 B2 | 10/2017 | Chandrashekhar et al. | |
| 9,893,988 B2 | 2/2018 | Agarwal et al. | |
| 9,910,686 B2 | 3/2018 | Chandrashekhar et al. | |
| 9,977,685 B2 | 5/2018 | Chandrashekhar et al. | |
| 10,020,960 B2 | 7/2018 | Wang et al. | |
| 10,225,184 B2 | 3/2019 | Agarwal et al. | |
| 10,250,443 B2 | 4/2019 | Chandrashekhar et al. | |
| 10,348,625 B2 | 7/2019 | Agarwal et al. | |
| 10,361,952 B2 | 7/2019 | Agarwal et al. | |
| 10,374,827 B2 | 8/2019 | Wang et al. | |
| 10,511,458 B2 | 12/2019 | Subramaniyam et al. | |
| 10,511,459 B2 | 12/2019 | Sharma et al. | |
| 10,528,373 B2 | 1/2020 | Chandrashekhar et al. | |
| 10,587,514 B1* | 3/2020 | Singh | H04L 45/745 |
| 10,693,783 B2 | 6/2020 | Agarwal et al. | |
| 2001/0043614 A1 | 11/2001 | Viswanadham et al. | |
| 2002/0013858 A1 | 1/2002 | Anderson | |
| 2002/0093952 A1 | 7/2002 | Gonda | |
| 2002/0194369 A1 | 12/2002 | Rawlins et al. | |
| 2003/0026258 A1 | 2/2003 | Takatani et al. | |
| 2003/0026271 A1 | 2/2003 | Erb et al. | |
| 2003/0041170 A1 | 2/2003 | Suzuki | |
| 2003/0058850 A1 | 3/2003 | Rangarajan et al. | |
| 2003/0069972 A1 | 4/2003 | Yoshimura et al. | |
| 2003/0093481 A1 | 5/2003 | Mitchell et al. | |
| 2004/0054799 A1 | 3/2004 | Meier et al. | |
| 2004/0073659 A1 | 4/2004 | Rajsic et al. | |
| 2004/0098505 A1 | 5/2004 | Clemmensen | |
| 2004/0267866 A1 | 12/2004 | Carollo et al. | |
| 2005/0018669 A1 | 1/2005 | Arndt et al. | |
| 2005/0025179 A1 | 2/2005 | McLaggan et al. | |

(56) References Cited

U.S. PATENT DOCUMENTS

| | | |
|---|---|---|
| 2005/0027881 A1 | 2/2005 | Figueira et al. |
| 2005/0053079 A1 | 3/2005 | Havala |
| 2005/0083953 A1 | 4/2005 | May |
| 2005/0120160 A1 | 6/2005 | Plouffe et al. |
| 2005/0132044 A1 | 6/2005 | Guingo et al. |
| 2005/0182853 A1 | 8/2005 | Lewites et al. |
| 2006/0002370 A1 | 1/2006 | Rabie et al. |
| 2006/0026225 A1 | 2/2006 | Canali et al. |
| 2006/0029056 A1 | 2/2006 | Perera et al. |
| 2006/0056412 A1 | 3/2006 | Page |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0291388 A1 | 12/2006 | Amdahl et al. |
| 2007/0008981 A1 | 1/2007 | Pathan |
| 2007/0043860 A1 | 2/2007 | Pabari |
| 2007/0061492 A1 | 3/2007 | Riel |
| 2007/0064673 A1 | 3/2007 | Bhandaru et al. |
| 2007/0097948 A1 | 5/2007 | Boyd et al. |
| 2007/0140128 A1 | 6/2007 | Klinker et al. |
| 2007/0156919 A1 | 7/2007 | Potti et al. |
| 2007/0201357 A1 | 8/2007 | Smethurst et al. |
| 2007/0201490 A1 | 8/2007 | Mahamuni |
| 2007/0286209 A1 | 12/2007 | Wang et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0008148 A1 | 1/2008 | Sagawa |
| 2008/0013474 A1 | 1/2008 | Nagarajan et al. |
| 2008/0049621 A1 | 2/2008 | McGuire et al. |
| 2008/0049646 A1 | 2/2008 | Lu |
| 2008/0059556 A1 | 3/2008 | Greenspan et al. |
| 2008/0069107 A1 | 3/2008 | Sofia et al. |
| 2008/0071900 A1 | 3/2008 | Hecker et al. |
| 2008/0072305 A1 | 3/2008 | Casado et al. |
| 2008/0086726 A1 | 4/2008 | Griffith et al. |
| 2008/0151893 A1 | 6/2008 | Nordmark et al. |
| 2008/0159301 A1 | 7/2008 | Heer |
| 2008/0181243 A1 | 7/2008 | Vobbilisetty et al. |
| 2008/0189769 A1 | 8/2008 | Casado et al. |
| 2008/0225853 A1 | 9/2008 | Melman et al. |
| 2008/0240122 A1 | 10/2008 | Richardson et al. |
| 2008/0253366 A1 | 10/2008 | Zuk et al. |
| 2008/0291910 A1 | 11/2008 | Tadimeti et al. |
| 2008/0298274 A1 | 12/2008 | Takashige et al. |
| 2009/0031041 A1 | 1/2009 | Clemmensen |
| 2009/0043823 A1 | 2/2009 | Iftode et al. |
| 2009/0083445 A1 | 3/2009 | Ganga |
| 2009/0092137 A1 | 4/2009 | Haigh et al. |
| 2009/0122710 A1 | 5/2009 | Bar-Tor et al. |
| 2009/0129271 A1 | 5/2009 | Ramankutty et al. |
| 2009/0150521 A1 | 6/2009 | Tripathi |
| 2009/0150527 A1 | 6/2009 | Tripathi et al. |
| 2009/0161547 A1 | 6/2009 | Riddle et al. |
| 2009/0235325 A1 | 9/2009 | Dimitrakos et al. |
| 2009/0249470 A1 | 10/2009 | Litvin et al. |
| 2009/0249473 A1 | 10/2009 | Cohn |
| 2009/0279536 A1 | 11/2009 | Unbehagen et al. |
| 2009/0287848 A1 | 11/2009 | Kamura et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0020726 A1* | 1/2010 | Chu ................. H04L 45/48 370/256 |
| 2010/0046531 A1 | 2/2010 | Louati et al. |
| 2010/0107162 A1 | 4/2010 | Edwards et al. |
| 2010/0131636 A1 | 5/2010 | Suri et al. |
| 2010/0153554 A1 | 6/2010 | Anschutz et al. |
| 2010/0153701 A1 | 6/2010 | Shenoy et al. |
| 2010/0165877 A1 | 7/2010 | Shukla et al. |
| 2010/0169467 A1 | 7/2010 | Shukla et al. |
| 2010/0192225 A1 | 7/2010 | Ma et al. |
| 2010/0205479 A1 | 8/2010 | Akutsu et al. |
| 2010/0208615 A1 | 8/2010 | Soon et al. |
| 2010/0214949 A1 | 8/2010 | Smith et al. |
| 2010/0257263 A1 | 10/2010 | Casado et al. |
| 2010/0275199 A1 | 10/2010 | Smith et al. |
| 2010/0287548 A1 | 11/2010 | Zhou et al. |
| 2010/0290485 A1 | 11/2010 | Martini et al. |
| 2011/0016215 A1 | 1/2011 | Wang |
| 2011/0022695 A1 | 1/2011 | Dalal et al. |
| 2011/0032830 A1 | 2/2011 | Merwe et al. |
| 2011/0035494 A1 | 2/2011 | Pandey et al. |
| 2011/0075664 A1 | 3/2011 | Lambeth et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0103259 A1 | 5/2011 | Aybay et al. |
| 2011/0119748 A1 | 5/2011 | Edwards et al. |
| 2011/0134931 A1 | 6/2011 | Merwe et al. |
| 2011/0142053 A1 | 6/2011 | Merwe et al. |
| 2011/0194567 A1 | 8/2011 | Shen |
| 2011/0202920 A1 | 8/2011 | Takase |
| 2011/0205931 A1 | 8/2011 | Zhou et al. |
| 2011/0225207 A1 | 9/2011 | Subramanian et al. |
| 2011/0261825 A1 | 10/2011 | Ichino |
| 2011/0264610 A1 | 10/2011 | Armstrong et al. |
| 2011/0283017 A1 | 11/2011 | Alkhatib et al. |
| 2011/0292939 A1 | 12/2011 | Subramaian et al. |
| 2011/0299534 A1 | 12/2011 | Koganti et al. |
| 2011/0299537 A1 | 12/2011 | Saraiya et al. |
| 2011/0310899 A1 | 12/2011 | Alkhatib et al. |
| 2011/0317703 A1 | 12/2011 | Dunbar et al. |
| 2011/0320577 A1 | 12/2011 | Bhat et al. |
| 2012/0008528 A1 | 1/2012 | Dunbar et al. |
| 2012/0014386 A1 | 1/2012 | Xiong et al. |
| 2012/0014387 A1 | 1/2012 | Dunbar et al. |
| 2012/0017022 A1 | 1/2012 | Corrigan et al. |
| 2012/0131643 A1 | 5/2012 | Cheriton |
| 2012/0158997 A1 | 6/2012 | Hsu et al. |
| 2012/0182992 A1 | 7/2012 | Cowart et al. |
| 2012/0236734 A1 | 9/2012 | Sampath et al. |
| 2012/0307826 A1 | 12/2012 | Matsuoka |
| 2012/0323987 A1 | 12/2012 | Cantu et al. |
| 2013/0007740 A1 | 1/2013 | Kikuchi et al. |
| 2013/0010600 A1 | 1/2013 | Jocha et al. |
| 2013/0016723 A1 | 1/2013 | Arad et al. |
| 2013/0031233 A1 | 1/2013 | Feng et al. |
| 2013/0034094 A1 | 2/2013 | Cardona et al. |
| 2013/0044629 A1 | 2/2013 | Biswas et al. |
| 2013/0044636 A1 | 2/2013 | Koponen et al. |
| 2013/0044641 A1 | 2/2013 | Koponen et al. |
| 2013/0054761 A1 | 2/2013 | Kempf et al. |
| 2013/0058346 A1 | 3/2013 | Sridharan et al. |
| 2013/0073743 A1 | 3/2013 | Ramasamy et al. |
| 2013/0097345 A1 | 4/2013 | Munoz et al. |
| 2013/0103817 A1 | 4/2013 | Koponen et al. |
| 2013/0121209 A1* | 5/2013 | Padmanabhan ..... H04L 41/0803 370/255 |
| 2013/0124750 A1 | 5/2013 | Anumala et al. |
| 2013/0125112 A1 | 5/2013 | Mittal et al. |
| 2013/0136126 A1 | 5/2013 | Wang et al. |
| 2013/0142048 A1 | 6/2013 | Gross, IV et al. |
| 2013/0145002 A1 | 6/2013 | Kannan et al. |
| 2013/0145008 A1 | 6/2013 | Kannan et al. |
| 2013/0148541 A1 | 6/2013 | Zhang et al. |
| 2013/0148542 A1 | 6/2013 | Zhang et al. |
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0151685 A1 | 6/2013 | Bursell |
| 2013/0170490 A1 | 7/2013 | Kreeger et al. |
| 2013/0227550 A1 | 8/2013 | Weinstein et al. |
| 2013/0227566 A1 | 8/2013 | Higuchi et al. |
| 2013/0266015 A1 | 10/2013 | Qu et al. |
| 2013/0266019 A1 | 10/2013 | Qu et al. |
| 2013/0268588 A1 | 10/2013 | Chang et al. |
| 2013/0297768 A1 | 11/2013 | Singh |
| 2013/0301553 A1 | 11/2013 | Klein |
| 2013/0318219 A1 | 11/2013 | Kancherla |
| 2013/0322453 A1 | 12/2013 | Allan |

(56) References Cited

U.S. PATENT DOCUMENTS

| | | |
|---|---|---|
| 2013/0329548 A1 | 12/2013 | Nakil et al. |
| 2013/0332602 A1 | 12/2013 | Nakil et al. |
| 2013/0332619 A1 | 12/2013 | Xie et al. |
| 2013/0332983 A1 | 12/2013 | Koorevaar et al. |
| 2013/0339544 A1 | 12/2013 | Mithyantha |
| 2014/0006585 A1 | 1/2014 | Dunbar et al. |
| 2014/0019639 A1 | 1/2014 | Ueno |
| 2014/0025779 A1 | 1/2014 | Matsumoto |
| 2014/0036730 A1 | 2/2014 | Nellikar et al. |
| 2014/0036924 A1 | 2/2014 | Christenson |
| 2014/0050091 A1 | 2/2014 | Biswas et al. |
| 2014/0056298 A1 | 2/2014 | Vobbilisetty et al. |
| 2014/0064276 A1 | 3/2014 | Basso et al. |
| 2014/0068602 A1 | 3/2014 | Gember et al. |
| 2014/0092901 A1 | 4/2014 | Kapadia et al. |
| 2014/0092907 A1 | 4/2014 | Sridhar et al. |
| 2014/0112343 A1 | 4/2014 | Lambeth et al. |
| 2014/0115578 A1 | 4/2014 | Cooper et al. |
| 2014/0115584 A1 | 4/2014 | Mudigonda et al. |
| 2014/0123211 A1 | 5/2014 | Wanser et al. |
| 2014/0140244 A1 | 5/2014 | Kapadia et al. |
| 2014/0146817 A1 | 5/2014 | Zhang |
| 2014/0169169 A1* | 6/2014 | Almog ............... H04L 47/2441 370/235 |
| 2014/0169215 A1 | 6/2014 | Rajendran et al. |
| 2014/0169222 A1 | 6/2014 | Cohen et al. |
| 2014/0195666 A1 | 7/2014 | Dumitriu et al. |
| 2014/0201733 A1 | 7/2014 | Benny et al. |
| 2014/0207930 A1 | 7/2014 | Benny |
| 2014/0233567 A1 | 8/2014 | Guo et al. |
| 2014/0241247 A1* | 8/2014 | Kempf ............... H04L 12/4641 370/328 |
| 2014/0269705 A1 | 9/2014 | DeCusatis et al. |
| 2014/0269709 A1 | 9/2014 | Benny et al. |
| 2014/0280738 A1 | 9/2014 | Kölker et al. |
| 2014/0282889 A1 | 9/2014 | Ishaya et al. |
| 2014/0294005 A1 | 10/2014 | Jain et al. |
| 2014/0328343 A1 | 11/2014 | Kapadia et al. |
| 2014/0334485 A1 | 11/2014 | Jain et al. |
| 2014/0337497 A1 | 11/2014 | Wanser et al. |
| 2014/0337500 A1 | 11/2014 | Lee |
| 2014/0348166 A1 | 11/2014 | Yang et al. |
| 2015/0010001 A1 | 1/2015 | Duda et al. |
| 2015/0043576 A1 | 2/2015 | Dixon et al. |
| 2015/0043581 A1 | 2/2015 | Devireddy et al. |
| 2015/0058470 A1 | 2/2015 | Duda |
| 2015/0058968 A1 | 2/2015 | Wang et al. |
| 2015/0063353 A1 | 3/2015 | Kapadia et al. |
| 2015/0082418 A1 | 3/2015 | Gu |
| 2015/0100681 A1 | 4/2015 | Reese et al. |
| 2015/0103661 A1 | 4/2015 | Shen et al. |
| 2015/0103679 A1 | 4/2015 | Tessmer et al. |
| 2015/0103839 A1 | 4/2015 | Chandrashekhar et al. |
| 2015/0103842 A1 | 4/2015 | Chandrashekhar et al. |
| 2015/0103843 A1 | 4/2015 | Chandrashekhar et al. |
| 2015/0106804 A1 | 4/2015 | Chandrashekhar et al. |
| 2015/0109923 A1 | 4/2015 | Hwang |
| 2015/0117454 A1 | 4/2015 | Koponen et al. |
| 2015/0124612 A1 | 5/2015 | Schlansker et al. |
| 2015/0124817 A1 | 5/2015 | Merchant et al. |
| 2015/0124826 A1 | 5/2015 | Edsall et al. |
| 2015/0200954 A1 | 7/2015 | Gourlay et al. |
| 2015/0281042 A1 | 10/2015 | Agarwal et al. |
| 2015/0281048 A1 | 10/2015 | Agarwal et al. |
| 2015/0319009 A1 | 11/2015 | Zhao |
| 2015/0334011 A1 | 11/2015 | Zheng et al. |
| 2015/0372943 A1 | 12/2015 | Hasan et al. |
| 2016/0021032 A1 | 1/2016 | Maier et al. |
| 2016/0057014 A1 | 2/2016 | Thakkar et al. |
| 2016/0094364 A1 | 3/2016 | Subramaniyam et al. |
| 2016/0094365 A1 | 3/2016 | Subramaniyam et al. |
| 2016/0094366 A1 | 3/2016 | Wang et al. |
| 2016/0094396 A1 | 3/2016 | Chandrashekhar et al. |
| 2016/0218925 A1 | 7/2016 | Mammen et al. |
| 2016/0226822 A1 | 8/2016 | Zhang et al. |
| 2017/0005918 A1 | 1/2017 | Agarwal et al. |
| 2017/0005924 A1 | 1/2017 | Agarwal et al. |
| 2017/0005942 A1 | 1/2017 | Agarwal et al. |
| 2017/0141962 A1 | 5/2017 | Britt et al. |
| 2018/0167316 A1 | 6/2018 | Agarwal et al. |
| 2018/0276013 A1 | 9/2018 | Chandrashekhar et al. |
| 2019/0149357 A1 | 5/2019 | Wang et al. |
| 2019/0149358 A1 | 5/2019 | Sharma et al. |
| 2019/0207817 A1 | 7/2019 | Chandrashekhar et al. |
| 2019/0280972 A1 | 9/2019 | Agarwal et al. |
| 2020/0067730 A1 | 2/2020 | Subramaniyam et al. |
| 2020/0067732 A1 | 2/2020 | Sharma et al. |
| 2020/0296038 A1 | 9/2020 | Agarwal et al. |

FOREIGN PATENT DOCUMENTS

| | | |
|---|---|---|
| CN | 101808030 A | 8/2010 |
| CN | 102549983 A | 7/2012 |
| CN | 102571998 A | 7/2012 |
| CN | 102801715 A | 11/2012 |
| CN | 103379010 A | 10/2013 |
| CN | 103491006 A | 1/2014 |
| CN | 103890751 A | 6/2014 |
| CN | 103905283 A | 7/2014 |
| CN | 103957160 A | 7/2014 |
| CN | 104025508 A | 9/2014 |
| EP | 1653688 A1 | 5/2006 |
| EP | 2566129 A1 | 3/2013 |
| EP | 2648370 A1 | 10/2013 |
| EP | 3031178 A2 | 6/2016 |
| EP | 3627780 A1 | 3/2020 |
| JP | 2003069609 A | 3/2003 |
| JP | 2003124976 A | 4/2003 |
| JP | 2003318949 A | 11/2003 |
| JP | 2011171874 A | 9/2011 |
| JP | 2012231382 A | 11/2012 |
| JP | 2013175075 A | 9/2013 |
| JP | 2014230217 A | 12/2014 |
| KR | 20070050864 A | 5/2007 |
| WO | 2005094008 A1 | 10/2005 |
| WO | 2005112390 A1 | 11/2005 |
| WO | 2008095010 A1 | 8/2008 |
| WO | 2012051884 A1 | 4/2012 |
| WO | 2012093429 A1 | 7/2012 |
| WO | 2013020126 A1 | 2/2013 |
| WO | 2013026049 A1 | 2/2013 |
| WO | 2013063330 A1 | 5/2013 |
| WO | 2013074827 A1 | 5/2013 |
| WO | 2013184846 A1 | 12/2013 |
| WO | 2013185715 A1 | 12/2013 |
| WO | 2015054671 A2 | 4/2015 |
| WO | 2015147942 A1 | 10/2015 |
| WO | 2016053372 A1 | 4/2016 |
| WO | 2016053640 A1 | 4/2016 |
| WO | 2017003957 A1 | 1/2017 |

OTHER PUBLICATIONS

Anwer, Muhammad Bilal, et al., "Building a Fast, Virtualized Data Plane with Programmable Hardware," Aug. 17, 2009, 8 pages, VISA'09, ACM, Barcelona, Spain.

Author Unknown, "IEEE Standard for Local and metropolitan area networks—Virtual Bridged Local Area Networks, Amendment 5: Connectivity Fault Management," IEEE Std 802.1ag-2007, Dec. 17, 2007, 260 pages, IEEE, New York, NY, USA.

Dobrescu, Mihai, et al., "RouteBricks: Exploiting Parallelism to Scale Software Routers," SOSP'09, Proceedings of the ACM SIGOPS 22nd Symposium on Operating Systems Principles, Oct. 2009, 17 pages, ACM, New York, NY.

Dumitriu, Dan Mihai, et al., (U.S. Appl. No. 61/514,990), filed Aug. 4, 2011, 31 pages.

Kamath, Daya, et. al., "Edge Virtual Bridge Proposal," Version 0. Rev. 0.1, Apr. 23, 2010, 72 pages, IEEE.

Kohler, Eddie, et al., "The Click Modular Router," ACM Trans. On Computer Systems, Aug. 2000, 34 pages, vol. 18, No. 3.

(56) References Cited

OTHER PUBLICATIONS

Koponen, Teemu, et al., "Network Virtualization in Multi-tenant Datacenters," Technical Report TR-2013-001E, Aug. 2013, 22 pages, VMware, Inc., Palo Alto, CA, USA.
Narten, Thomas, et al., "Address Resolution Problems in Large Data Center Networks," Jan. 2013, 17 pages, Internet Engineering Task Force (IETF).
Non-Published Commonly Owned U.S. Appl. No. 16/671,225, filed Nov. 1, 2019, 84 pages, Nicira, Inc.
Non-Published Commonly Owned U.S. Appl. No. 16/673,658, filed Nov. 4, 2019, 40 pages, Nicira, Inc.
Nygren, Anders, et al., "OpenFlow Switch Specification v.1.3.4 (Protocol version 0x04)," Mar. 27, 2014, 171 pages, Open Networking Foundation, Palo Alto, USA.
Shah, Himanshu, et al., "ARP Broadcast Reduction for Large Data Centers," draft-shah-armd-arp-reduction-02.txt, Oct. 28, 2011, 11 pages, IETF Trust.
Shenker, Scott, et al., "The Future of Networking, and the Past of Protocols," Dec. 2, 2011, 30 pages, USA.
Watsen, Kent, "Conditional Enablement of Configuration Nodes," Feb. 18, 2013, 8 pages, Internet Engineering Task Force Trust, Reston, USA.
Credle, Rufus, et al., "Implementing a VM-Aware Network Using VMread," First Edition—IBM Redbooks, Aug. 2012, 256 pages, International Business Machines Corporation, Armonk, NY.
International Search Report and Written Opinion of Commonly Owned International Patent Application PCT/US2014/060183, dated Apr. 30, 2015, 15 pages, ISA (EPO).

\* cited by examiner

CONFIGURATION OF LOGICAL ROUTER

CLAIM OF BENEFIT TO PRIOR APPLICATIONS

This present Application is a continuation application of U.S. patent application Ser. No. 15/984,486, filed May 21, 2018, now published as U.S. Patent Publication 2018/0276013. U.S. patent application Ser. No. 15/984,486 is a continuation application of U.S. patent application Ser. No. 14/137,877, filed Dec. 20, 2013, now issued as U.S. Pat. No. 9,977,685. U.S. patent application Ser. No. 14/137,877 claims the benefit of U.S. Provisional Application 61/890,309, filed Oct. 13, 2013, and U.S. Provisional Patent Application 61/962,298, filed Oct. 31, 2013. U.S. Application 61/890,309, U.S. patent application Ser. No. 14/137,877, now issued as U.S. Pat. No. 9,977,685, and U.S. patent application Ser. No. 15/984,486, now published as U.S. Patent Publication 2018/0276013 are incorporated herein by reference.

BACKGROUND

In a network virtualization environment, one of the more common applications deployed on hypervisors are 3-tier apps, in which a web-tier, a database-tier, and app-tier are on different L3 subnets. This requires IP packets traversing from one virtual machine (VM) in one subnet to another VM in another subnet to first arrive at a L3 router, then forwarded to the destination VM. This is true even if the destination VM is hosted on the same host machine as the originating VM. This generates unnecessary network traffic and causes higher latency and lower throughput, which significantly degrades the performance of the application running on the hypervisors. Generally speaking, this performance degradation occurs whenever any two VMs are two different IP subnets communicate with each other.

FIG. 1 illustrates a logical network 100 implemented over a network virtualization infrastructure, in which virtual machines (VMs) on different segments or subnets communicate through a shared router 110. As illustrated, VMs 121-129 are running on host machines 131-133, which are physical machines communicatively linked by a physical network 105.

The VMs are in different segments of the network. Specifically, the VMs 121-125 are in segment A of the network, the VMs 126-129 are in segment B of the network. VMs in same segments of the network are able to communicate with each other with link layer (L2) protocols, while VMs in different segments of the network cannot communicate with each other with link layer protocols and must communicate with each other through network layer (L3) routers or gateways. VMs that operate in different host machines communicate with each other through the network traffic in the physical network 105, whether they are in the same network segment or not.

The host machines 131-133 are running hypervisors that implement software switches, which allows VMs in a same segment within a same host machine to communicate with each other locally without going through the physical network 105. However, VMs that belong to different segments must go through a L3 router such as the shared router 110, which can only be reached behind the physical network. This is true even between VMs that are operating in the same host machine. For example, the traffic between the VM 125 and the VM 126 must go through the physical network 105 and the shared router 110 even though they are both operating on the host machine 132.

What is needed is a distributed router for forwarding L3 packets at every host that VMs can be run on. The distributed router should make it possible to forward data packets locally (i.e., at the originating hypervisor) such that there is exactly one hop between source VM and destination VM.

SUMMARY

In order to facilitate L3 packet forwarding between virtual machines (VMs) of a logical network running on host machines in a virtualized network environment, some embodiments define a logical router, or logical routing element (LRE), for the logical network. In some embodiments, a LRE operates distributively across the host machines of its logical network as a virtual distributed router (VDR), where each host machine operates its own local instance of the LRE as a managed physical routing element (MPRE) for performing L3 packet forwarding for the VMs running on that host. In some embodiments, the MPRE allows L3 forwarding of packets between VMs running on the same host machine to be performed locally at the host machine without having to go through the physical network. Some embodiments define different LREs for different tenants, and a host machine may operate the different LREs as multiple MPREs. In some embodiments, different MPREs for different tenants running on a same host machine share a same port and a same L2 MAC address on a managed physical switching element (MPSE).

In some embodiments, a LRE includes one or more logical interfaces (LIFs) that each serves as an interface to a particular segment of the network. In some embodiments, each LIF is addressable by its own IP address and serves as a default gateway or ARP proxy for network nodes (e.g., VMs) of its particular segment of the network. Each network segment has its own logical interface to the LRE, and each LRE has its own set of logical interfaces. Each logical interface has its own identifier (e.g., IP address or overlay network identifier) that is unique within the network virtualization infrastructure.

In some embodiments, a logical network that employs such logical routers further enhances network virtualization by making MPREs operating in different host machines appear the same to all of the VMs. In some of these embodiments, each LRE is addressable at L2 data link layer by a virtual MAC address (VMAC) that is the same for all of the LREs in the system. Each host machine is associated with a unique physical MAC address (PMAC). Each MPRE implementing a particular LRE is uniquely addressable by the unique PMAC of its host machine by other host machines over the physical network. In some embodiments, each packet leaving a MPRE has VMAC as source address, and the host machine will change the source address to the unique PMAC before the packet enters PNIC and leaves the host for the physical network. In some embodiments, each packet entering a MPRE has VMAC as destination address, and the host would change the destination MAC address into the generic VMAC if the destination address is the unique PMAC address associated with the host. In some embodiments, a LIF of a network segment serves as the default gateway for the VMs in that network segment. A MPRE receiving an ARP query for one of its LIFs responds to the query locally without forwarding the query to other host machines.

In order to perform L3 layer routing for physical host machines that do not run virtualization software or operate an MPRE, some embodiments designate a MPRE running on a host machine to act as a dedicated routing agent (designated instance or designated MPRE) for each of these non-VDR host machines. In some embodiments, the data traffic from the virtual machines to the physical host is conducted by individual MPREs, while the data traffic from the physical host to the virtual machines must go through the designated MPRE.

In some embodiments, at least one MPRE in a host machine is configured as a bridging MPRE, and that such a bridge includes logical interfaces that are configured for bridging rather than for routing. A logical interface configured for routing (routing LIFs) perform L3 level routing between different segments of the logical network by resolving L3 layer network address into L2 MAC address. A logical interface configured for bridging (bridging LIFs) performs bridging by binding MAC address with a network segment identifier (e.g., VNI) or a logical interface.

In some embodiments, the LREs operating in host machines as described above are configured by configuration data sets that are generated by a cluster of controllers. The controllers in some embodiments in turn generate these configuration data sets based on logical networks that are created and specified by different tenants or users. In some embodiments, a network manager for a network virtualization infrastructure allows users to generate different logical networks that can be implemented over the network virtualization infrastructure, and then pushes the parameters of these logical networks to the controllers so the controllers can generate host machine specific configuration data sets, including configuration data for the LREs. In some embodiments, the network manager provides instructions to the host machines for fetching configuration data for the LREs.

Some embodiments dynamically gather and deliver routing information for the LREs. In some embodiments, an edge VM learns the network routes from other routers and sends the learned routes to the cluster of controllers, which in turn propagates the learned routes to the LREs operating in the host machines.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

In order to facilitate L3 packet forwarding between virtual machines (VMs) of a logical network running on host machines in a virtualized network environment, some embodiments define a logical router, or logical routing element (LRE), for the logical network. In some embodiments, a LRE operates distributively across the host machines of its logical network as a virtual distributed router (VDR), where each host machine operates its own local instance of the LRE as a managed physical routing element (MPRE) for performing L3 packet forwarding for the VMs running on that host. In some embodiments, the MPRE allows L3 forwarding of packets between VMs running on the same host machine to be performed locally at the host machine without having to go through the physical network. Some embodiments define different LREs for different tenants, and a host machine may operate the different LREs as multiple MPREs. In some embodiments, different MPREs for different tenants running on a same host machine share a same port and a same L2 MAC address on a managed physical switching element (MPSE).

Figure 2:
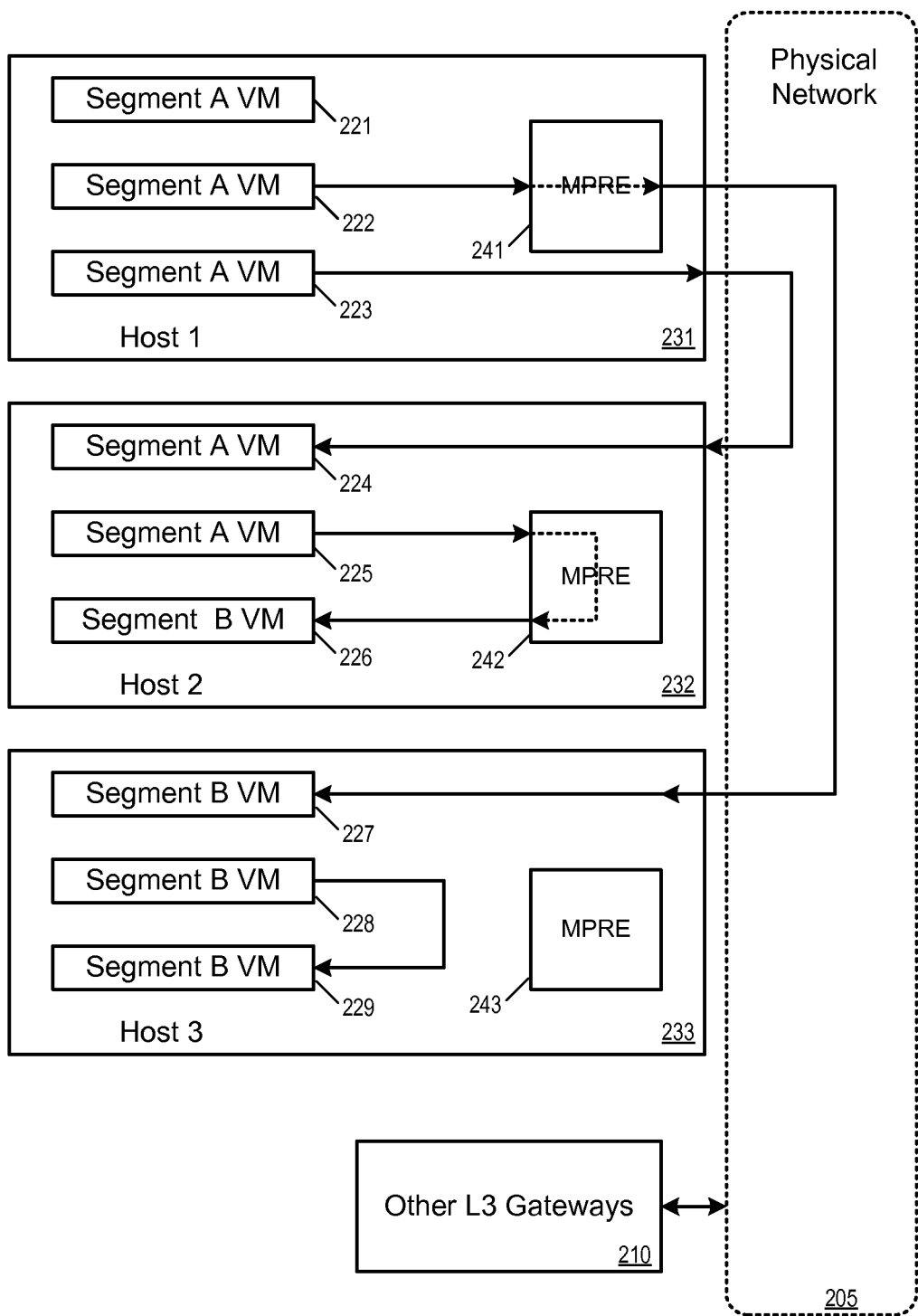
FIG. 2 illustrates packet forwarding operations performed by a LRE that operate locally in host machines as MPREs.

For some embodiments, FIG. 2 illustrates packet forwarding operations performed by a LRE that operate locally in host machines as MPREs. Each host machine performs virtualization functions in order to host one or more VMs and performs switching functions so the VMs can communicate with each other in a network virtualization infrastructure. Each MPRE performs L3 routing operations locally within its host machine such that the traffic between two VMs on a same host machine would always be conducted locally, even when the two VMs belong to different network segments.

FIG. 2 illustrates an implementation of a logical network 200 for network communication between VMs 221-229. The logical network 200 is a network that is virtualized over a collection of computing and storage resources that are interconnected by a physical network 205. This collection of interconnected computing and storage resources and physical network forms a network virtualization infrastructure. The VMs 221-229 are hosted by host machines 231-233, which are communicatively linked by the physical network 205. Each of the host machines 231-233, in some embodiments, is a computing device managed by an operating system (e.g., Linux) that is capable of creating and hosting VMs. VMs 221-229 are virtual machines that are each assigned a set of network addresses (e.g., a MAC address for L2, an IP address for L3, etc.) and can send and receive network data to and from other network elements, such as other VMs.

The VMs are managed by virtualization software (not shown) running on the host machines 231-233. Virtualization software may include one or more software components and/or layers, possibly including one or more of the software components known in the field of virtual machine technology as "virtual machine monitors", "hypervisors", or virtualization kernels. Because virtualization terminology has evolved over time and has not yet become fully standardized, these terms do not always provide clear distinctions between the software layers and components to which they refer. As used herein, the term, "virtualization software" is intended to generically refer to a software layer or component logically interposed between a virtual machine and the host platform.

In the example of FIG. 2, each VM operates in one of the two segments of the logical network 200. VMs 221-225 operate in segment A, while VMs 226-229 operate in segment B. In some embodiments, a network segment is a portion of the network within which the network elements communicate with each other by link layer L2 protocols such as an IP subnet. In some embodiments, a network segment is an encapsulation overlay network such as VXLAN or VLAN.

In some embodiments, VMs in same segments of the network are able to communicate with each other with link layer (L2) protocols (e.g., according each VM's L2 MAC address), while VMs in different segments of the network cannot communicate with each other with a link layer protocol and must communicate with each other through network layer (L3) routers or gateways. In some embodiments, L2 level traffic between VMs is handled by MPSEs (not shown) operating locally within each host machine. Thus, for example, network traffic from the VM 223 to the VM 224 would pass through a first MPSE operating in the host 231, which receives the data from one of its ports and sends the data through the physical network 205 to a second MPSE operating in the host machine 232, which would then send the data to the VM 224 through one of its ports. Likewise, the same-segment network traffic from the VM 228 to the VM 229 would go through a single MPSE operating in the host 233, which forwards the traffic locally within the host 233 from one virtual port to another.

Figure 1:
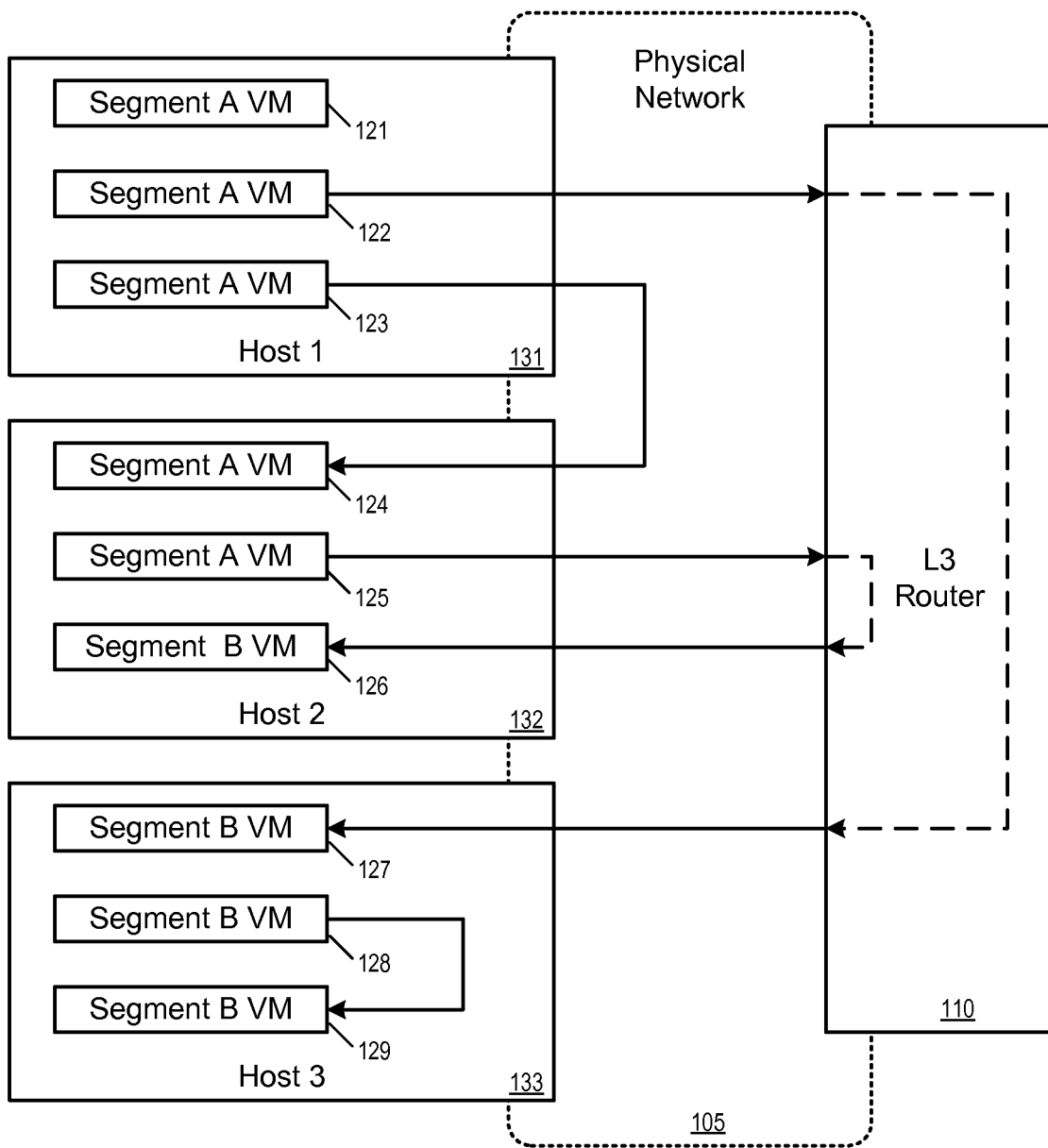
FIG. 1 illustrates a logical network implemented over a network virtualization infrastructure, in which virtual machines (VMs) on different segments or subnets communicate through a shared router.

Unlike the logical network 100 of FIG. 1, the implementation of which relies on an external L3 router (which may be implemented as a standard physical router, a VM specifically for performing routing functionality, etc.) for handling traffic between different network segments, the implementation of the logical network 200 of FIG. 2 uses MPREs 241-243 to perform L3 routing functions locally within the host machines 231-233, respectively. The MPREs in the different host machines jointly perform the function of a logical L3 router for the VMs in the logical network 200. In some embodiments, an LRE is implemented as a data structure that is replicated or instantiated across different host machines to become their MPREs. In the example of FIG. 2, the LRE is instantiated in the host machines 231-233 as MPREs 241-243.

In the example of FIG. 2, the L3 routing of the network traffic originating from the VM 222 and destined for the VM 227 is handled by the MPRE 241, which is the LRE instantiation running locally on the host machine 231 that hosts the VM 222. The MPRE 241 performs L3 layer routing operations (e.g., link layer address resolution) locally within the host 231 before sending the routed data packet to the VM 227 through the physical network 205. This is done without an external, shared L3 router. Likewise, the L3 routing of the network traffic originating from the VM 225 and destined for the VM 226 is handled by the MPRE 242, which is the LRE instantiation running locally on the host machine 232 that hosts the VM 225. The MPRE 242 performs L3 layer routing operations locally within the host 232 and sends routed data packet directly to the VM 226, which is also hosted by the host machine 232. Thus, the traffic between the two VMs 225 and 226 does not need to be sent through the physical network 205 or an external router.

Several more detailed embodiments of the invention are described below. Section I describes the architecture of VDR and hosts that implement LRE-based MPREs. Section II describes various uses of VDR for packet processing. Section III describes the control and configuration of VDR. Finally, section IV describes an electronic system with which some embodiments of the invention are implemented.

I. Architecture of VDR

Figure 3:
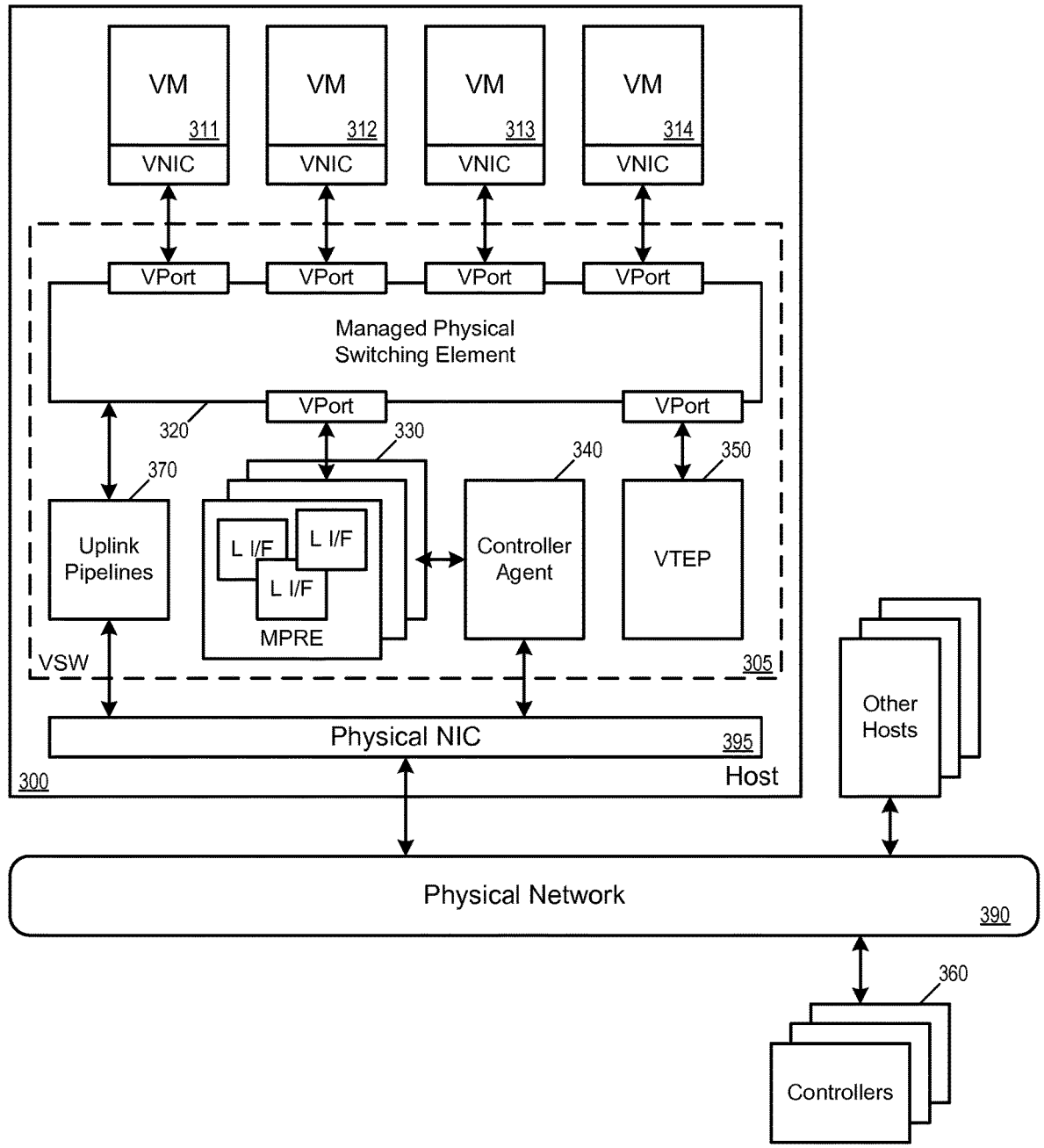
FIG. 3 illustrates a host machine running a virtualization software that operates MPREs for LREs.

In some embodiments, a LRE operates within a virtualization software (e.g., a hypervisor, virtual machine monitor, etc.) that runs on a host machine that hosts one or more VMs (e.g., within a multi-tenant data center). The virtualization software manages the operations of the VMs as well as their access to the physical resources and the network resources of the host machine, and the local instantiation of the LRE operates in the host machine as its local MPRE. For some embodiments, FIG. 3 illustrates a host machine 300 running a virtualization software 305 that includes a MPRE of an LRE. The host machine connects to, e.g., other similar host machines, through a physical network 390. This physical network 390 may include various physical switches and routers, in some embodiments.

As illustrated, the host machine 300 has access to a physical network 390 through a physical NIC (PNIC) 395. The host machine 300 also runs the virtualization software 305 and hosts VMs 311-314. The virtualization software 305 serves as the interface between the hosted VMs and the physical NIC 395 (as well as other physical resources, such as processors and memory). Each of the VMs includes a virtual NIC (VNIC) for accessing the network through the virtualization software 305. Each VNIC in a VM is responsible for exchanging packets between the VM and the virtualization software 305. In some embodiments, the VNICs are software abstractions of physical NICs implemented by virtual NIC emulators.

The virtualization software 305 manages the operations of the VMs 311-314, and includes several components for managing the access of the VMs to the physical network (by implementing the logical networks to which the VMs connect, in some embodiments). As illustrated, the virtualization software includes several components, including a MPSE 320, a MPRE 330, a controller agent 340, a VTEP 350, and a set of uplink pipelines 370.

The controller agent 340 receives control plane messages from a controller or a cluster of controllers. In some embodiments, these control plane message includes configuration data for configuring the various components of the virtualization software (such as the MPSE 320 and the MPRE 330) and/or the virtual machines. In the example illustrated in FIG. 3, the controller agent 340 receives control plane messages from the controller cluster 360 from the physical network 390 and in turn provides the received configuration data to the MPRE 330 through a control channel without going through the MPSE 320. However, in some embodiments, the controller agent 340 receives control plane messages from a direct data conduit (not illustrated) independent of the physical network 390. In some other embodiments, the controller agent receives control plane messages from the MPSE 320 and forwards configuration data to the router 330 through the MPSE 320. The controller agent and the configuration of the virtualization software will be further described in Section III below.

The VTEP (VXLAN tunnel endpoint) 350 allows the host 300 to serve as a tunnel endpoint for logical network traffic (e.g., VXLAN traffic). VXLAN is an overlay network encapsulation protocol. An overlay network created by VXLAN encapsulation is sometimes referred to as a VXLAN network, or simply VXLAN. When a VM on the host 300 sends a data packet (e.g., an ethernet frame) to another VM in the same VXLAN network but on a different host, the VTEP will encapsulate the data packet using the VXLAN network's VNI and network addresses of the VTEP, before sending the packet to the physical network. The packet is tunneled through the physical network (i.e., the encapsulation renders the underlying packet transparent to the intervening network elements) to the destination host. The VTEP at the destination host decapsulates the packet and forwards only the original inner data packet to the destination VM. In some embodiments, the VTEP module serves only as a controller interface for VXLAN encapsulation, while the encapsulation and decapsulation of VXLAN packets is accomplished at the uplink module 370.

The MPSE 320 delivers network data to and from the physical NIC 395, which interfaces the physical network 390. The MPSE also includes a number of virtual ports (vPorts) that communicatively interconnects the physical NIC with the VMs 311-314, the MPRE 330 and the controller agent 340. Each virtual port is associated with a unique L2 MAC address, in some embodiments. The MPSE performs L2 link layer packet forwarding between any two network elements that are connected to its virtual ports. The MPSE also performs L2 link layer packet forwarding between any network element connected to any one of its virtual ports and a reachable L2 network element on the physical network 390 (e.g., another VM running on another host). In some embodiments, a MPSE implements a local instantiation of a logical switching element (LSE) that operates across the different host machines and can perform L2 packet switching between VMs on a same host machine or on different host machines, or implements several such LSEs for several logical networks.

The MPRE 330 performs L3 routing (e.g., by performing L3 IP address to L2 MAC address resolution) on data packets received from a virtual port on the MPSE 320. Each routed data packet is then sent back to the MPSE 320 to be forwarded to its destination according to the resolved L2

MAC address. This destination can be another VM connected to a virtual port on the MPSE 320, or a reachable L2 network element on the physical network 390 (e.g., another VM running on another host, a physical non-virtualized machine, etc.).

As mentioned, in some embodiments, a MPRE is a local instantiation of a logical routing element (LRE) that operates across the different host machines and can perform L3 packet forwarding between VMs on a same host machine or on different host machines. In some embodiments, a host machine may have multiple MPREs connected to a single MPSE, with each MPRE in the host machine implementing a different LRE. MPREs and MPSEs are referred to as "physical" routing/switching element in order to distinguish from "logical" routing/switching elements, even though MPREs and MPSE are implemented in software in some embodiments. In some embodiments, a MPRE is referred to as a "software router" and a MPSE is referred to a "software switch". In some embodiments, LREs and LSEs are collectively referred to as logical forwarding elements (LFEs), while MPREs and MPSEs are collectively referred to as managed physical forwarding elements (MPFEs).

In some embodiments, the MPRE 330 includes one or more logical interfaces (LIFs) that each serves as an interface to a particular segment of the network. In some embodiments, each LIF is addressable by its own IP address and serve as a default gateway or ARP proxy for network nodes (e.g., VMs) of its particular segment of the network. As described in detail below, in some embodiments, all of the MPREs in the different host machines are addressable by a same "virtual" MAC address, while each MPRE is also assigned a "physical" MAC address in order indicate in which host machine does the MPRE operate.

The uplink module 370 relays data between the MPSE 320 and the physical NIC 395. The uplink module 370 includes an egress chain and an ingress chain that each performs a number of operations. Some of these operations are pre-processing and/or post-processing operations for the MPRE 330. The operations of the uplink module 370 will be further described below by reference to FIGS. 14-15.

As illustrated by FIG. 3, the virtualization software 305 has multiple MPREs from multiple different LREs. In a multi-tenancy environment, a host machine can operate virtual machines from multiple different users or tenants (i.e., connected to different logical networks). In some embodiments, each user or tenant has a corresponding MPRE instantiation in the host for handling its L3 routing. In some embodiments, though the different MPREs belong to different tenants, they all share a same vPort on the MPSE 320, and hence a same L2 MAC address. In some other embodiments, each different MPRE belonging to a different tenant has its own port to the MPSE.

The MPSE 320 and the MPRE 330 make it possible for data packets to be forwarded amongst VMs 311-314 without being sent through the external physical network 390 (so long as the VMs connect to the same logical network, as different tenants' VMs will be isolated from each other).

Figure 4:
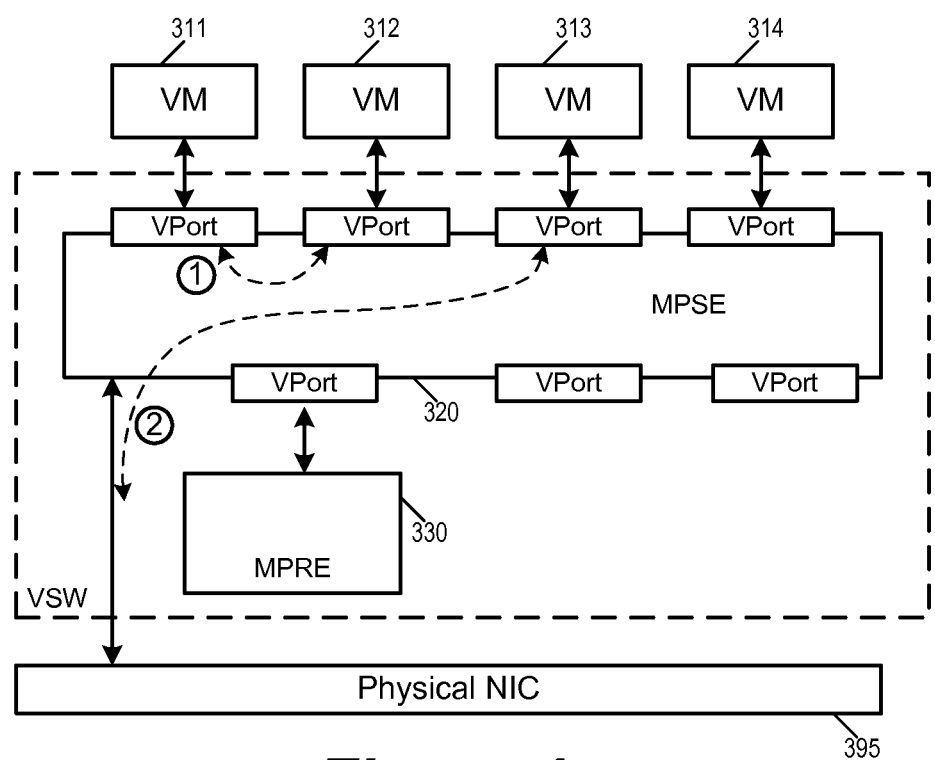
FIG. 4 illustrates L2 forwarding operations by a MPSE.

FIG. 4 illustrates L2 forwarding operations by the MPSE 320. The operation labeled '1' represents network traffic between the VM 311 to the VM 312, which takes place entirely within the host machine 300. This is contrasted with the operation labeled '2', which represents network traffic between the VM 313 and another VM on another host machine. In order to reach the other host machine, the MPSE 320 sends the packet onto the physical network 390 through the NIC 395.

Figure 5A:
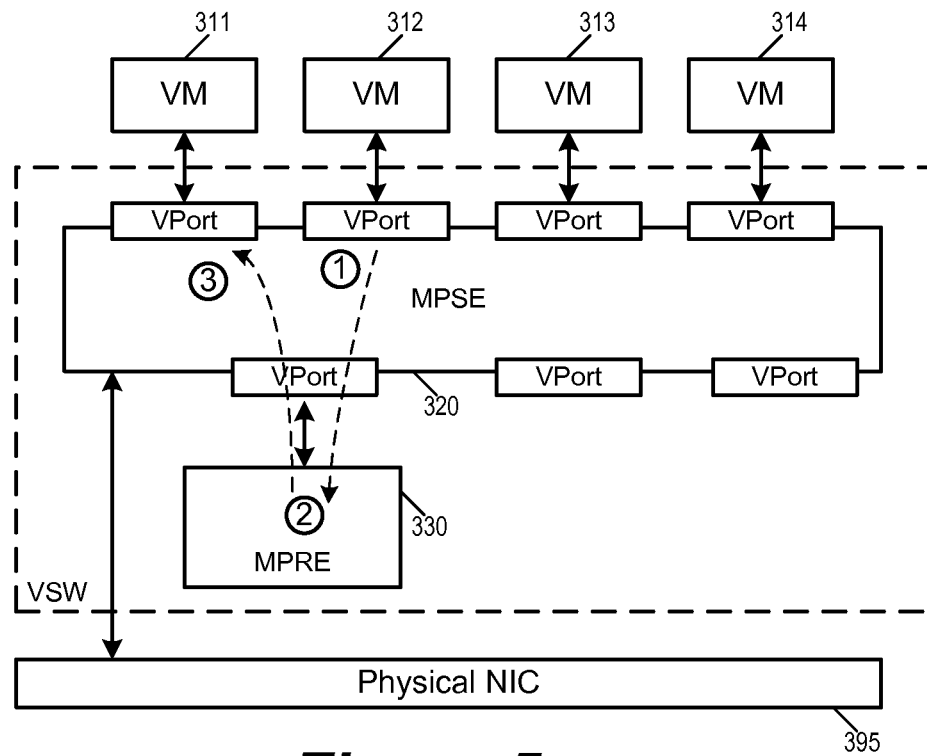
FIGS. 5a-b illustrates L3 routing operation by a MPRE in conjunction with a MPSE.
Figure 5B:
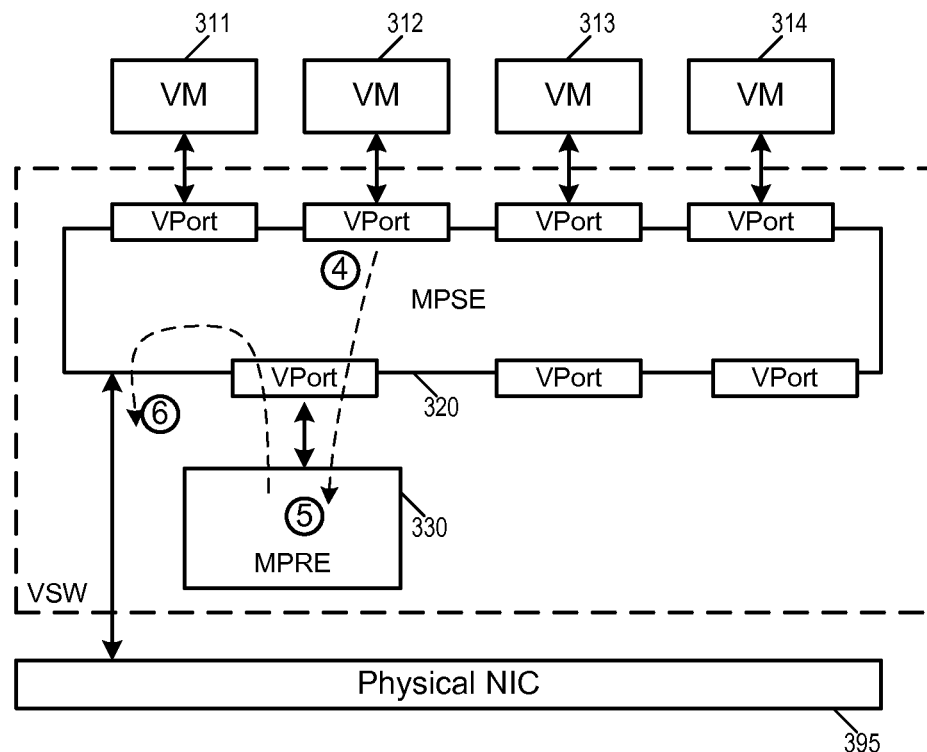

FIGS. 5*a-b* illustrates L3 routing operations by the MPRE 330 in conjunction with the MPSE 320. The MPRE 330 has an associated MAC address and can receive L2 level traffic from any of the VMs 311-314. FIG. 5*a* illustrates a first L3 routing operation for a packet whose destination is in the same host as the MPRE 330. In an operation labeled '1', the VM 312 sends a data packet to the MPRE 330 by using the MPRE's MAC address. In an operation labeled '2', the MPRE 330 performs L3 routing operation on the received data packet by resolving its destination L3 level IP address into a L2 level destination MAC address. This may require the MPRE 330 to send an Address Resolution Protocol (ARP) request, as described in detail below. The routed packet is then sent back to the MPSE 320 in an operation labeled '3'. Since the destination MAC address is for a VM within the host machine 300 (i.e., the VM 311), the MPSE 320 in the operation '3' forwards the routed packet to the destination VM directly without the packet ever reaching the physical network 390.

FIG. 5*b* illustrates a second L3 routing operation for a packet whose destination is in a remote host that can only be reached by the physical network. Operations '4' and '5' are analogous operations of '1' and '2', during which the VM 312 sends a data packet to the MPRE 330 and the MPRE 330 performs L3 routing operation(s) on the received data packet and sends the routed packet back to the MPSE 320 (again, possibly sending an ARP request to resolve a destination IP address into a MAC address. During operation '6', the MPSE 320 sends the routed packet out to physical network through the physical NIC 395 based on the L2 MAC address of the destination.

FIG. 5*a-b* illustrates L3 routing operations for VMs in a same host machine as the MPRE. In some embodiments, a MPRE can also be used to perform L3 routing operations for entities outside of the MPRE's host machine. For example, in some embodiments, a MPRE of a host machine may serve as a "designated instance" for performing L3 routing for another host machine that does not have its own MPRE. Examples of a MPRE serving as a "designated instance" will be further described in Section II.C below.

Figure 6A:
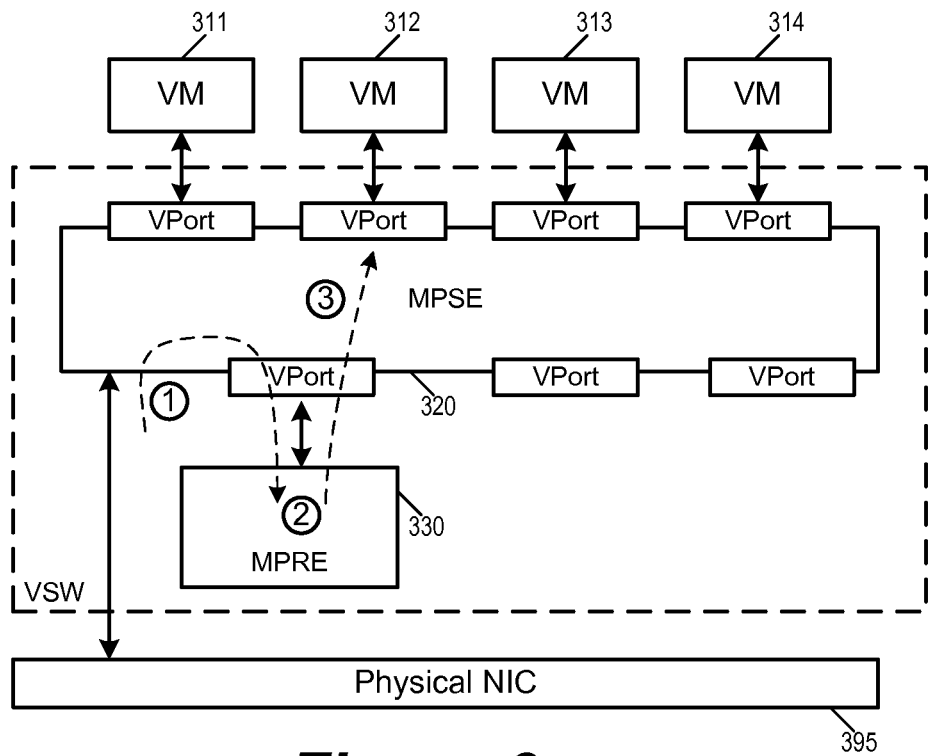
FIG. 6a-b illustrates L3 routing operations performed by a MPRE for packets from outside of a host.
Figure 6B:
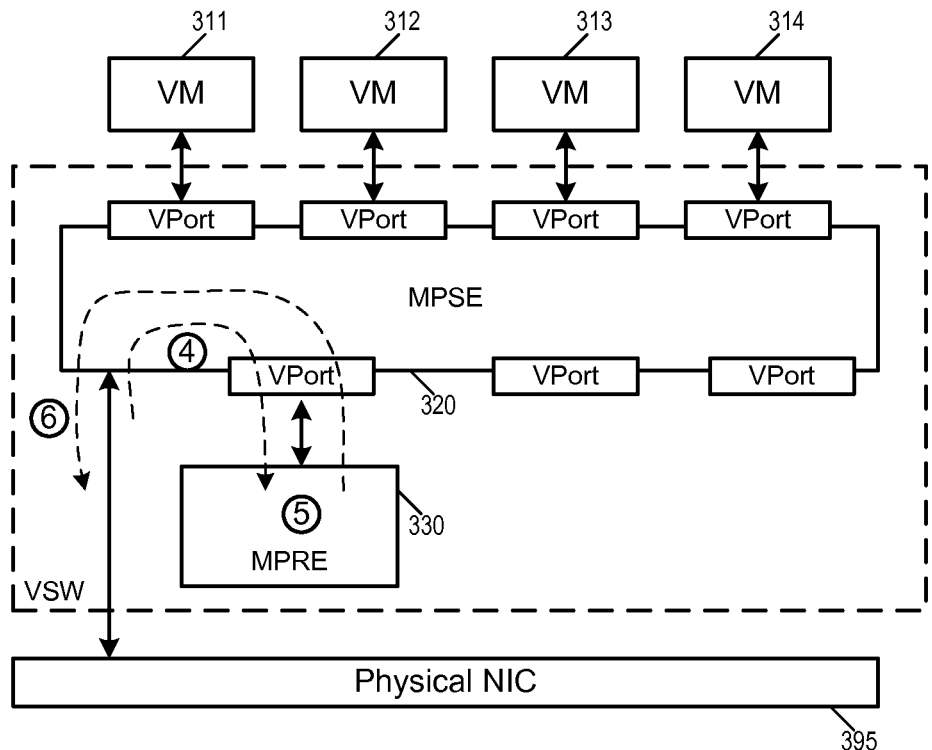

FIG. 6*a-b* illustrates L3 routing operations performed by the MPRE 330 for packets entering the host 300 from the physical network 390. While packets sent from a VM on a host that also operates its own MPRE will have been routed by that MPRE, packets may also be sent to the VMs 311-314 from other host machines that do not themselves operate VDR MPREs. FIG. 6*a* illustrates routing operations for a packet received from the physical network and sent to a virtual machine within the host 300 in operations '1' through '3'. In operation '1', an outside entity sends a packet through the physical network to the MPSE 320 to the MPRE 330 by addressing the MPRE's MAC address. In an operation labeled '2', the MPRE 330 performs a L3 routing operation on the received data packet by resolving its destination L3 level IP address into a L2 level destination MAC address. The routed packet is then sent to the destination virtual machine via the MPSE 320 in an operation labeled '3'.

FIG. 6*b* illustrates a routing operation for a packet sent from an outside entity to another outside entity (e.g., a virtual machine in another host machine) in operations '4' through '6'. Operations '4' and '5' are analogous operations of '1' and '2', during which the MPRE 330 receives a packet from the physical network and the MPSE 320 and performs a L3 routing operation on the received data packet. In operation '6', the MPRE 330 sends the data packet back to the MPSE 320, which sends the packet to another virtual machine in another host machine based on the resolved MAC address. As described below, this may occur when the MPRE 330 is a designated instantiation of an LRE for communication with an external host that does not operate the LRE.

In some embodiments, the host machine 300 is one of many host machines interconnected by a physical network for forming a network virtualization infrastructure capable of supporting logical networks. Such a network virtualization infrastructure is capable of supporting multiple tenants by simultaneously implementing one or more user-specified logical networks. Such a logical network can include one or more logical routers for performing L3 level routing between virtual machines. In some embodiments, logical routers are collectively implemented by MPREs instantiated across multiple host machines.

Figure 7:
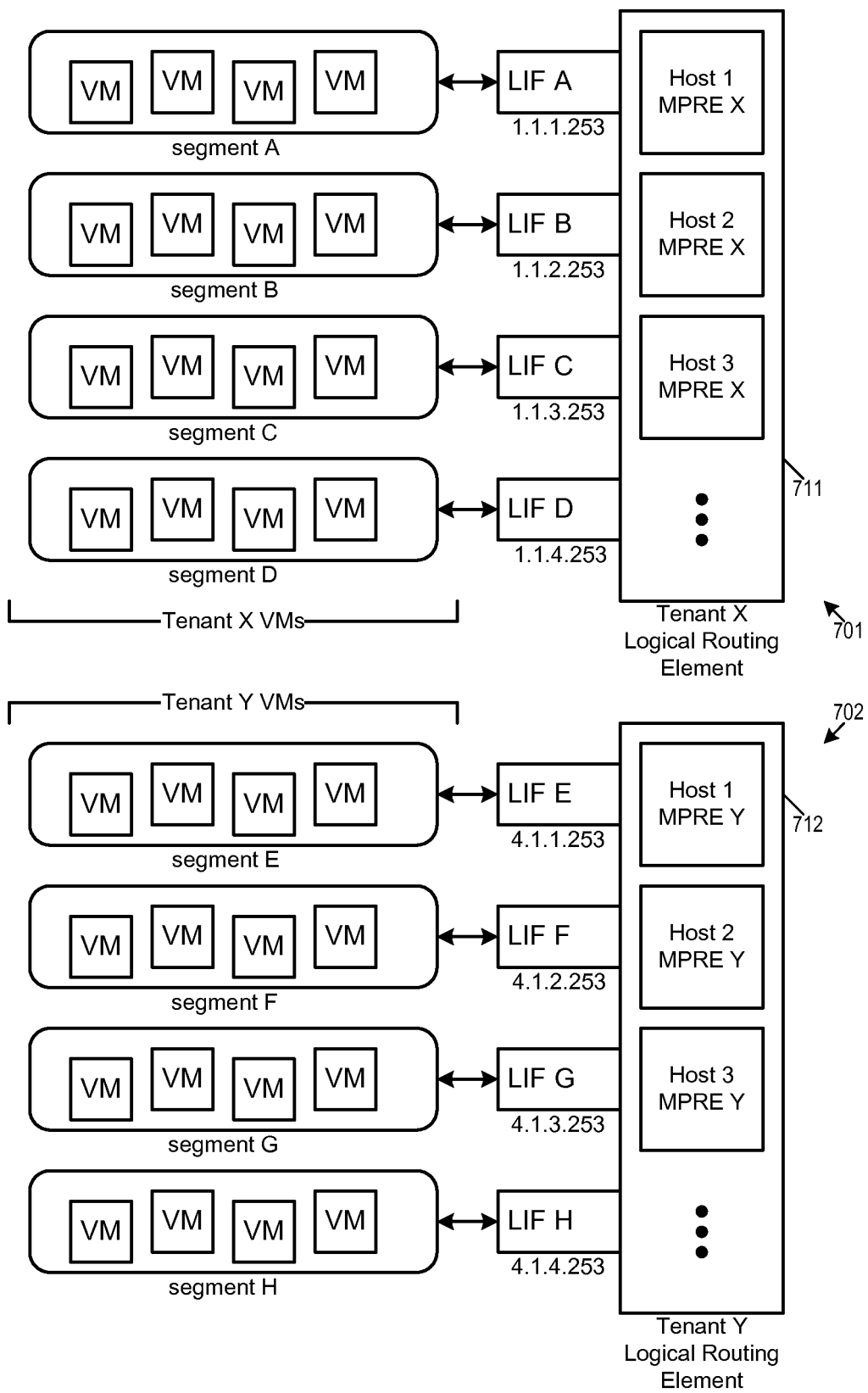
FIG. 7 conceptually illustrates logical networks with LREs that are implemented by MPREs across different host machines.

FIG. 7 conceptually illustrates logical networks 701 and 702 with logical routers that are implemented by MPREs across different host machines. The logical networks 701 and 702 are implemented simultaneously over a network virtualization infrastructure that includes several host machines interconnected by a physical network. As shown in the figure, a first logical network 701 is for tenant X and a second logical network 702 is for tenant Y. Each tenant's logical network includes a number of virtual machines. The virtual machines of tenant X are divided into segments A, B, C, and D. The virtual machines of tenant Y are divided into segments E, F, G, and H. In some embodiments, the virtual machines in a segment are able to communicate with each other using L2 link layer protocols over logical switches. In some embodiments, at least some of the segments are encapsulation overlay networks such as VXLAN networks. In some embodiments, each of the segments forms a different IP subnet.

Each logical network has its own logical router. The logical network 701 for tenant X has an LRE 711 as a logical router for routing between segments A, B, C, and D. The logical network 702 for tenant Y has an LRE 712 as a logical router for routing between segments E, F, G, and H. Each logical router is implemented in the network virtualization infrastructure by MPREs instantiated across different host machines. Some MPRE instantiations in the LRE 711 are operating in the same host machines with some MPRE instantiations in the LRE 712.

Each network segment has its own logical interface to the logical router, and each logical router has its own set of logical interfaces. As illustrated, the logical router 711 has logical interfaces LIF A, LIF B, LIF C, and LIF D for segments A, B, C, and D, respectively, while the logical router 712 has logical interfaces LIF E, LIF F, LIF G, and LIF H for segments E, F, G, and H, respectively. Each logical interface is its own identifier (e.g., IP address or overlay network identifier) that is unique within the network virtualization infrastructure. As a result, the network traffic of tenant X can be entirely isolated from the network traffic of tenant Y.

Figure 8:
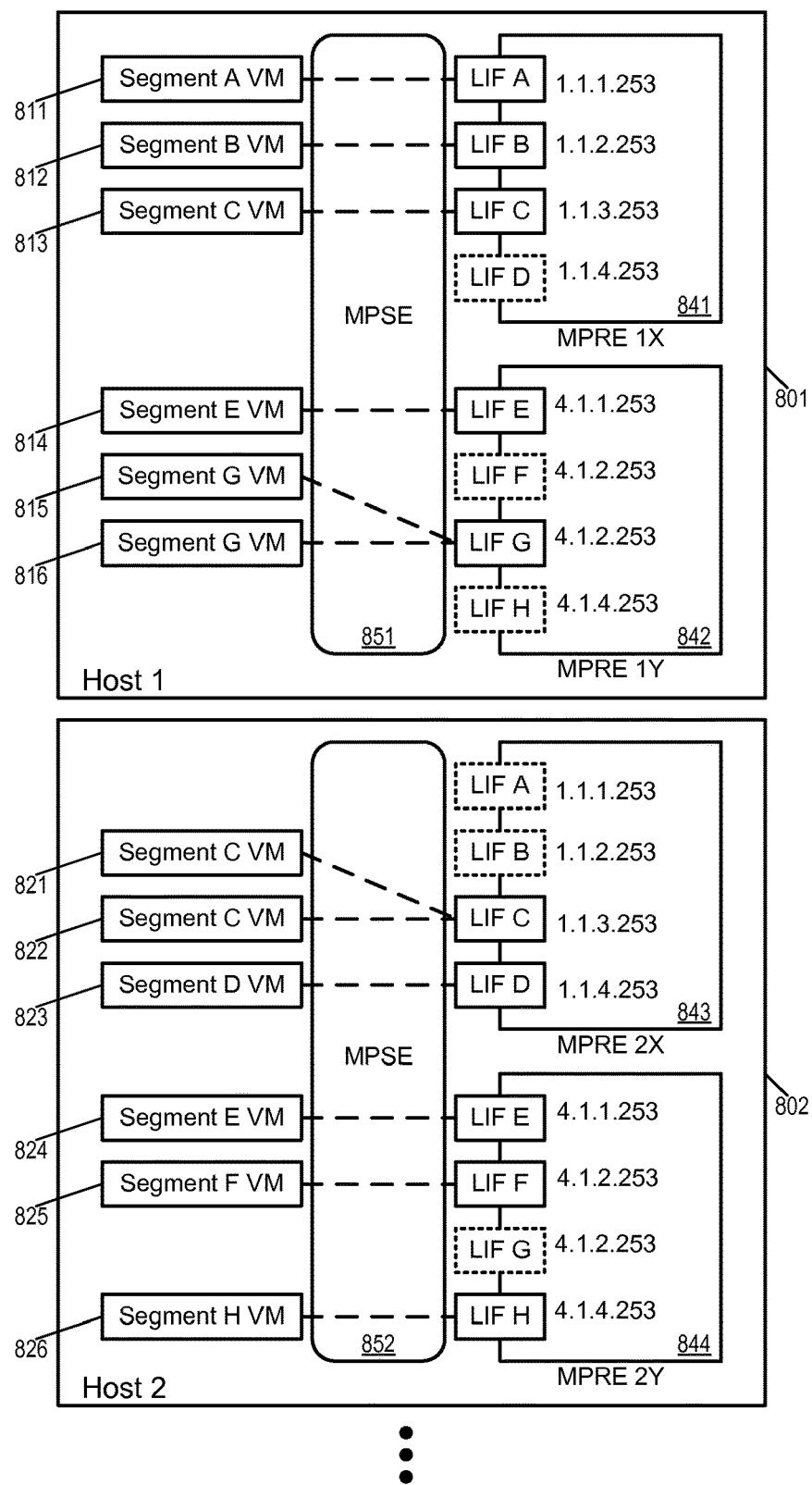
FIG. 8 illustrates the physical implementation of MPREs in host machines of the network virtualization infrastructure.

FIG. 8 illustrates the physical implementation of logical routers in host machines of the network virtualization infrastructure. Specifically, the figure illustrates the (partial) implementation of the logical networks 701 and 702 in host machines 801 and 802. As illustrated, the host machine 801 is hosting virtual machines 811-815, and the host machine 802 is hosting virtual machines 821-826. Among these, the virtual machines 811-812 and 821-823 are virtual machines of tenant X, while virtual machines 813-816 and 824-826 are virtual machines of tenant Y.

Each host machine includes two MPREs for the different two tenants. The host machine 801 has MPREs 841 and 842 for tenants X and Y, respectively. The host machine 802 has MPREs 843 and 844 for tenants X and Y, respectively. The host 801 operates a MPSE 851 for performing L2 layer packet forwarding between the virtual machines 811-816 and the MPREs 841-842, while the host 801 is operating a MPSE 852 for performing L2 layer packet forwarding between the virtual machine 821-826 and the MPREs 843-844.

Each MPRE has a set of logical interfaces for interfacing with virtual machines operating on its host machine. Since the MPREs 841 and 843 are MPREs for tenant X, they can only have logical interfaces for network segments of tenant X (i.e., segments A, B, C, or D), while tenant Y MPREs 842 and 844 can only have logical interfaces for network segments of tenant Y (i.e., segments E, F, G, and H). Each logical interface is associated with a network IP address. The IP address of a logical interface attached to a MPRE allows the MPRE to be addressable by the VMs running on its local host. For example, the VM 811 is a segment A virtual machine running on host 801, which uses the MPRE 841 as its L3 router by using the IP address of LIF A, which is 1.1.1.253. In some embodiments, a MPRE may include LIFs that are configured as being inactive. For example, the LIF D of the MPRE 841 is in active because the host 801 does not operate any VMs in segment D. That is, in some embodiments, each MPRE for a particular LRE is configured with all of the LRE's logical interfaces, but different local instantiations (i.e., MPREs) of a LRE may have different LIFs inactive based on the VMs operating on the host machine with the local LRE instantiation.

It is worth noting that, in some embodiments, LIFs for the same segment have the same IP address, even if these LIFs are attached to different MPREs in different hosts. For example, the MPRE 842 on the host 801 has a logical interface for segment E (LIF E), and so does the MPRE 844 on the host 802. The LIF E of MPRE 842 shares the same IP address 4.1.1.253 as the LIF E of MPRE 844. In other words, the VM 814 (a VM in segment E running on host 801) and the VM 824 (a VM in segment E running on host 802) both use the same IP address 4.1.1.253 to access their respective MPREs.

As mentioned, in some embodiments, different MPREs running on the same host machine share the same port on the MPSE, which means all MPREs running on a same host share an L2 MAC address. In some embodiments, the unique IP addresses of the logical interfaces are used to separate data packets from different tenants and different data network segments. In some embodiments, other identification mechanisms are used to direct data packets from different network segments to different logical interfaces. Some embodiments use a unique identifier for the different segments to separate the packets from the different segments. For a segment that is a subnet, some embodiments use the IP address in the packet to see if the packet is from the correct subnet. For a segment that corresponds to an overlay network, some embodiments use network segment identifiers to direct the data packet to its corresponding logical interface. In some embodiments, a network segment identifier is the identifier of an overlay network (e.g., VNI, VXLAN ID or VLAN tag or ID) that is a segment of a logical network. In some embodiments, each segment of the logical network is assigned a VNI as the identifier of the segment, regardless of its type.

Figure 9:
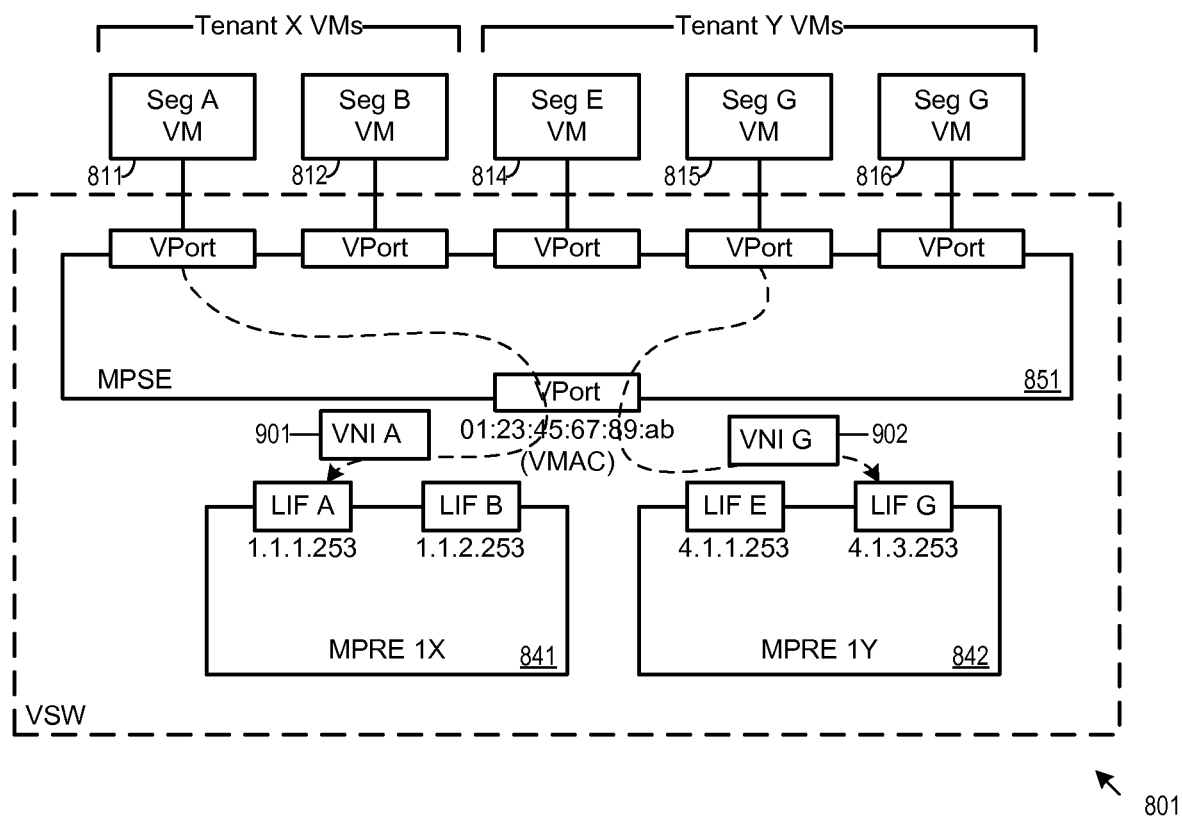
FIG. 9 illustrates how data packets from the virtual machines of different segments are directed toward different logical interfaces within a host.

FIG. 9 illustrates how data packets from the virtual machines of different segments are directed toward different logical interfaces within the host 801. As illustrated, the VMs 811-816 are connected to different ports of the MPSE 851, while the MPRE 841 of tenant X and the MPRE 842 of tenant Y are connected to a port having a MAC address "01:23:45:67:89:ab" (referred to for this discussion as "VMAC"). A packet 901 from the segment A VM 811 and a packet 902 from the segment G VM 815 are sent into the MPSE 851. The MPSE 851 in turn directs the packets 901 and 902 to the virtual port for the MPREs 841 and 842 based on the destination MAC address "VMAC" for both packets. The packet 901 carries a VNI for segment A ("VNI A"), while the packet 902 carries a VNI for segment G ("VNI G"). The logical interface "LIF A" of the MPRE 841 accepts the packet 901 based on its network segment identifier "VNI A", while the logical interface "LIF G" of the MPRE 842 accepts the packet 902 based on its network segment identifier "VNI G". Since tenants do not share the same network segments, and therefore do not share VNIs, data packets from different tenants are safely isolated from each other.

While this figure illustrates the use of VNIs (network identifier tags) on the packets to separate packets to the correct logical router and logical router interface, different embodiments may use other discriminators. For instance, some embodiments use the source IP address of the packet (to ensure that the packet is sent through a LIF with the same network prefix as the source VM), or a combination of the source IP and the network identifier tag.

Figure 10:
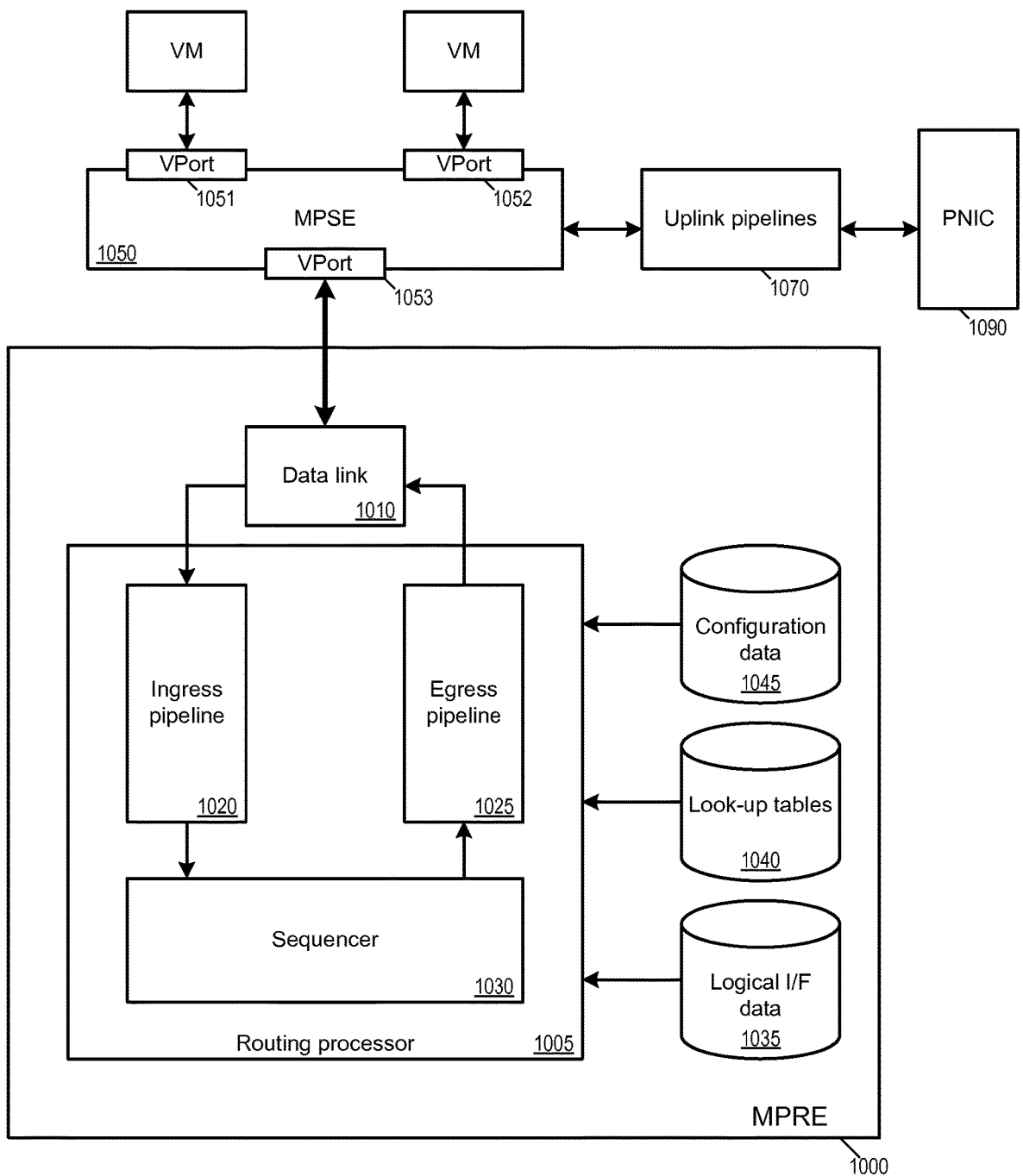
FIG. 10 illustrates a block diagram of an example MPRE operating in a host machine.

For some embodiments, FIG. 10 illustrates a block diagram of an example MPRE instantiation 1000 operating in a host machine. As illustrated, the MPRE 1000 is connected to a MPSE 1050 at a virtual port 1053. The MPSE 1050 is connected to virtual machines operating in the same host as the MPRE 1000 as well as to the physical network through an uplink module 1070 and a physical NIC 1090. The MPRE 1000 includes a data link module 1010 and the routing processor 1005, a logical interface data storage 1035, a look-up table storage 1040, and a configuration data storage 1045. The routing processor 1005 includes an ingress pipeline 1020, an egress pipeline 1025, a sequencer 1030.

The data link module 1010 is the link layer (L2) interface for the MPRE 1000 with the MPSE 1050. It accepts incoming data packet addressed to the MAC address assigned to the port 1053 ("01:23:45:67:89:ab" in the illustrated example). It also transmits outgoing data packet to the MPSE 1050. In some embodiments, the data link module also accepts data packets with broadcast address ("ff:ff:ff:ff:ff:ff") and/or multicast address.

The ingress pipeline 1020 is for queuing up incoming data packets before they are sequentially processed by the routing sequencer 1030. In some embodiments, the ingress pipeline also includes a number of pipeline stages that perform different processing operations on the incoming data packets. In some embodiments, these ingress processing operations includes ingress access control (according to an access control list ACL) and source network address translation (NAT). In some embodiments, at least some of these operations are routing or bridging operations based on data stored in look-up table storage 1040 and logical interface data storage 1035. In some embodiments, the ingress pipeline performs the action according to data specified for a logical interface identified as the inbound LIF for an incoming packet.

The egress pipeline 1025 is for queuing up outgoing data packets that are produced by the routing sequencer 1030 before being sent out by the data link module 1010 through the MPSE 1050. In some embodiments, the egress pipeline also includes a number of pipeline stages that perform different processing operations on outgoing data packet. In some embodiments, these egress processing operations include egress access control (according to an access control list ACL) and destination network address translation (NAT). In some embodiments, at least some of these operations are routing or bridging operations based on data stored in look-up table storage 1040 and logical interface data storage 1035. In some embodiments, the egress pipeline performs the action according to data specified for a logical interface identified as the outbound LIF for an outgoing packet.

The sequencer 1030 performs sequential operations between the ingress pipeline 1020 and the egress pipeline 1025. In some embodiments, the routing sequencer performs sequential operation such ARP operations and bridging operations. In some embodiments, the routing sequencer creates and injects new packets into the network when necessary, such as generating ARP queries and responses. It retrieves pre-processed data packets from the ingress pipeline 1020 and stores outgoing packets into the egress pipeline for post-processing.

The routing processor 1005 of some embodiments makes its routing decisions by first classifying the incoming data packets into various logical interfaces. The routing processor 1005 also updates and maintains the current state of each logical interface in the logical interface data storage 1035. For example, the routing processor 1005, based on the current state of logical interfaces, generates an ARP response to a first virtual machine in a first network segment attached to a first logical interface while passing a data packet from a second virtual machine in a second network segment attached to a second logical interface to a third virtual machine in a third network segment attached to a third logical interface. The current states of first, second, and third logical interfaces are then accordingly updated and stored in the logical interface data storage 1035. In some embodiments, the routing processor 1005 also generates new data packets (e.g., for an ARP request) on behalf of a particular logical interface, again based on that particular logical interface's current state.

The routing processor 1005 also makes its routing decisions based on the content of the look-up table storage 1040. In some embodiments, the look-up table storage 1040 stores the resolution table (or ARP table) for L3 to L2 address resolution (e.g., from network layer IP address to link layer MAC address). In some embodiments, the routing sequencer not only performs L3 level routing (e.g., from one IP subnet to another IP subnet), but also bridging between different overlay networks (such as between a VXLAN network and a VLAN network) that operate in the same IP subnet. In some of these embodiments, the look-up table storage 1040 stores bridging tables needed for binding network segment identifiers (VNIs) with MAC addresses. The routing processor 1005 also updates entries in the bridging table and the ARP table by learning from incoming packets.

The MPRE 1000 also includes a configuration data storage 1045. The storage 1045 stores data for configuring the various modules inside the MPRE 1000. For example, in some embodiments, the configuration data in the storage 1045 specifies a number of logical interfaces, as well as parameters of each logical interface (such its IP address, associated network segments, active/inactivate status, LIF type, etc.). In some embodiments, the configuration data also specifies other parameters such as the virtual MAC address (VMAC) used by virtual machines in the same host machine to address the MPRE 1000 and its physical MAC address (PMAC) used by other host machines to address the MPRE 1000. In some embodiments, the configuration data also includes data for ACL, NAT and/or firewall operations. In some embodiments, the data in the configuration data storage 1000 is received from the controller cluster via the controller agent in the host machine (such as the controller agent 340 of FIG. 3). Configuration data and control plane operations will be further described in Section III below.

Figure 11:
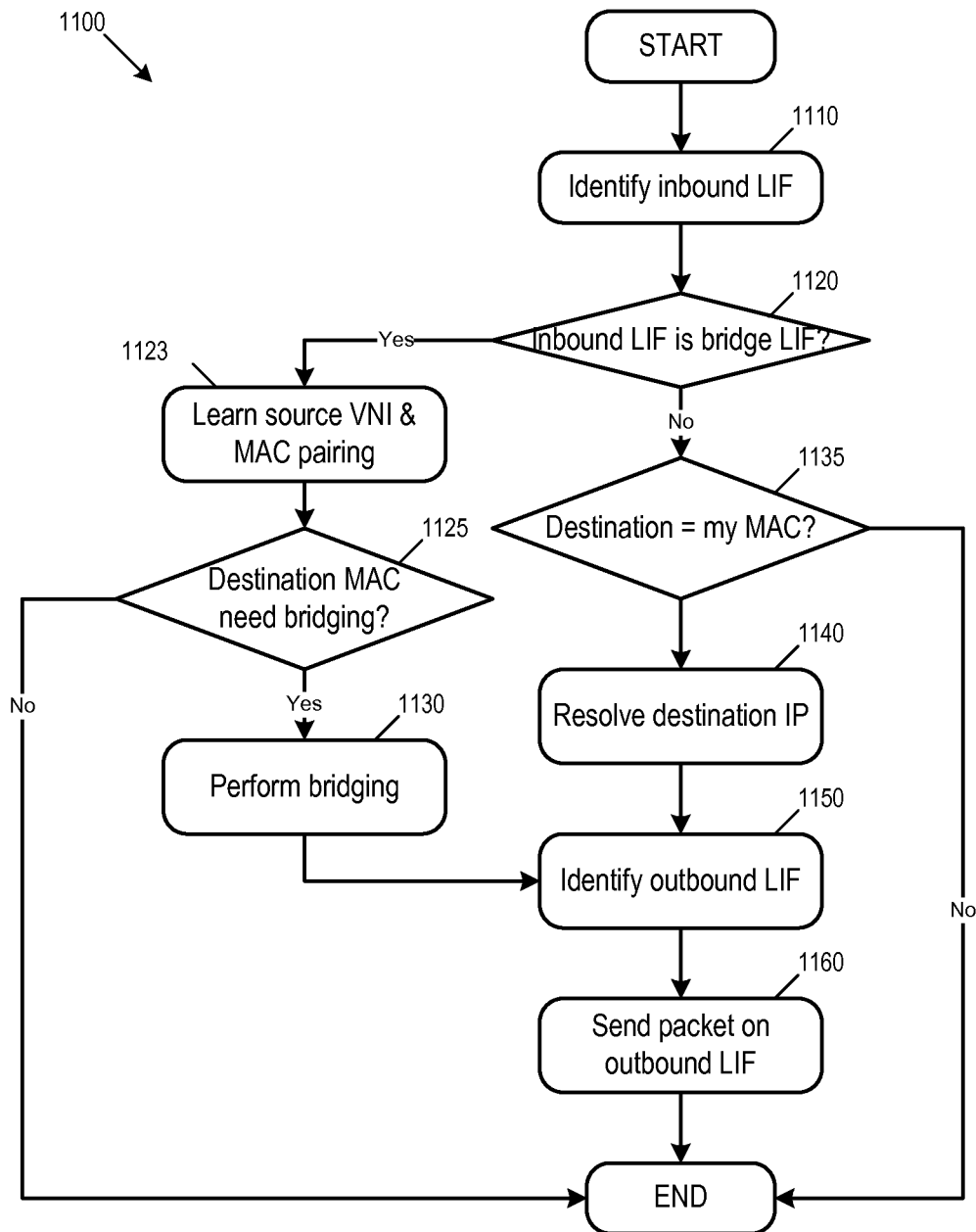
FIG. 11 conceptually illustrates a process performed by a MPRE when processing a data packet from the MPSE.

FIG. 11 conceptually illustrates a process 1100 of some embodiments performed by a MPRE when processing a data packet from the MPSE. In some embodiments, the process 1100 is performed by the routing processor 1005. The process 1100 begins when the MPRE receives a data packet from the MPSE. The process identifies (at 1110) the logical interface for the inbound data packet (inbound LIF) based, e.g., on the network segment identifier (e.g., VNI).

The process then determines (at 1120) whether the inbound LIF is a logical interface for bridging (bridge LIF) or a logical interface for performing L3 routing (routing LIF). In some embodiments, a logical interface is either configured as a routing LIF or a bridge LIF. If the identified inbound LIF is a bridge LIF, the process proceeds to 1123. If the identified inbound LIF is a routing LIF, the process proceeds to 1135.

At 1123, the process learns the pairing between the source MAC and the incoming packet's network segment identifier (e.g., VNI). Since the source MAC is certain to be in a network segment identified by the VNI, this information is useful for bridging a packet that has the same MAC address as its destination address. This information is stored in a bridge table in some embodiments to provide pairing between this MAC address with its VNI.

Next, the process determines (at 1125) whether the destination MAC in the incoming data packet is a MAC that needs bridging. A destination MAC that needs bridging is a MAC that has no known destination in the source network segment, and cannot be routed (e.g., because it is on the same IP subnet as the source VNI). If the destination MAC requires bridging, the process proceeds to 1130, otherwise, the process ends.

At 1130, the process performs a bridging operation by binding the unknown destination MAC with a VNI according to the bridging table. In some embodiments, if no such entry can be found, the process floods all other bridge LIFs attached to the MPRE in order to find the matching VNI for the unknown destination MAC. In some embodiments, the process will not perform bridging if a firewall is enabled for this bridge LIF. Bridging operations will be further described in Section II.D below. In some embodiments, the operation 1130 is a sequential operation that is performed by a sequential module such as the sequencer 1030. After the performing bridging, the process proceeds to 1150.

At 1135, the process determines whether the destination MAC in the incoming data packet is addressed to the MPRE. In some embodiments, all MPREs answer to a generic virtual MAC address (VMAC) as destination. In some embodiments, individual LIFs in the MPRE answer to their own LIF MAC (LMAC) as destination. If the destination MAC address is for the MPRE (or the LIF), the process proceeds to 1140. Otherwise, the process 1100 ends.

At 1140, the process resolves (1140) the destination IP address in the incoming data packet. In some embodiments, the MPRE first attempts to resolve the IP address locally by looking up the IP address in an ARP table. If no matching entry can be found in the ARP table, the process would initiate an ARP query and obtain the destination MAC address. ARP operations will be further described in Section II.B below. In some embodiments, the operation 1140 is a sequential operation that is performed by a sequential module such as the sequencer 1030.

The process next identifies (1150) an outbound LIF for the incoming packet (or more appropriately at this point, the outgoing packet). For a data packet that comes through an inbound LIF that is a bridge LIF, the outbound LIF is a bridge LIF that is identified by the VNI provided by the bridge binding. For a data packet that comes through an inbound LIF that is a routing LIF, some embodiments identify the outbound LIF by examining the destination IP address. In some embodiments, the outbound LIF is a routing LIF that is identified by a VNI provided by ARP resolution table.

After identifying the outbound LIF, the process sends (at 1160) the outgoing packet by using the outbound LIF to the correct destination segment. In some embodiments, the outbound LIF prepares the packet for the destination segment by, for example, tagging the outgoing packet with the network segment identifier of the destination segment. The process 1100 then ends.

II. VDR Packet Processing Operations

A. Accessing MPREs Locally and Remotely

As mentioned, the LRE described above in Section I is a virtual distributed router (VDR). It distributes routing operations (whether L3 layer routing or bridging) across different instantiations of the LRE in different hosts as MPREs. In some embodiments, a logical network that employs VDR further enhances network virtualization by making all of the MPREs appear the same to all of the virtual machines. In some of these embodiments, each MPRE is addressable at L2 data link layer by a MAC address (VMAC) that is the same for all of the MPREs in the system. This is referred to herein as a virtual MAC address (VMAC). The VMAC allows all of the MPREs in a particular logical network appear to be one contiguous logical router to the virtual machines and to the user of the logical network (e.g., a network administrator).

However, in some embodiments, it is necessary for MPREs to communicate with each other, with other host machines, or with network elements in other host machines (e.g., MPREs and/or VMs in other host machines). In some of these embodiments, in addition to the VMAC, each MPRE is uniquely addressable by a physical MAC (PMAC) address from other host machines over the physical network. In some embodiments, this unique PMAC address used to address the MPRE is a property assigned to the host machine operating the MPRE. Some embodiments refer to this unique PMAC of the host machine as the unique PMAC of the MPRE, since a MPRE is uniquely addressable within its own logical network by the PMAC of its host machine. In some embodiments, since different logical networks for different tenants are safely isolated from each other within a host machine, different MPREs for different tenants operating on a same host machine can all use the same PMAC address of that host machine (in order to be addressable from other host machines). In some embodiments, not only is each MPRE associated with the PMAC of its host machine, but each logical interface is associated with its own unique MAC address, referred to as an LMAC.

In some embodiments, each packet leaving a MPRE has the VMAC of the MPRE as a source address, but the host machine will change the source address to the unique PMAC of the host machine before the packet enters the PNIC and leaves the host for the physical network. In some embodiments, each packet entering a MPRE must have the VMAC of the MPRE as its destination address. For a packet arriving at the host from the physical network, the host would change the destination MAC address into the generic VMAC if the destination address is the unique PMAC address of the host machine. In some embodiments, the PMAC of a host machine is implemented as a property of its uplink module (e.g., 370), and it is the uplink module that changes the source MAC address of an outgoing packet from the generic VMAC to its unique PMAC and the destination address of an incoming packet from its unique PMAC to the generic VMAC.

Figure 12:
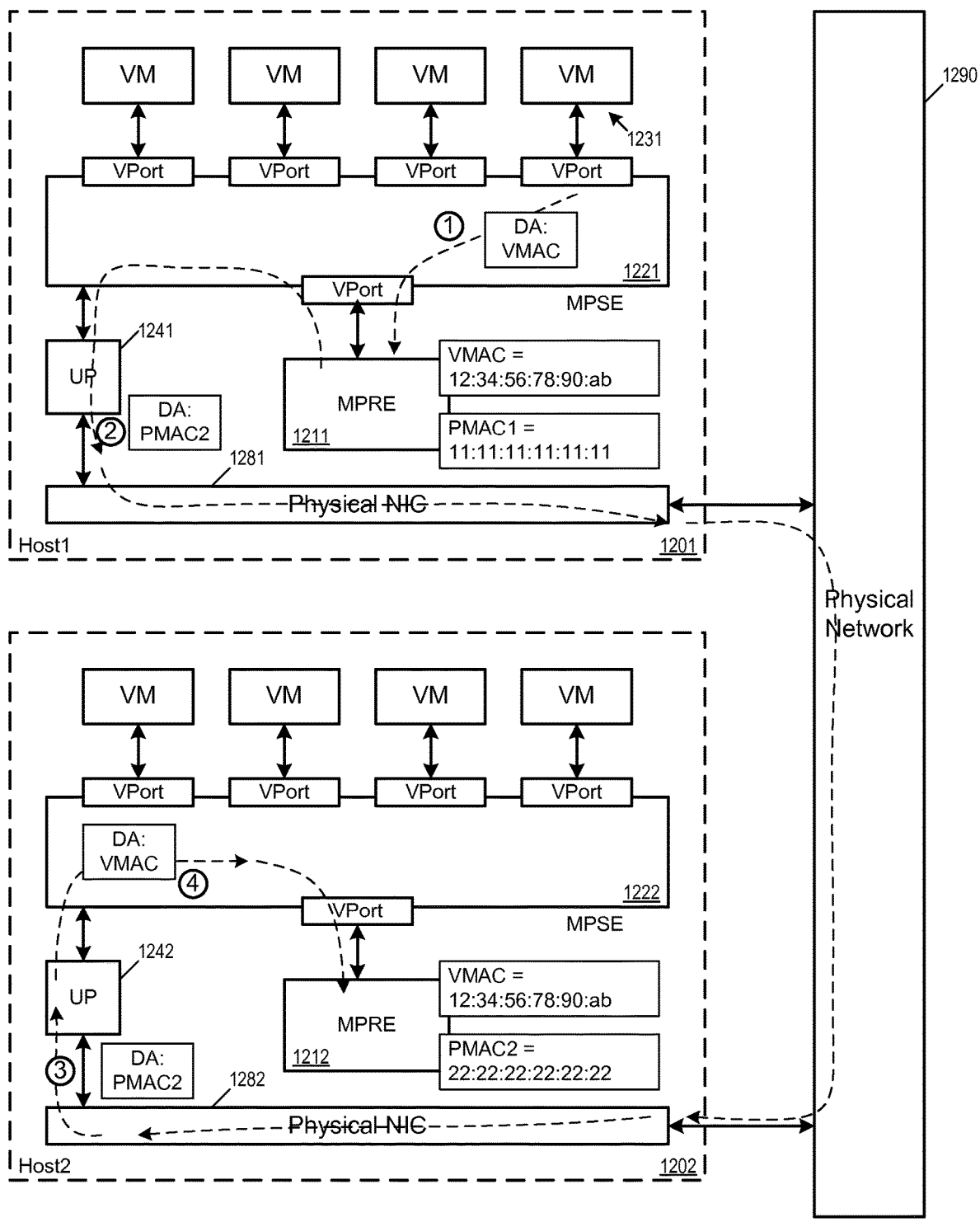
FIG. 12 illustrates a logical network with MPREs that are addressable by common VMAC and unique PMACs for some embodiments.

FIG. 12 illustrates a logical network 1200 with MPREs that are addressable by common VMAC and unique PMACs for some embodiments. As illustrated, the logical network 1200 includes two different host machines 1201 and 1202. The host machine 1201 includes a MPRE 1211, a MPSE 1221, and several virtual machines 1231. The host machine 1202 includes a MPRE 1212, a MPSE 1222, and several virtual machines 1232. The two host machines are interconnected by a physical network 1290. The MPSE 1222 receives data from the physical host through a PNIC 1282 and an uplink module 1242.

The MPRE 1211 in the host 1201 is addressable by the VMs 1231 by using a VMAC address 12:34:56:78:90:ab. The MPRE 1212 in the host 1202 is also addressable by the VMs 1232 by the identical VMAC address 12:34:56:78:90:ab, even though the MPRE 1211 and the MPRE 1212 are different MPREs (for the same LRE) in different host machines. Though not illustrated, in some embodiments, MPREs in different logical networks for different tenants can also use a same VMAC address.

The MPRE 1211 and the MPRE 1212 are also each addressable by its own unique PMAC address from the physical network by other network entities in other host machines. As illustrated, the MPRE 1211 is associated with its own unique PMAC address 11:11:11:11:11:11 (PMAC1), while MPRE 1212 is associated with its own unique PMAC address 22:22:22:22:22:22 (PMAC2).

FIG. 12 also illustrates an example of data traffic sent to a remote MPRE on another host machine. The remote MPRE, unlike a MPRE, cannot be addressed directly by the generic VMAC for packets incoming from the physical network. A MPRE in a remote host can only be addressed by that remote MPRE's unique PMAC address. The virtualization software running in the remote host changes the unique PMAC address back to the generic VMAC address before performing L2 switching in some embodiments.

FIG. 12 illustrates the traffic from the MPRE 1211 in host 1201 to the MPRE 1212 in host 1202 in four operations labeled '1', '2', '3', and '4'. In operation '1', a VM 1231 sends a packet to its MPRE 1211 using the generic VMAC address. This packet would also have a destination IP address (not shown) that corresponds to the intended destination for the traffic. In operation '2', the MPRE 1211 of the host 1201 sends a packet to the MPRE 1212 of the host 1202 by using the unique physical MAC "PMAC2" of the MPRE 1212 as the destination address. To perform this conversion, in some embodiments, the MPRE 1211 would have looked up in its ARP table (or performed ARP) to identify the destination MAC address (PMAC2) that corresponds to the destination IP address.

In operation '3', the data packet has reached host 1202 through its physical NIC and arrived at the uplink module 1242 (part of the virtualization software running on the host 1202). The uplink module 1242 in turn converts the unique PMAC of the MPRE 1212 ("PMAC2") into the generic VMAC as the destination address. In operation '4', the data packet reaches the MPSE 1222, which forwards the packet to the MPRE 1212 based on the generic VMAC.

Figure 13:
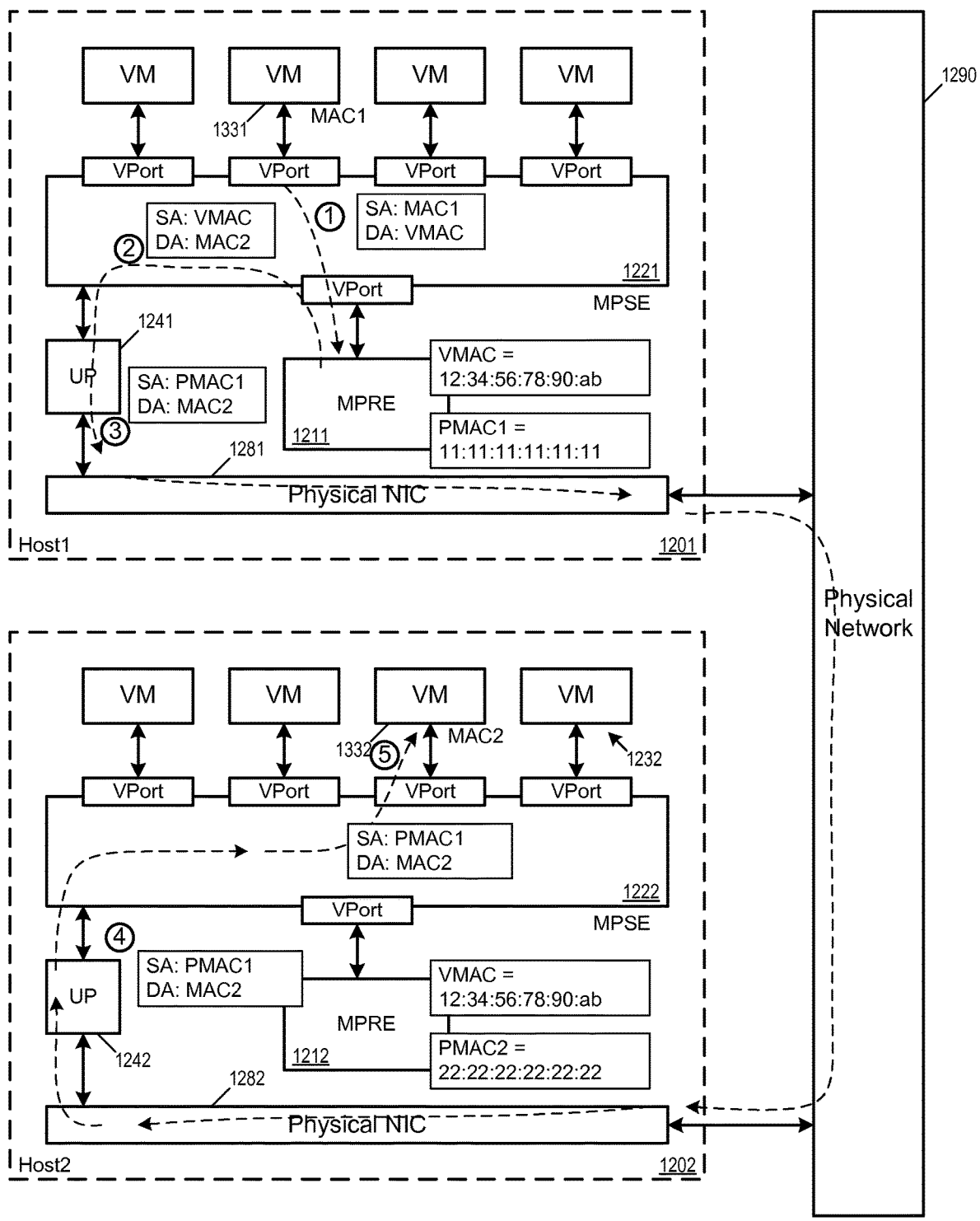
FIG. 13 illustrates an example routed L3 network traffic that uses the common VMAC and the unique PMAC.

FIG. 13 illustrates an example of routed L3 network traffic from one VM to another VM that uses the common VMAC and the unique PMAC for the network 1200. The network traffic is a data packet that originates from the VM 1331 in the host machine 1201 and destined for the VM 1332 in the host machine 1202. The example routed L3 traffic is illustrated in four operations labeled '1' through '4'. During operation '1', the VM 1331 with link layer L2 address "MAC1" sends a data packet to the MPRE 1211 by using the common VMAC of the MPREs as the destination address. During operation '2', the MPRE 1211 performs L3 level routing by resolving a destination IP address into a destination MAC address for the destination VM, which has a link layer L2 address "MAC2". The MPRE 1211 also replaces the VM 1331's MAC address "MAC1" with its own unique physical link layer address "PMAC1" (11:11:11:11:11:11) as the source MAC address. In operation 3, the routed packet reaches the MPSE 1222, which forwards the data packet to the destination VM 1232 according to the destination MAC address "MAC2". In operation '4', the data packet reaches the destination virtual machine 1232. In some embodiments, it is not necessary to change unique a unique PMAC (in this case, "PMAC1") into the generic VMAC when the unique PMAC is the source address, because the VM 1332 ignores the source MAC address for standard (non-ARP) data traffic.

Figure 14:
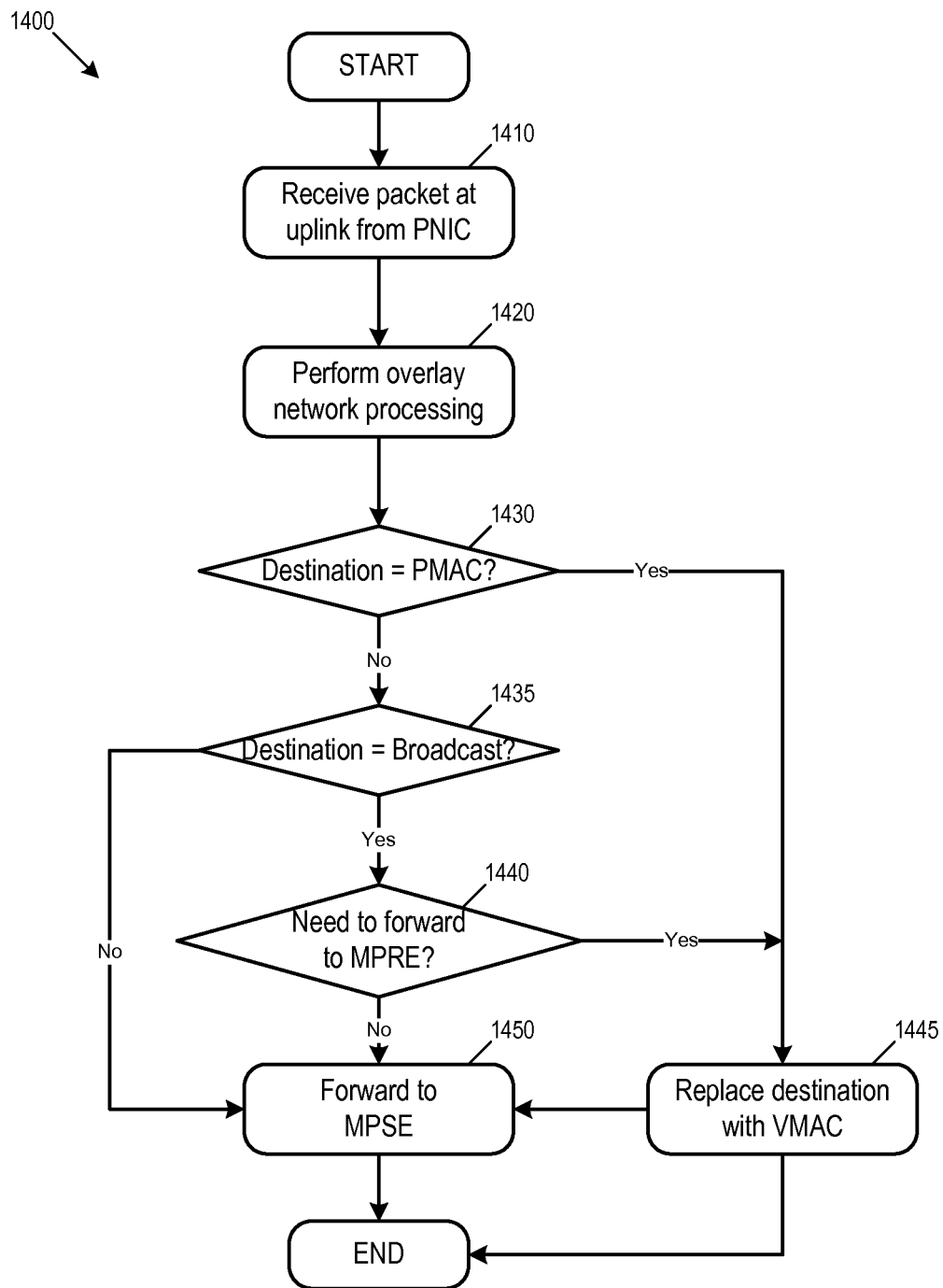
FIG. 14 conceptually illustrates a process for pre-processing operations performed by an uplink module.

As mentioned, an uplink module is a module that performs pre-processing on incoming data from the PNIC to the MPSE and post-processing on outgoing data from the MPSE to the PNIC. FIG. 14 conceptually illustrates a process 1400 for pre-processing operations performed by an uplink module (such as 1242). In some embodiments, the operations of the process 1400 are implemented as an ingress pipeline entering the host machine from the PNIC.

The process starts when it receives (at 1410) a packet from the PNIC (i.e., from the external physical network). The process performs (at 1420) overlay network processing if the data is for an overlay network such as VXLAN or VLAN. When a VM on a remote host sends a data packet to a VM in the same VXLAN network but on this host, the process will de-capsulate the packet before letting the packet be forwarded to the VM through the MPSE. By performing this operation, the uplink module allows the host to serve as a tunnel endpoint for the VXLAN (e.g., a VTEP).

Next, the process determines (at 1430) if the destination MAC in the incoming data packet is a unique physical MAC (PMAC). In some embodiments, a unique PMAC address is used for directing a data packet to a particular host, but cannot be used to send packet into the MPRE of the host (because the MPSE associates the port for the MPRE with the VMAC rather than the PMAC). If the destination MAC is the unique PMAC, the process proceeds to 1445. Otherwise, the process proceeds to 1435.

At 1435, the process determines whether the destination MAC in the incoming data packet is a broadcast MAC (e.g., ff:ff:ff:ff:ff:ff). In some embodiments, a host will accept a broadcast MAC, but some broadcast packet must be processed by the MPRE first rather than being sent to every VM connected to the MPSE. If the destination MAC is a broadcast MAC, the process proceeds to 1440 to see if the broadcast packet needs to go to MPRE. Otherwise the process proceeds to 1450 to allow the packet to go to MPSE without altering the destination MAC.

At 1440, the process determines whether the packet with the broadcast MAC needs to be forwarded to the MPRE. In some embodiments, only certain types of broadcast messages are of interest to the MPRE, and only these types of broadcast messages need to have its broadcast MAC address altered to the generic VMAC. For example, a broadcast ARP query message is of interest to the MPRE and will be forwarded to the MPRE by having its destination MAC address altered to the VMAC. If the broadcast packet is of interest to the MPRE, the process proceeds 1445. Otherwise the process proceeds to 1450.

At 1445, the process replaces the destination MAC (either PMAC or broadcast) with the generic VMAC, which ensures that packets with these destination MACs will be processed by the MPRE. The process then proceeds to 1450 to allow the packet to proceed to MPSE with altered destination MAC. The process 1400 then ends.

Figure 15:
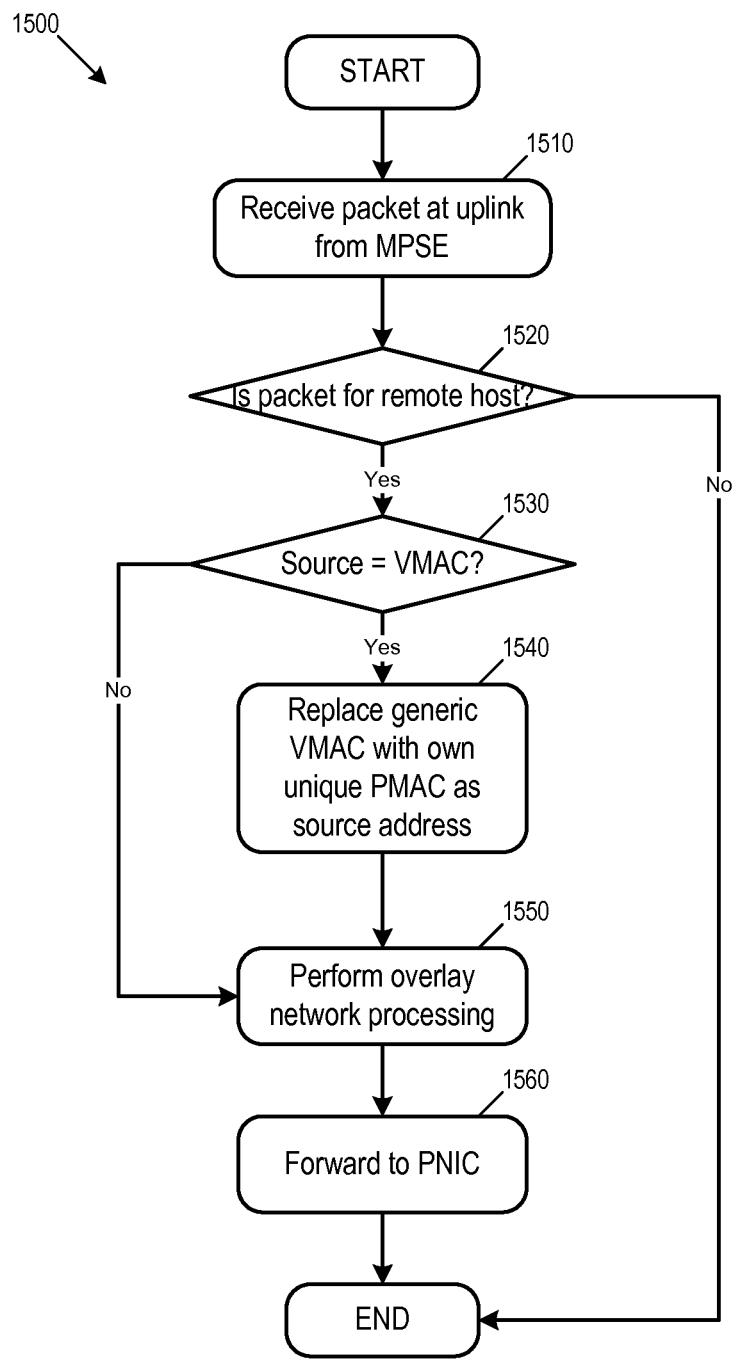
FIG. 15 conceptually illustrates a process for post-processing operations performed by an uplink module.

FIG. 15 conceptually illustrates a process 1500 for post-processing operations performed by an uplink module. In some embodiments, the operations of the process 1500 are implemented as an egress pipeline for packets leaving the host machine through the PNIC. The process starts when it receives (at 1510) a packet at the uplink module from the MPSE. The process then determines (at 1520) whether the packet is for a remote host. If the destination address of the packet indicates a port within local host machine (e.g., the MPRE or one of the VMs), the process ignores the packet and ends. Otherwise, the process proceeds to 1530.

At 1530, the process determines whether the source MAC address is the generic VMAC, i.e., whether the packet is from the MPRE. If so, the process proceeds to 1540. Otherwise, the process proceeds to 1550. At 1540, the process replaces the VMAC with the unique PMAC of the MPRE as the source MAC address. This ensures that the receiver of the packet will be able to correctly identify the sender MPRE by using its unique PMAC address.

The process then performs (at 1550) overlay network processing if the data is for an overlay network such as VXLAN or VLAN. When a VM on the host sends a data packet to another VM in the same VXLAN network but on a different host, the process will encapsulate the fame before injecting it to the physical network using the VXLAN network's VNI. By performing this operation, the uplink module allows the host to serve as a tunnel endpoint under the VXLAN (VTEP). Next, the process forwards (at 1560) the packet to the physical NIC. The process 1500 then ends.

B. Using VDR to Perform Address Resolution

As mentioned, each LRE has a set of logical interfaces for interfacing virtual machines in each of the network segments. In some embodiments, from the perspective of virtual machines, the logical interface of the network segment also serves as the default gateway for virtual machines in the network segment. Since a LRE operates a MPRE in each host machine, in some embodiments, a MPRE receiving an ARP query for one of its logical interfaces (such as an ARP for the default gateway) responds to the query locally without forwarding the query to other host machines.

Figure 16:
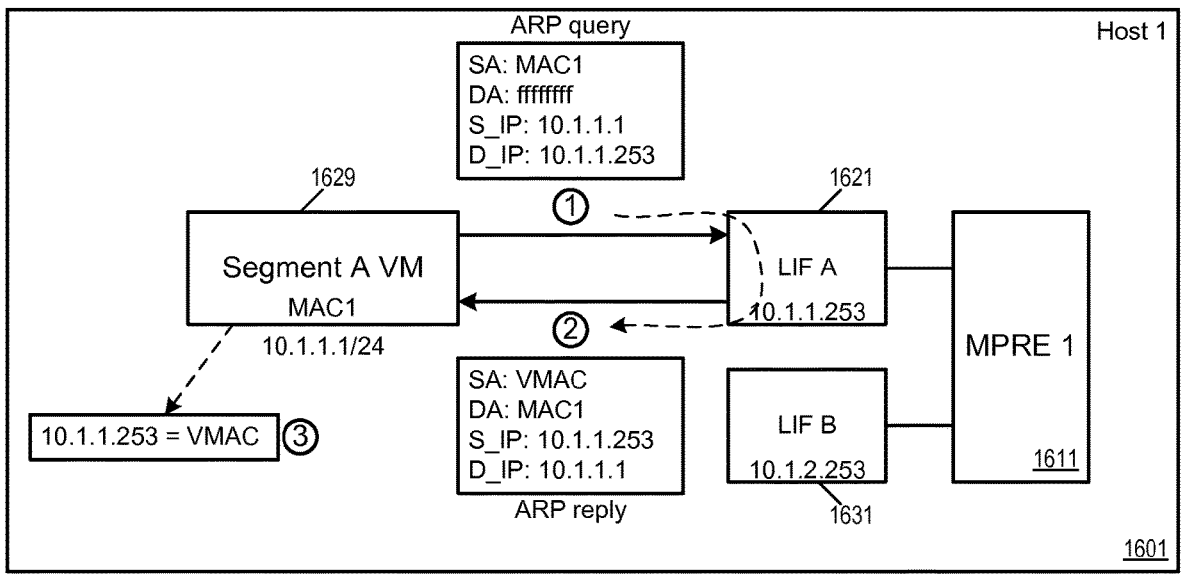
FIG. 16 illustrates ARP query operations for logical interfaces of LREs in a logical network.
Figure 16:
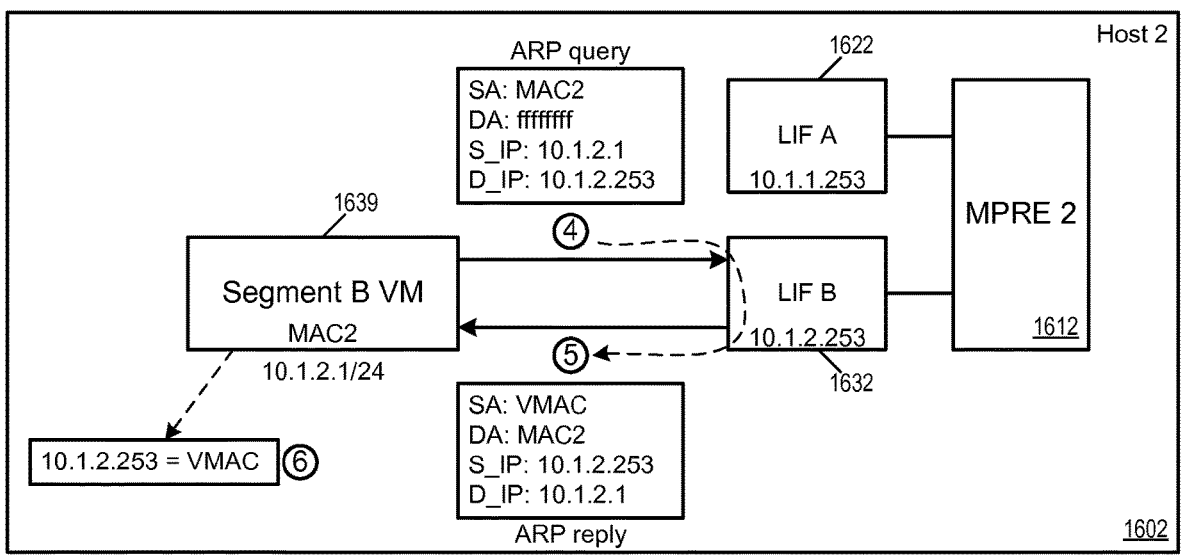

FIG. 16 illustrates ARP query operations for logical interfaces of VDR/LRE MPREs in a logical network 1600. The logical network 1600 is distributed across at least two host machines 1601 and 1602. The host machine 1601 has a MPRE 1611 and the host machine 1602 has a MPRE 1612. Each MPRE has a logical interface for segment A (LIF A) and a logical interface for segment B (LIF B) of the logical network. (The MPRE 1611 has LIF A 1621 and LIF B 1631; the MPRE 1612 has LIF A 1622 and LIF B 1632.) The host machine 1601 has a segment A VM 1629 that uses the LIF A of the MPRE 1611. The host machine 1602 has a segment B VM 1639 that uses the LIF B of the MPRE 1612.

Each LIF is associated with an IP address. However, as illustrated, the LIF A 1621 of the MPRE 1611 and the LIF A 1622 of the MPRE 1612 both have the same IP address (10.1.1.253). This is the IP address of the default gateway of segment A (subnet 10.1.1.x). Similarly, the LIF B 1631 of the MPRE 1611 and the LIF B 1632 of the MPRE 1612 both have the same IP address (10.1.2.253). This is the IP address of the default gateway of segment B (subnet 10.1.2.x).

The figure illustrates two ARP queries made by the VMs 1629 and 1639 in operations labeled '1' through '6'. In operation '1', the virtual machine 1629 of segment A makes an ARP query for the default gateway of its segment. The ARP query message uses the IP address of LIF A (10.1.1.253) as the destination IP and broadcast MAC as the destination MAC address. During operation '2', the LIF A 1621 responds to the ARP query by resolving the IP address "10.1.1.253" to the VMAC address for all MPREs. Furthermore, the LIF A 1621 does not pass the ARP query message on to the physical network. This prevents other entities in the network having the same IP address "10.1.1.253" as LIF A from responding, such as LIF A on other VDR/LRE MPREs in other host machines (e.g., the LIF A 1622 on the host machine 1602). In operation '3', the VM 1629 receives the ARP reply message and updates its resolution table, resolving the IP address of the default gateway to the MAC address "VMAC". The destination MAC address of this reply message is the MAC address of the original inquirer (i.e., "MAC1" for the VM 1629), and the source MAC address is the newly resolved MAC address "VMAC" of the MPRE. The VM 1629 then stores this entry in its resolution table for subsequent access to the MPRE 1611, in order to address subsequently sent packets that need to be routed. Operations '4', '5', and '6' are analogous operations of operations '1', '2', and '3', in which the LIF B 1632 of the MPRE 1612 responds to a ARP request by segment B VM 1639 without passing the ARP query message on to the physical network. Although the ARP request by VM 1639 is sent to a different LIF on a different MPRE, the same address "VMAC" is used in the ARP reply.

Once a virtual machine knows the MAC address of the default gateway, it can send data packets into other network segments by using the VMAC to address a logical interface of the MPRE. However, if the MPRE does not know the link layer MAC address to which the destination IP address (e.g., for a destination virtual machine) resolves, the MPRE will need to resolve this address. In some embodiments, a MPRE can obtain such address resolution information from other MPREs of the same LRE in other host machines or from controller clusters. In some embodiments, the MPRE can initiate an ARP query of its own in the network segment of the destination virtual machine to determine its MAC address. When making such an ARP request, a MPRE uses its own unique PMAC address rather than the generic VMAC address as a source address for the packets sent onto the physical network to other MPREs.

Figure 17:
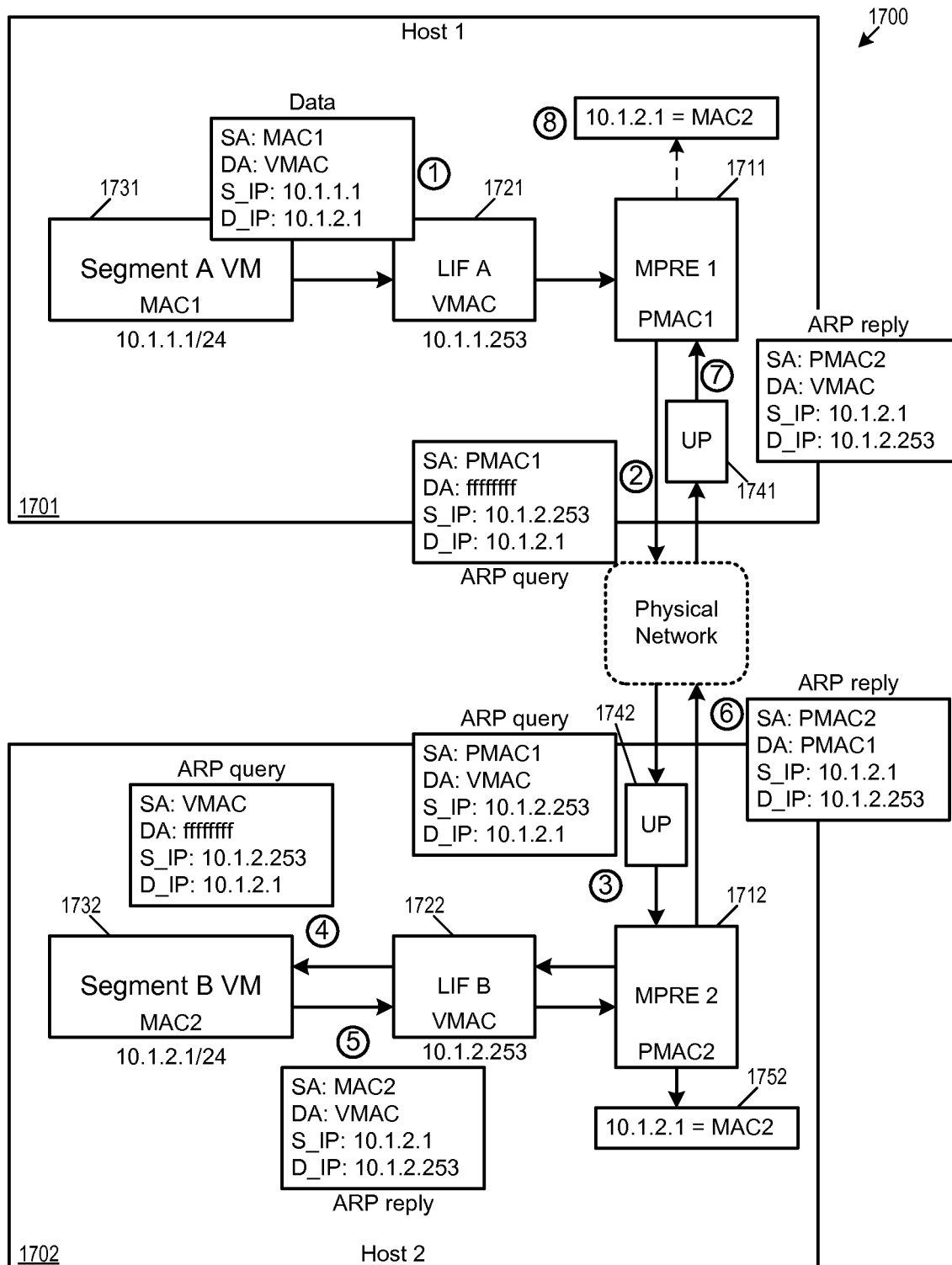
FIG. 17 illustrates a MPRE initiated ARP query for some embodiments.

FIG. 17 illustrates a MPRE initiated ARP query of some embodiments. Specifically, the figure shows an implementation of a logical network 1700 in which a MPRE uses its own PMAC address for initiating its own ARP query. As illustrated, the implementation of logical network 1700 includes at least two host machines 1701 and 1702. Residing on the host machine 1701 is a VM 1731 in segment A, a MPRE 1711 that has a logical interface 1721 for segment A, and an uplink module 1741 for receiving data from the physical network. Residing on the host machine 1702 is a VM 1732 in segment B, a MPRE 1712 that has a logical interface 1722 for segment B, and an uplink module 1742 for receiving data from the physical network. In addition to the generic VMAC, the MPRE 1711 has a unique physical MAC address "PMAC1", and the MPRE 1712 has a unique physical MAC address "PMAC2".

In operations labeled '1' through '8', the figure illustrates an ARP query initiated by the MPRE 1711 from the host machine 1701 for the VM 1732 in segment B. During operation '1', the VM 1731 with IP address 10.1.1.1 (in segment A) sends a packet to a destination network layer address 10.1.2.1 (in segment B), which requires L3 routing by its MPRE 1711. The VM 1731 already knows that the L2 link layer address of its default gateway is "VMAC" (e.g., from a previous ARP query) and therefore it sends the data packet directly to the MPRE 1711 by using VMAC, as the destination IP is in another segment.

During operation '2', the MPRE 1711 determines that it does not have the L2 link layer address for the destination VM 1732 (e.g., by checking its address resolution table), and thus initiates an ARP query for the destination IP "10.1.2.1". This ARP query uses the unique physical MAC address of the MPRE 1711 ("PMAC1") as the source MAC address and a broadcast MAC address as the destination MAC. The MPRE 1711 have also performed L3 routing on the packet to determine that the destination IP "10.1.2.1" is in segment B, and it therefore changes the source IP to "10.1.2.253" (i.e., the IP address of LIF B). This broadcast ARP message traverses the physical network to reach the host 1702. In some embodiments, if the logical network spanned additional hosts (i.e., additional hosts with additional local LRE instantiations as MPREs), then the ARP message would be sent to these other hosts as well.

During operation '3', the broadcasted ARP query arrives at the uplink module 1742 running on the host 1702, which in turn replaces the broadcast MAC address ("ffffffffffff") with the "VMAC" that is generic to all of the MPREs, so that the MPSE in the host 1702 will forward the ARP query packet to the MPRE 1712. The source address "PMAC1", unique to the sender MPRE 1711, however, stays in the modified ARP query.

During operation '4', the MPRE 1712 of the host 1702 receives the ARP query because it sees that VMAC is the destination address. The MPRE 1712 is not able to resolve the destination IP address 10.1.2.1, so it in turn forwards the ARP query through LIF B 1722 as broadcast (destination "ffffffffffff") to any local VMs of the host 1702 that are on segment B, including the VM 1732. The ARP query egresses the MPRE 1712 through the outbound LIF 1722 (for segment B) for the VM 1732.

During operation '5', the broadcast ARP query with "VMAC" as source MAC address reaches the VM 1732 and the VM 1732 sends a reply message to the ARP query through LIF B 1722 to the MPRE 1712. In the reply message, the VM 1732 indicates that the L2 level link address corresponding to the L3 network layer address "10.1.2.1" is its address "MAC2", and that the reply is to be sent to the requesting MPRE 1712 using the generic MAC address "VMAC". The MPRE 1712 also updates its own ARP resolution table 1752 for "10.1.2.1" so it can act as ARP proxy in the future.

During operation '6', the MPRE 1712 forwards the reply packet back to the querying MPRE 1711 by using "PMAC1" as the destination MAC address, based on information stored by the MPRE 1712 from the ARP query to which it is responding (indicating that the IP 10.1.1.253 resolves to MAC "PMAC1"). During operation '7', the uplink module 1741 for the host 1702 translates the unique "PMAC1" into the generic "VMAC" so that the MPSE at the host 1701 will forward the packet locally to the MPRE 1711. Finally at operation '8', the reply message reaches the original inquiring MPRE 1711, which in turn stores the address resolution for the IP address 10.1.2.1 (i.e., "MAC2") in its own resolution table 1751 so it will be able to forward packets from the VM 1731 to the VM 1732. At this point, the data packet initially sent by the VM 1731 can be routed for delivery to the VM 1732 and sent onto the physical network towards host 1702.

Figure 18:
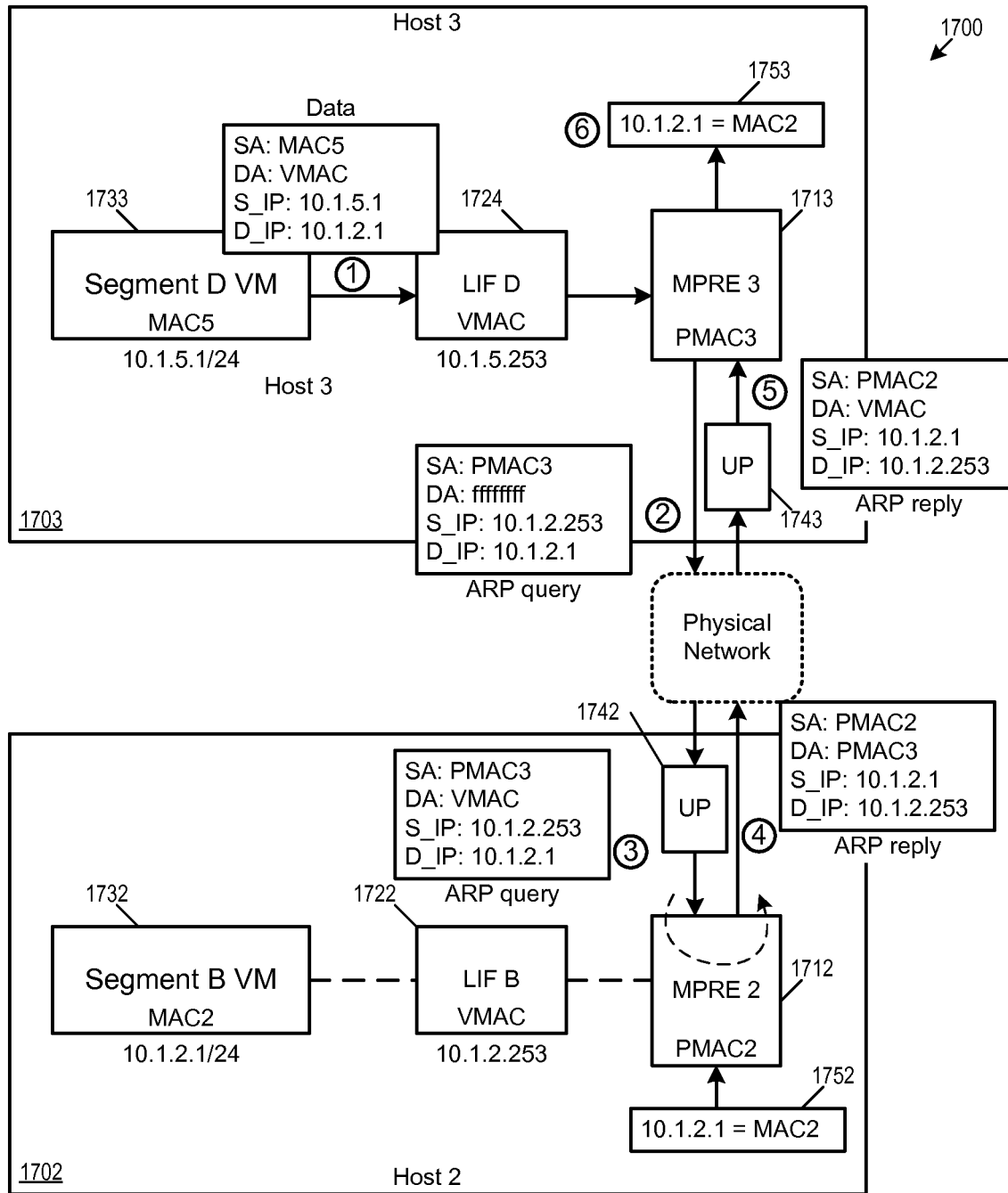
FIG. 18 illustrates a MPRE acting as a proxy for responding to an ARP inquiry that the MPRE is able to resolve.

The MPRE 1712 has to pass on the ARP inquiry because it was not able to resolve the address for the VM 1732 by itself. However, once the MPRE 1712 has received the ARP reply from the VM 1732, it is able to respond to subsequent ARP queries for the address 10.1.2.1 by itself without having to pass on the ARP inquiry. FIG. 18 illustrates the MPRE 1712 in the network 1700 acting as a proxy for responding to an ARP inquiry that the MPRE 1712 is able to resolve.

FIG. 18 illustrates the network 1700, with the host 1702 from the previous figure, as well as another host machine 1703. The ARP resolution table 1752 of the MPRE 1712 in the host 1702 already has an entry for resolving the IP address 10.1.2.1 for the VM 1732. Residing on the host 1703 is a VM 1733 on segment D of the logical network, MPRE 1713 that has a logical interface 1724 for segment D, and an uplink module 1743 for receiving data from the physical network. In addition to the generic VMAC, the MPRE 1713 has a unique physical MAC address "PMAC3". In operations labeled '1' through '6', The figure illustrates an ARP query initiated by the MPRE 1713 from the host machine 1703 for the VM 1732 in segment B.

During operation '1', the VM 1733 with IP address 10.1.5.1 (in segment D) sends a packet to the destination network layer address 10.1.2.1 (in segment B), which requires L3 routing by its MPRE 1713. The VM 1733 already knows that the L2 link layer address of its default gateway is "VMAC" (e.g., from a previous ARP query) and therefore it sends the data packet directly to the MPRE 1713 by using VMAC, as the destination IP is in another segment.

During operation '2', the MPRE 1713 realized that it does not have the L2 link layer address for the destination VM 1732 (e.g., by checking its address resolution table), and thus initiates an ARP query for the destination IP 10.1.2.1. This ARP query uses the unique physical MAC address of the MPRE 1713 ("PMAC3") as the source MAC address and a broadcast MAC address as the destination MAC. The MPRE 1713 have also performed L3 routing on the packet to determine that the destination IP "10.1.2.1" is in segment B, and it therefore changes the source IP to "10.1.2.253" (i.e., the IP address of LIF B). This broadcast ARP message traverses the physical network to reach the host 1702. In addition, though not shown, the broadcast ARP message would also reach the host 1701, as this host has the MPRE 1711.

During operation '3', the broadcasted ARP query arrives at the uplink module 1742 running on the host 1702, which in turn replaces the broadcast MAC address ("ffffffffffff") with the "VMAC" that is generic to all of the MPREs, so that the MPSE in the host 1702 will forward the ARP query to the MPRE 1712. The source address "PMAC3", unique to the sender MPRE 1713, however, stays in the modified ARP query.

During operation '4', the MPRE 1712 examines its own resolution table 1752 and realizes that it is able to resolve the IP address 10.1.2.1 into MAC2. The MPRE therefore sends the ARP reply to destination address "PMAC3" through the physical network, rather than forwarding the ARP query to all of its segment B VMs. The LIF B 1722 and the VM 1732 are not involved in the ARP reply operation in this case.

During operation '5', the uplink module 1743 for the host 1703 translates the unique "PMAC3" into the generic "VMAC" so that the MPSE at the host 1703 will forward the packet locally to the MPRE 1713. Finally at operation '6', the reply message reaches the original inquiring MPRE 1713, which in turn stores the address resolution for the IP address 10.1.2.1 (i.e., "MAC2") in its own resolution table 1753 so it will be able to forward packets from the VM 1733 to the VM 1732. At this point, the data packet initially sent by the VM 1733 can be routed for delivery to the VM 1732 and sent onto the physical network towards host 1702.

Figure 19:
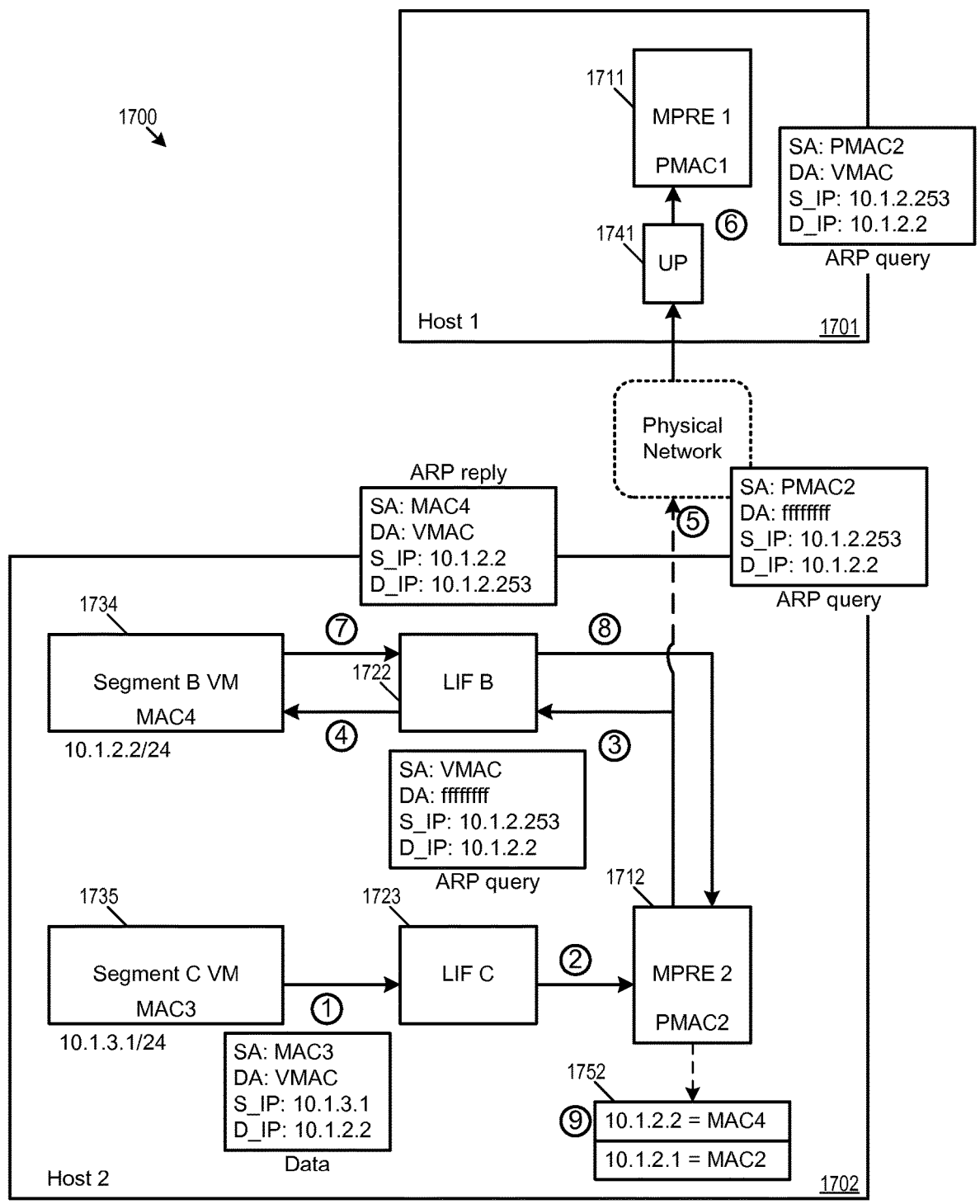
FIG. 19 illustrates the use of unique PMAC in an ARP inquiry for a virtual machine that is in a same host machine as the sender MPRE.

FIGS. 17 and 18 illustrate the use of a unique PMAC in an ARP inquiry for a virtual machine that is in a different host machine than the sender MPRE. However, in some embodiments, this ARP mechanism works just as well for resolving the address of a virtual machine that is operating in the same host machine as the sender MPRE. FIG. 19 illustrates the use of the unique PMAC in an ARP inquiry for a virtual machine that is in the same host machine as the sender MPRE.

FIG. 19 illustrates another ARP inquiry that takes place in the network 1700 of FIG. 17. As illustrated in FIG. 19, also residing in the host 1702, in addition to the MPRE 1712, is another segment B VM 1734 and a segment C VM 1735. The MPRE 1712 has a logical interface 1723 for interfacing with VMs in segment C, such as the VM 1735. FIG. 19 illustrates an ARP operation that is initiated by the MPRE 1712. This ARP operation is initiated because the MPRE 1712 has to route a packet from the VM 1735 in segment C to the VM 1734 in segment B, both of which reside on the host 1702. Unlike the ARP operation illustrated in FIG. 17, in which the initiating MPRE 1711 is inquiring about a VM in another host machine, the ARP operation illustrated in FIG. 19 is for a VM located in the same host machine as the initiating MPRE 1712.

In operations labeled '1' through '9', the figure illustrates an ARP query initiated by the MPRE 1712 for the VM 1734 in segment B. During the operation '1', the VM 1731 with IP address 10.1.3.1 (in segment C) sends a packet to a destination network layer address 10.1.2.2 (in segment B), which requires L3 routing by its MPRE 1712. The VM 1735 already knows that the L2 link layer address of its default gateway is "VMAC" (e.g., from a previous ARP query) and therefore it sends the data packet directly to the MPRE 1712 by using VMAC, as the destination IP is in another segment.

During operation '2', the MPRE 1712 determines that it does not have the L2 link layer address for the destination VM 1734 (e.g., by checking its address resolution table), and thus initiates an ARP query for the destination IP 10.1.2.2 in the network segment B. The ARP query will be broadcasted to all local VMs of the host 1702 on segment B, as well as to other hosts (such as host 1701).

During operation '3', the MPRE 1712 broadcasts the ARP query to local segment B VMs, including the VM 1734 through the LIF B 1722. Since this broadcast is local within the host 1702, the source address remains the generic VMAC. During operation '4', the locally broadcasted (on segment B) ARP query within the host 1702 reaches the VM 1734 and the VM 1734 sends a reply message to the ARP query.

At the same time as operations '3' and '4', the MPRE 1712 during operation '5' also broadcast ARP request to other hosts. This broadcast message uses the broadcast MAC address as its destination MAC and the unique PMAC of the MPRE 1712 "PMAC2" as the source MAC address (e.g., as modified by the uplink before being sent to the physical NIC). The MPRE 1712 have also performed L3 routing on the packet to determine that the destination IP "10.1.2.2" is in segment B, and it therefore changes the source IP to "10.1.2.253" (i.e., the IP address of LIF B). The broadcast ARP in operation '6' reaches the host 1701, whose uplink module 1741 modified the destination MAC into the generic VMAC for its MPRE 1711. However, there will be no ARP reply from other hosts because there will be no match for the IP 10.1.2.2 (although these hosts will forward the ARP on to their segment B VMs, in some embodiments).

During operation '7', the VM 1734 generates the reply message to the ARP query received during operation '4'. The reply message indicates that the L2 address "MAC4" corresponds to the requested L3 network layer address "10.1.2.2", and that the reply is to be sent to the requesting MPRE using its generic MAC address "VMAC". During operation '8', the ARP reply generated by the VM 1734 enters the MPRE 1712 through the LIF B 1722. Finally at operation '9', the MPRE 1712 stores the address resolution for the IP address 10.1.2.2 (i.e., "MAC4") in its own resolution table 1752 so that it will be able to forward packets from the VM 1735 to the VM 1734 (including the initially sent data packet).

Figure 20:
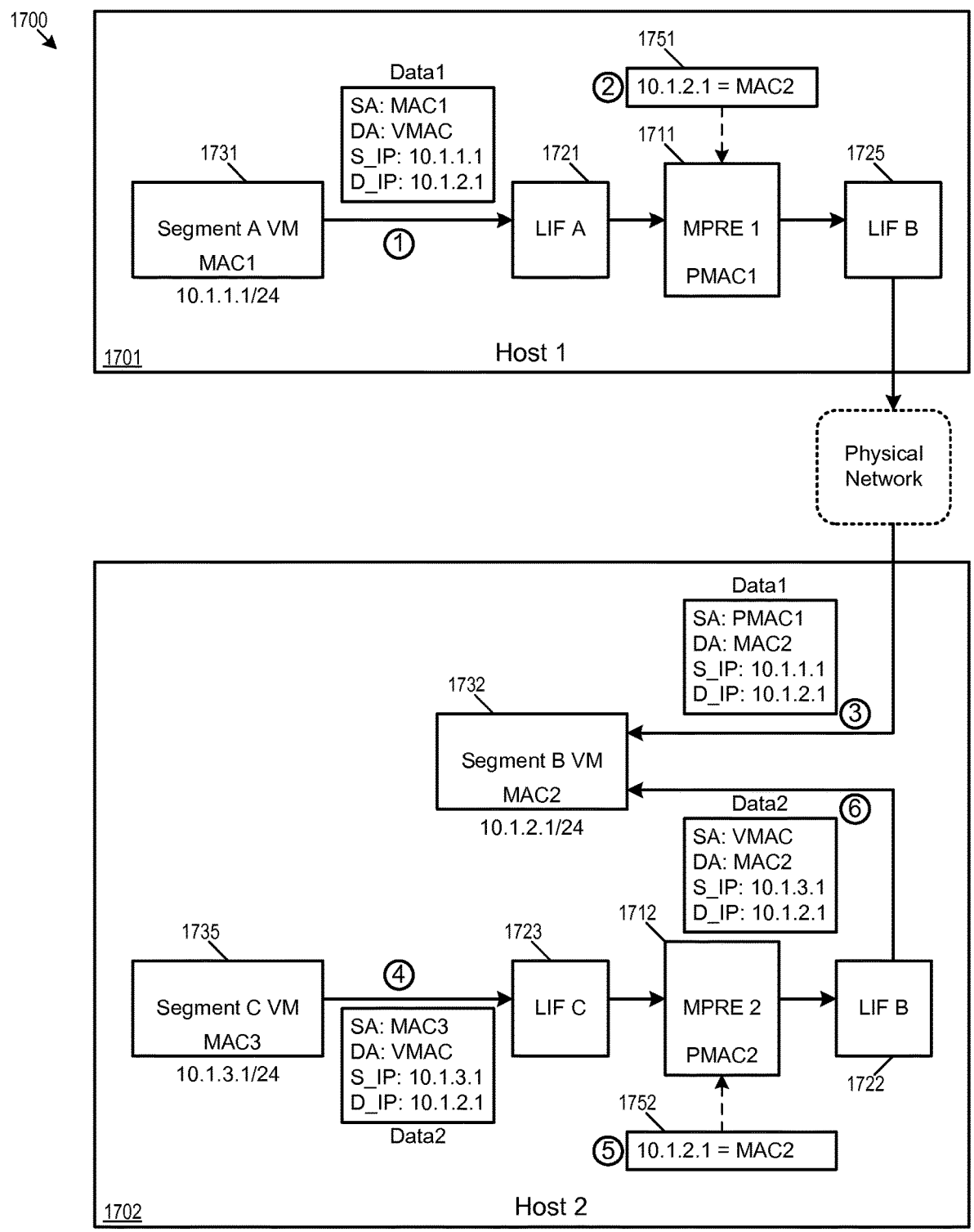
FIGS. 20 and 21 illustrate message passing operations between the VMs of the different segments after the MPREs have updated their resolution tables.
Figure 21:
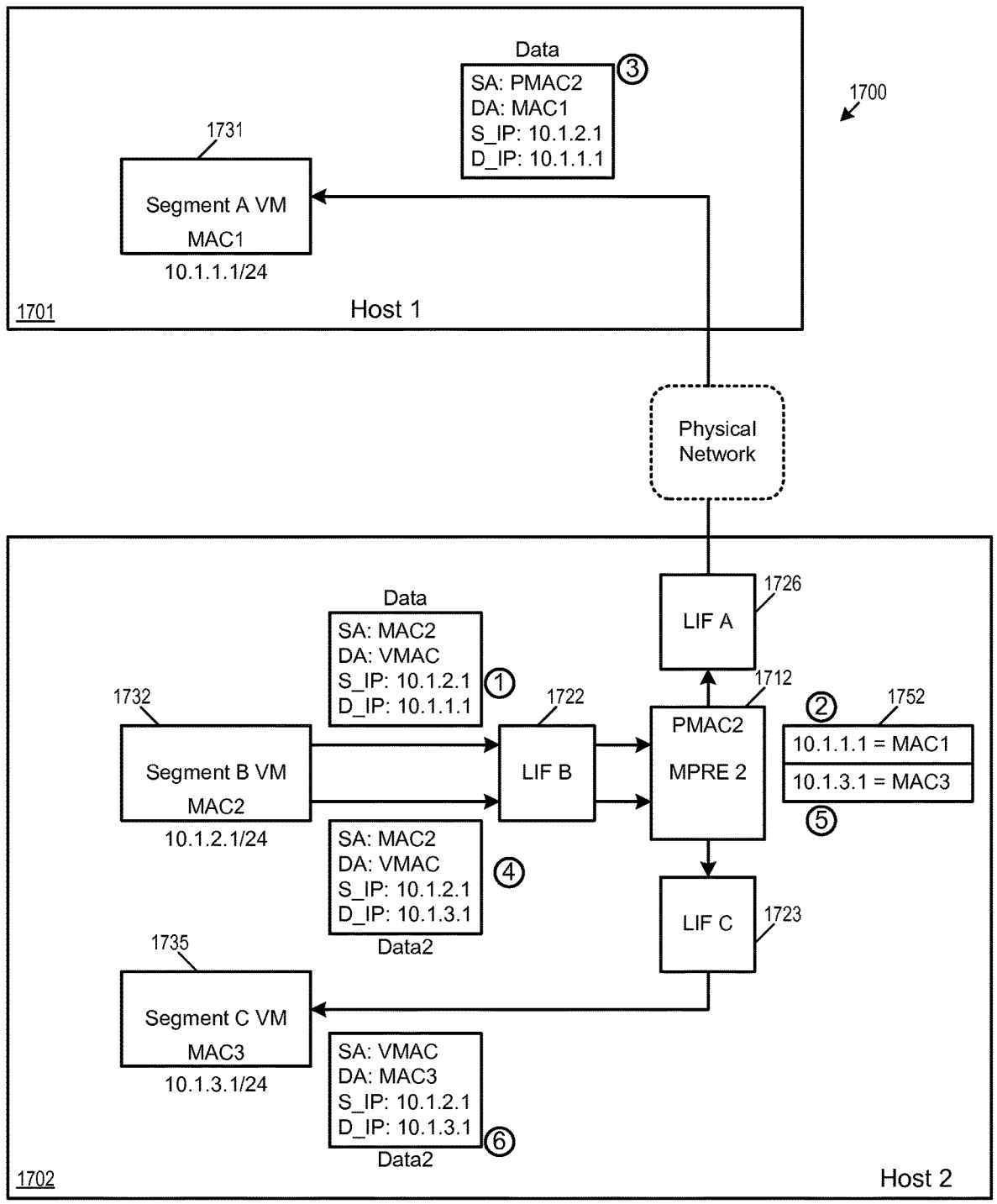

FIGS. 20 and 21 illustrate operations for sending data traffic between the VMs of the different segments after the MPREs have updated their resolution tables. Specifically, FIGS. 20 and 21 illustrates data traffic for the network 1700 between the VMs 1731, 1732, and 1735 after the MPRE 1711 of the host 1701 and the MPRE 1712 have updated their resolution tables by previous ARP queries, as illustrated in FIGS. 17 and 19.

FIG. 20 illustrates the routing of data packets to the segment B VM 1732 from the segment A VM 1731 and the segment C VM 1735. The routing takes place in the MPREs 1711 and 1712, which are the MPREs for the sender VM 1731 and the sender VM 1735, respectively. The MPRE 1711 uses the resolution table 1751 for routing lookup, while the MPRE 1712 uses the resolution table 1752 for routing lookup.

Operations '1' through '3' illustrate the routing of the data packet from the segment A VM 1731 to the segment B VM 1732. During operation '1', the VM 1731 sends a packet to LIF A 1721 of the MPRE 1711 using the generic VMAC. The packet is destined for IP address 10.1.2.1, which is in a different network segment than the VM 1731 (IP address 10.1.1.1), and therefore requires L3 layer routing. During operation '2', the MPRE 1711 resolves the IP address 10.1.2.1 into L2 address "MAC2" and segment B by using an entry in the resolution table 1751 (i.e., as learned by the operations shown in FIG. 17). The MPRE 1711 uses its own unique L2 address "PMAC1" as the source address for the packet sent out onto the physical network. The MPRE 1711 has also identified that the LIF B 1725 as the outbound LIF and use this LIF to send the packet to the host 1702 across the physical network (tagged with the network identifier of segment B). During operation '3', the routed packet has traversed across the physical network and arrived at the destination VM 1732, whose L2 address is "MAC2".

Operations '4' through '6' illustrate the routing of a data packet from the segment C VM 1735 to the segment B VM 1732, in which the data packet does not need to leave the host 1702. During operation '4', the VM 1735 sends a packet to LIF C 1723 of the MPRE 1712 using the generic VMAC as the packet's destination MAC. The packet is destined for IP address 10.1.2.1, which is in a different network segment than the VM 1735 (IP address 10.1.3.1) and therefore requires L3 routing. During operation '5', the MPRE 1712 resolves the IP address 10.1.2.1 into L2 address "MAC2" by using an entry in the resolution table 1752. The MPRE 1712 also uses VMAC as the source L2 MAC address since this packet never leaves the host 1702 for the physical network. The MPRE 1712 has also identified the LIF B 1722 as the outbound LIF and use this LIF to send the packet to the local segment B VM 1732. During operation '6', the data packet arrives at the destination VM 1732, the MAC address of which is "MAC2".

FIG. 21 illustrates the routing of data packets sent from the segment B VM 1732 to the segment A VM 1731 and the segment C VM 1735. The routing takes place in the MPRE 1712, which is the local router instance for the sender VM 1732. The MPRE 1712 relies on the resolution tables 1752 for routing lookup as previously mentioned. The MPRE 1712 has a logical interface 1722 (LIF B) for interfacing with VMs in segment B such as the VM 1732. The MPRE 1712 has a logical interface 1723 (LIF C) for interfacing with VMs in segment C such as the VM 1735. The MPRE 1712 also has a logical interface 1725 (LIF A) for interfacing with VMs in segment A such as the VM 1731.

Operations '1' through '3' illustrate the routing of the data packet from the segment B VM 1732 to the segment A VM 1731. During operation '1', the VM 1732 sends a packet to LIF B 1722 of the MPRE 1712 using the generic VMAC as destination MAC. The packet is destined for IP address 10.1.1.1, which is in a different network segment than the VM 1732 (IP address 10.1.2.1) and requires L3 layer routing. The data packet enters the MPRE 1712 through the use of the LIF B 1722 as the inbound LIF. During operation '2', the MPRE 1712 resolves the IP address 10.1.1.1 into L2 address "MAC1" by using an entry in the resolution table 1752. The MPRE 1711 has also identified that the LIF A 1726 as the outbound LIF and uses LIF A to send the packet to the host 1701 across the physical network (tagged with VNI of segment A). In some embodiments, the MPRE 1711 also replaces the generic "VMAC" with its own unique L2 address "PMAC2" as the source MAC address. During operation '3', the routed packet arrives at the destination VM 1731, the MAC address of which is "MAC1".

Operations '4' through '6' illustrate the routing of the data packet from the segment B VM 1732 to the segment C VM 1735. During operation '4', the VM 1732 sends a packet to LIF B 1722 of the MPRE 1712 using the generic VMAC as the packet's destination MAC address. The packet is destined for IP address 10.1.3.1, which is in a different network segment than the VM 1732 (IP address 10.1.2.1) and therefore requires L3 routing. During operation '5', the MPRE 1712 resolve the IP address 10.1.3.1 into L2 address "MAC3" by using an entry in the resolution table 1752. Since the destination L2 address "MAC3" indicates a virtual machine that operates in the same host machine (the host 1702) as the MPRE 1712, MPRE will not send the data packet on to the physical network in some embodiments. The MPRE 1712 also uses VMAC as the source L2 MAC address since this packet never leaves the host 1702 for the physical network. The MPRE 1712 has also identified that the LIF C 1723 as the outbound LIF and use this LIF to send the packet to the local segment C VM 1735. During operation '6', the packet arrives at the destination VM 1735, the MAC address of which is "MAC3".

Figure 22:
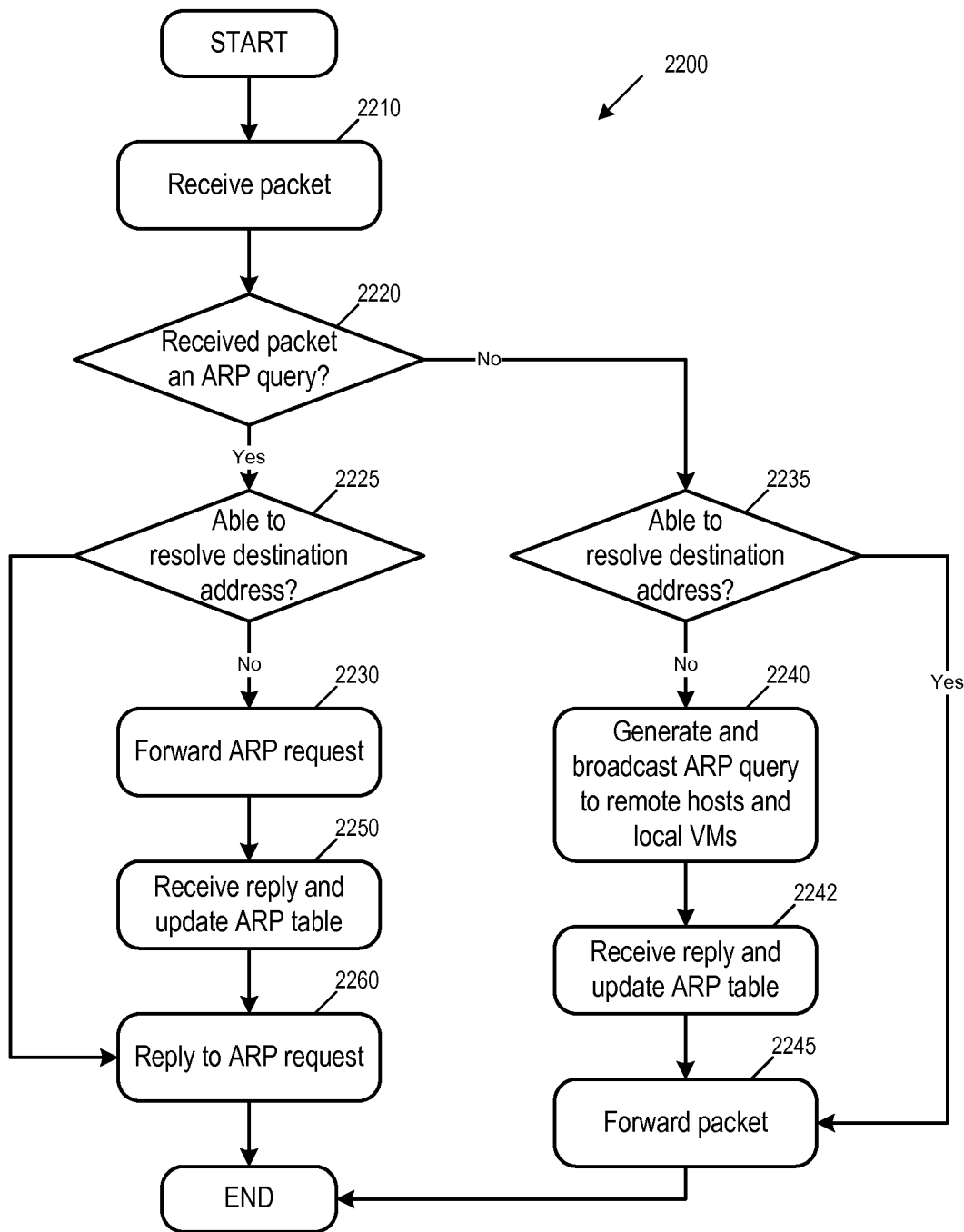
FIG. 22 conceptually illustrates a process for handling address resolution for incoming data packet by using MPREs.

For some embodiments, FIG. 22 conceptually illustrates a process 2200 performed by a MPRE instantiation of some embodiments for handling address resolution for an incoming data packet. The process 2200 begins when it receives (at 2210) a data packet (e.g., from the MPSE). This data packet can be a regular data packet that needs to be routed or forwarded, or an ARP query that needs a reply. Next, the process determines (at 2220) whether the received packet is an ARP query. If the data packet is an ARP query, the process proceeds to 2225. Otherwise, the process proceeds to 2235.

At 2225, the process determines whether it is able to resolve the destination address for the ARP query. In some embodiments, the process examines its own ARP resolution table to determine whether there is a corresponding entry for resolving the network layer IP address of the packet. If the process is able to resolve the address, it proceeds to 2260. If the process is unable to resolve the address, it proceeds to 2230.

At 2230, the process forwards the ARP query. If the ARP request comes from the physical network, the process forwards the ARP query to VMs within the local host machine. If the ARP request comes from a VM in the local host machine, the process forwards the request to other VMs in the local host machine as well as out to the physical network to be handled by MPREs in other host machines. The process then wait and receives (at 2250) an ARP reply and update its ARP resolution table based on the reply message. The process 2200 then replies (at 2260) to the ARP query message and ends.

At 2235, the process determines whether it is able to resolve the destination address for incoming data packet. If there process is able to resolve the destination address (e.g., having a matching ARP resolution table entry), the process proceeds to 2245. Otherwise, the process proceeds to 2240.

At 2240, the process generates and broadcast an ARP query to remote host machines as well as to local virtual machines through its outbound LIFs. The process then receives (at 2242) the reply for its ARP query and updates its ARP table. The process 2200 then forwards (at 2245) the data packet according to the resolved MAC address and ends.

C. VDR as a Routing Agent for a Non-VDR Host Machine

In some embodiments, not all of the host machines that generate and accept network traffic on the underlying physical network run virtualization software and operate VDRs. In some embodiments, at least some of these hosts are physical host machines that do not run virtualization software at all and do not host any virtual machines. Some of these non-VDR physical host machines are legacy network elements (such as filer or another non-hypervisor/non-VM network stack) built into the underlying physical network, which used to rely on standalone routers for L3 layer routing. In order to perform L3 layer routing for these non-VDR physical host machines, some embodiments designate a local LRE instantiation (i.e., MPRE) running on a host machine to act as a dedicated routing agent (designated instance or designated MPRE) for each of these non-VDR host machines. In some embodiments, L2 traffic to and from such a non-VDR physical host are handled by local instances of MPSEs (e.g., 320) in the host machines without having to go through a designated MPRE.

Figure 23:
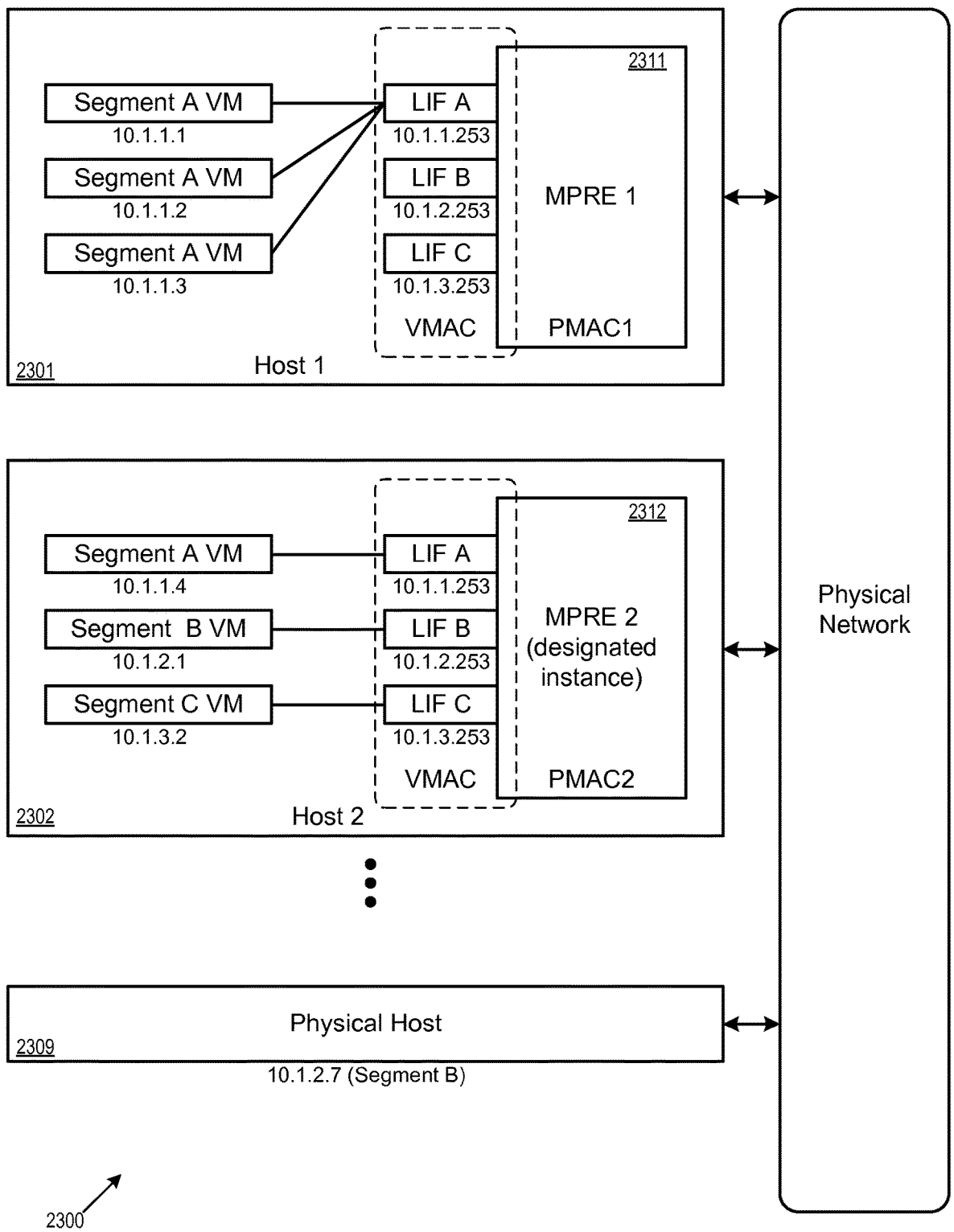
FIG. 23 illustrates a logical network that designates a MPRE for handing L3 routing of packets to and from a physical host.

FIG. 23 illustrates an implementation of a logical network 2300 that designates a MPRE for handling L3 routing of packets to and from a physical host. As illustrated, the network 2300 includes host machines 2301-2309. The host machine 2301 and 2302 are running virtualization software that operates MPREs 2311 and 2312, respectively (other host machines 2303-2308 running MPREs 2313-2318 are not shown). Both host machines 2301 and 2302 are hosting a number of virtual machines, and each host machine is operating a MPRE. Each of these MPREs has logical interfaces for segments A, B, and C of the logical network 2300 (LIF A, LIF B, and LIF C). All MPREs share a generic "VMAC" when addressed by a virtual machine in its own host. Both MPREs 2311 and 2312 also have their own unique PMACs ("PMAC1" and "PMAC2").

The host machine 2309 is a physical host that does not run virtualization software and does not have its own MPRE for L3 layer routing. The physical host 2309 is associated with IP address 10.1.2.7 and has a MAC address "MAC7" (i.e., the physical host 2309 is in network segment B). In order to send data from the physical host 2309 to a virtual machine on another network segment, the physical host must send the data (through the physical network and L2 switch) to the MPRE 2312, which is the designated MPRE for the physical host 2309.

Figure 24:
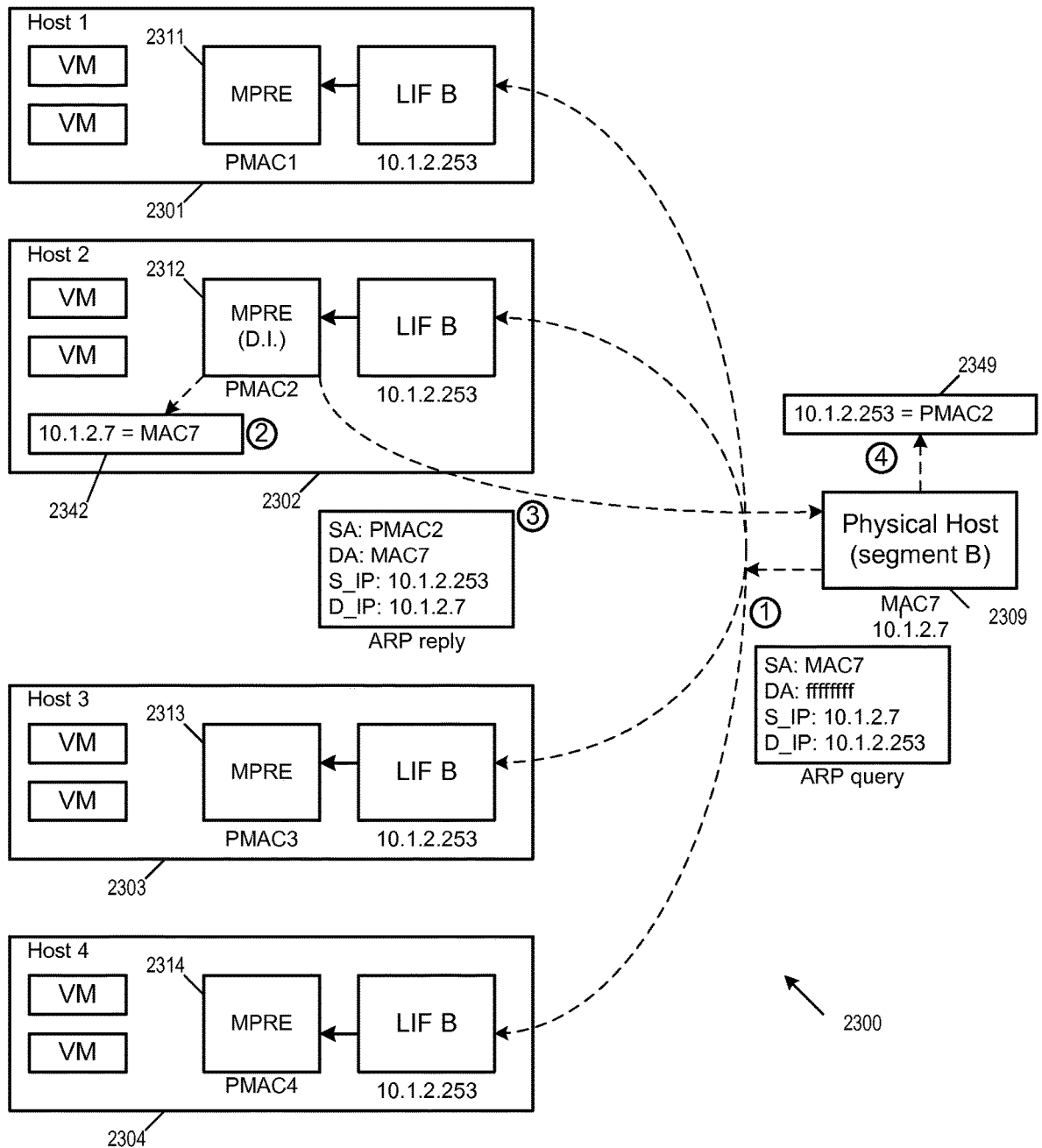
FIG. 24 illustrates an ARP operation initiated by a non-VDR physical host in a logical network.

FIG. 24 illustrates an ARP operation initiated by the non-VDR physical host 2309 in the logical network 2300. As illustrated, each of the host machines 2301-2304 in the logical network 2300 has a MPRE (2311-2314, respectively), and each MPRE has a unique PMAC address ("PMAC3" for MPRE 2313, "PMAC4" for MPRE 2314). Each MPRE has a logical interface for segment B (LIF B) with IP address 10.1.2.253. However, only the MPRE 2312 in the host machine 2302 is the "designated instance", and only it would respond to an ARP query broadcast message from the physical host 2309.

The ARP operation is illustrated in operations '1', '2', '3', and '4'. During operation '1', the physical host 2309 broadcasts an ARP query message for its default gateway "10.1.2.253" over the physical network. As mentioned, the IP address 10.1.2.253 is associated with LIF B, which exists on all of the MPREs 2311-2314. However, only the MPRE 2312 of the host 2302 is the designated instance for the physical host 2309, and only the MPRE 2312 would respond to the ARP query. In some embodiments, a controller (or cluster of controllers) designates one of the MPREs as the designated instance for a particular segment, as described below in Section III.

During operation '2', the MPRE 2312 receives the ARP query message from the physical host 2309 and records the MAC address of the physical host in a resolution table 2342 for future routing. All other MPREs (2301, 2302, and 2303) that are not the designated instance for the physical host 2309 ignore the ARP. In some embodiments, these other MPREs would nevertheless record the MAC address of the physical host in their own resolution tables.

During operation '3', the MPRE 2312 sends the ARP reply message to the physical host 2309. In this reply to the non-VDR physical host, the source MAC address is the unique physical MAC address of the MPRE 2312 itself ("PMAC2") rather than the generic VMAC. This is so that the physical host 2309 will know to only communicate with the MPRE 2312 for L3 routing, rather than any of the other MPRE instantiations. Finally, at operation '4', the physical host 2309 records the unique physical MAC address ("PMAC2") of its default gateway in its resolution table 2349. Once the designated instance and the physical host 2309 have each other's MAC address, message exchange can commence between the physical host and the rest of the logical network 2300.

Figure 25:
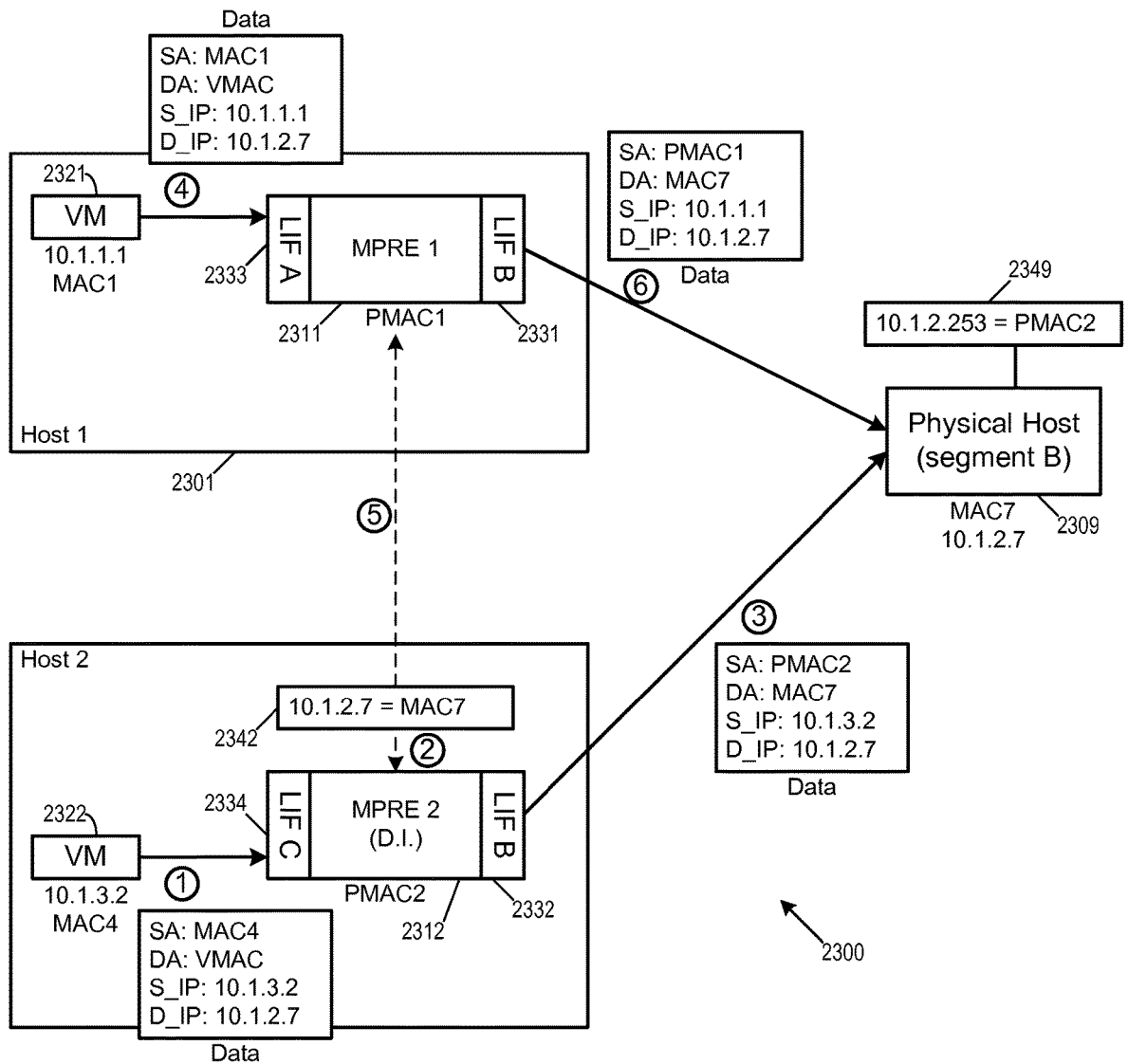
FIG. 25 illustrates the use of the designated MPRE for routing of packets from virtual machines on different hosts to a physical host.

FIG. 25 illustrates the use of the designated MPRE 2312 for routing of packets from virtual machines 2321 and 2322 to the physical host 2309. As illustrated, the VM 2321 with IP address 10.1.1.1 (segment A) and MAC address "MAC1" is running on the host 2301, and the VM 2322 with IP address 10.1.3.2 (segment C) and MAC address "MAC4" is running on the host 2302. The physical host 2309 has IP address 10.1.2.7 (segment B) and MAC address "MAC7". Since the physical host 2309, the VM 2321, and the VM 2322 are all in different segments of the network, data packets that traverse from the VMs 2321 and 2322 to the physical host 2309 must go through L3 routing by MPREs. It is important to note that the MPRE for the VM 2322 is the designated MPRE (the MPRE 2312) for the physical host 2309, while the MPRE for the VM 2321 (the MPRE 2311) is not.

FIG. 25 illustrates the routing of a packet from the VM 2322 to the physical host 2309 in three operations labeled '1', '2', and '3'. During operation '1', the segment C VM 2322 sends a packet to the MPRE 2312 through its LIF C 2334. The data packet uses the generic "VMAC" as the destination MAC address in order for the MPSE on the host 2302 to forward the packet to the MPRE 2312. The destination IP address is 10.1.2.7, which is the IP address of the physical host 2309.

During operation '2', the MPRE 2312 uses an entry of its address resolution table 2342 to resolve the destination IP address 10.1.2.7 into the MAC address "MAC7" of the physical host 2309. The MPRE 2312 also uses as the source MAC address its own unique physical MAC address "PMAC2" as opposed to the generic "VMAC", as the data packet is sent from the host machine onto the physical network. In operation '3', the MPRE 2312 sends the data packet using its logical interface for segment B (LIF B 2332). The routed data packet is forwarded (through physical network and L2 switch) to the physical host 2309 using its resolved L2 MAC address (i.e., "MAC7"). It is worth noting that, when the packet arrives at the physical host 2309, the source MAC address will remain "PMAC2", i.e., the unique physical MAC of the designated instance. In some embodiments, the physical host will not see the generic "VMAC", instead communicating only with the "PMAC2" of the designated MPRE.

FIG. 25 also illustrates the routing of a packet from the VM 2321 to the physical host 2309 in operations labeled '4', '5, and '6'. Unlike the VM 2322, the MPRE (2311) of the VM 2321 is not the designated instance. Nevertheless, in some embodiments, a virtual machine whose MPRE is not the designated instance of a physical host still uses its own MPRE for sending a routed packet to the physical host.

During operation '4', the segment A VM 2321 sends a packet to the MPRE 2311 through its LIF A 2333. The data packet uses the generic "VMAC" as the MAC address for the virtual router to route the packet to the MPRE 2311. The destination IP address is 10.1.2.7, which is the IP address of the physical host 2309.

During operation '5', the MPRE 2311 determines that the destination IP address 10.1.2.7 is for a physical host, and that it is not the designated MPRE for the physical host 2309. In some embodiments, each MPRE instantiation, as part of the configuration of its logical interfaces, is aware of whether it is the designated instance for each particular LIF. In some embodiments, the configuration also identifies which MPRE instantiation is the designated instance. As a result, the MPRE 2311 would try to obtain the resolution information from the designated MPRE 2312. In some embodiments, a MPRE that is not a designated instance for a given physical host would send a query (e.g. over a UDP channel) to the host that has the designated MPRE, asking for the resolution of the IP address. If the designated instance has the resolution information, it would send the resolution information back to the querying MPRE (e.g., over the same UDP channel). If the designated MPRE cannot resolve the IP address of the physical host itself, it would initiate an ARP request for the IP of the physical host, and send the resolution back to the querying MPRE. In this example, the MPRE 2311 would send a querying message to the host 2302 (i.e., to the MPRE 2312), and the host 2302 would send back the resolved MAC address (from its resolution table 2342) for the physical host 2309 to the MPRE 2311.

During operation '6', the MPRE 2311 uses the resolved destination MAC address to send the data packet to physical host 2309 through its LIF B 2331. In some embodiments, the MPRE 2311 also stores the resolved address for the physical host IP 10.1.2.7 in its address resolution table. The source MAC address for the data packet is the unique PMAC of the MPRE 2311 ("PMAC1") and not the generic MAC nor the PMAC of the designated instance. Because this is a data traffic packet rather than an ARP packet, the physical host will not store PMAC1 as the MAC address to which to send packets for segment B VMs. The routed data packet is forwarded to the physical host 2309 (through physical network and L2 switch) using its resolved L2 MAC address ("MAC7").

Figure 26A:
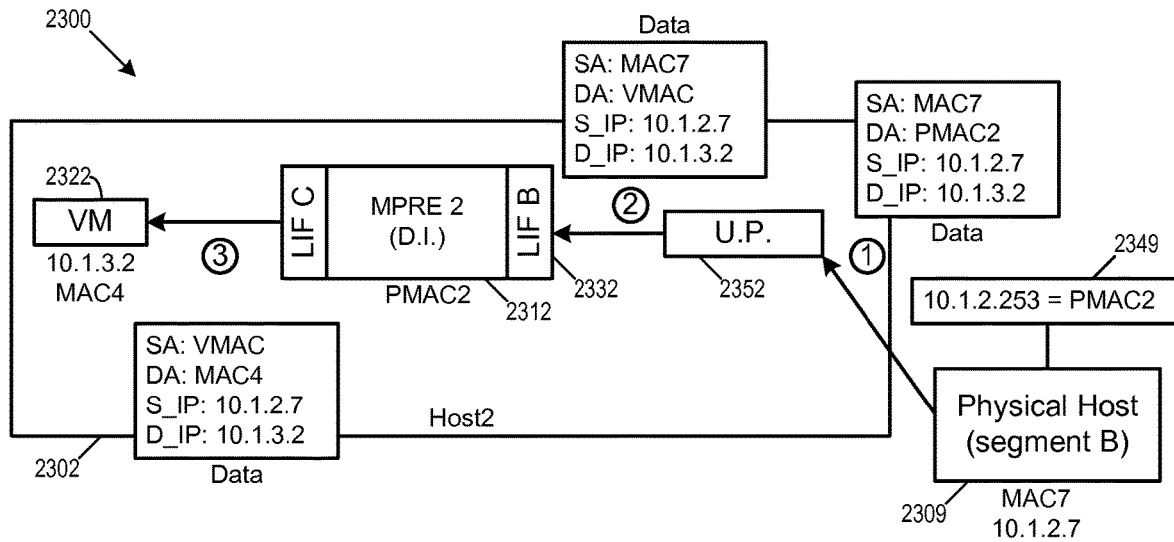
FIGS. 26a-b illustrates the use of the designated MPRE for routing of packets from a physical host to the virtual machines on different hosts.
Figure 26B:
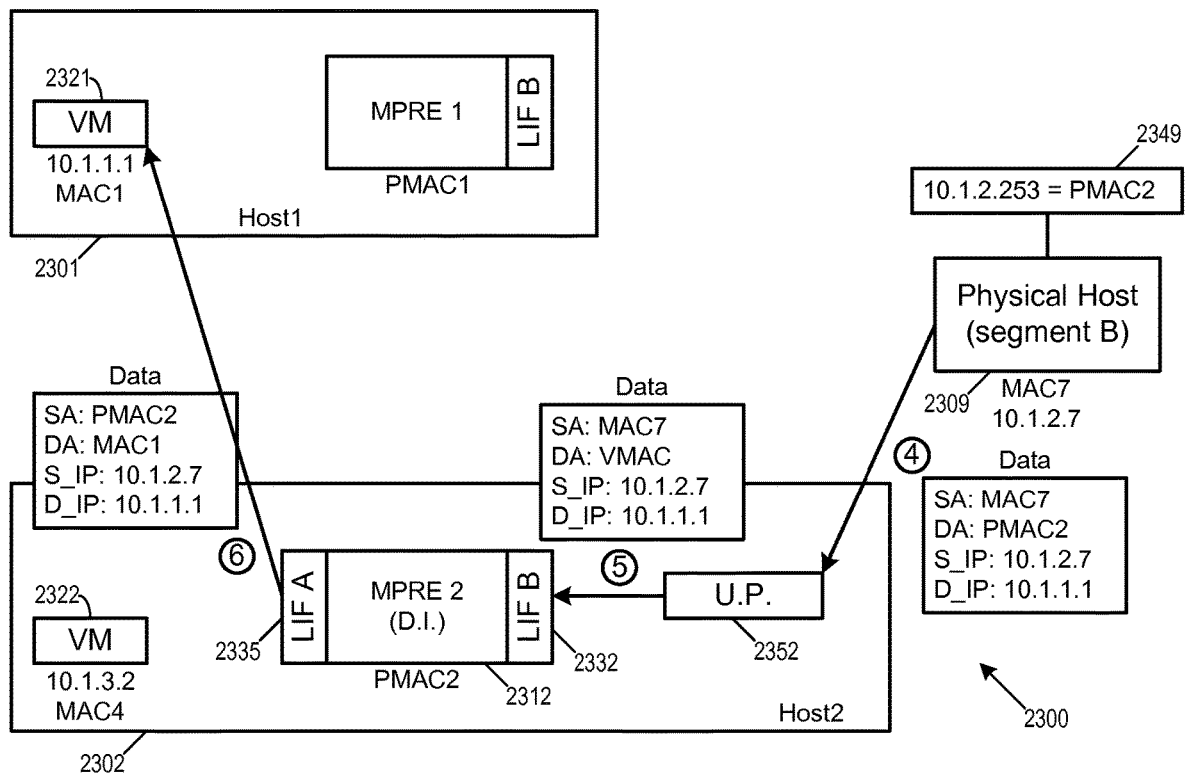

FIGS. 26*a-b* illustrate the use of the designated MPRE 2312 for routing of packets from the physical host 2309 to the virtual machines 2321 and 2322. As mentioned, the physical host 2309 (with segment B IP address 10.1.2.7) is on a different segment than the virtual machines 2321 and 2322, so the data packet from the physical host to these virtual machines must be routed at the network layer. In some embodiments, a designated MPRE for a particular physical host is always used to perform L3 routing on packets from that particular physical host, or for all hosts on a particular segment. In this example, the MPRE 2312 is the designated MPRE for routing data packet from any physical hosts on segment B, including the physical host 2309, to both the VM 2321 and 2322, even though only the VM 2322 is operating in the same host machine 2302 as the designated MPRE 2312.

FIG. 26*a* illustrates the routing of a data packet from the physical host 2309 to the VM 2322 in three operations labeled '1', '2', and '3'. In operation '1', the physical host 2309 sends a packet to the host 2302. This packet is destined for the VM 2322 with IP address 10.1.3.2, which is in segment C. Based on an entry in its resolution table 2349 (created by the ARP operation of FIG. 24), the MPRE resolves the default gateway IP address 10.1.2.253 as "PMAC2", which is the unique physical MAC address of the MPRE 2312. The packet arrives at the uplink module 2352 of the host 2302 through the physical network.

In operation '2', the uplink module 2352 changes the unique "PMAC2" to the generic VMAC so the packet can be properly forwarded once within host 2302. The packet then arrives at the MPRE 2312 and is handled by the LIF B 2332 of the MPRE 2312.

In operation '3', the MPRE 2312 resolves the IP address 10.1.3.2 as "MAC4" for the VM 2322, using information in its address resolution table, and sends the data packet to the VM 2322. The MPRE 2312 also replaces the source MAC address "MAC7" of the physical host 2309 with the generic VMAC.

FIG. 26*b* illustrates the routing of a data packet from the physical host 2309 to the VM 2321 in three operations labeled '4', '5', and '6'. In operation '4', the physical host 2309 sends a packet through the physical network to the host 2302, which operates the designated MPRE 2312. This packet is destined for the VM 2321 with IP address 10.1.1.1, which is in segment A. The packet is addressed to the L2 MAC address "PMAC2", which is the unique physical MAC address of the designated MPRE 2312 based on an entry in the resolution table 2349. It is worth noting that the destination VM 2321 is on the host machine 2301, which has its own MPRE 2311. However, the physical host 2309 still sends the packet to the MPRE 2312 first, because it is the designated instance for the physical host rather than the MPRE 2311. The packet arrives at the uplink module 2352 of the host 2302 through the physical network.

In operation '5', the uplink module 2352 changes the unique "PMAC2" to the generic VMAC so the packet can be properly forwarded once within host 2302. The packet then arrives at the MPRE 2312 and is handled by the LIF B 2332 of the MPRE 2312.

In operation '6', the MPRE 2312 resolves the IP address 10.1.1.1 as "MAC1" for the VM 2321 and sends the data packet to the VM 2321 by using its LIF A 2335. The routed packet indicates that the source MAC address is "PMAC2" of the designated MPRE 2312. Since the MPRE 2312 and the destination VM 2321 are on different host machines, the packet is actually sent through a MPSE on host 2302, then the physical network, and then a MPSE on the host 2301, before arriving at the VM 2321.

As discussed above by reference to FIGS. 25 and 26, routing for data traffic from the virtual machines to the physical host is performed by individual MPREs, while the data traffic from the physical host to the virtual machines must pass through the designated MPRE. In other words, the network traffic to the physical host is point to point, while network traffic from the physical host is distributed. Though not illustrated in the logical network 2300 of FIGS. 23-20, an implementation of a logical network in some embodiments can have multiple non-VDR physical hosts. In some embodiments, each of these non-VDR physical hosts has a corresponding designated MPRE in one of the host machines. In some embodiments, a particular MPRE would serve as the designated instance for some or all of the non-VDR physical hosts. For instance, some embodiments designated a particular MPRE for all physical hosts on a particular segment.

Figure 27:
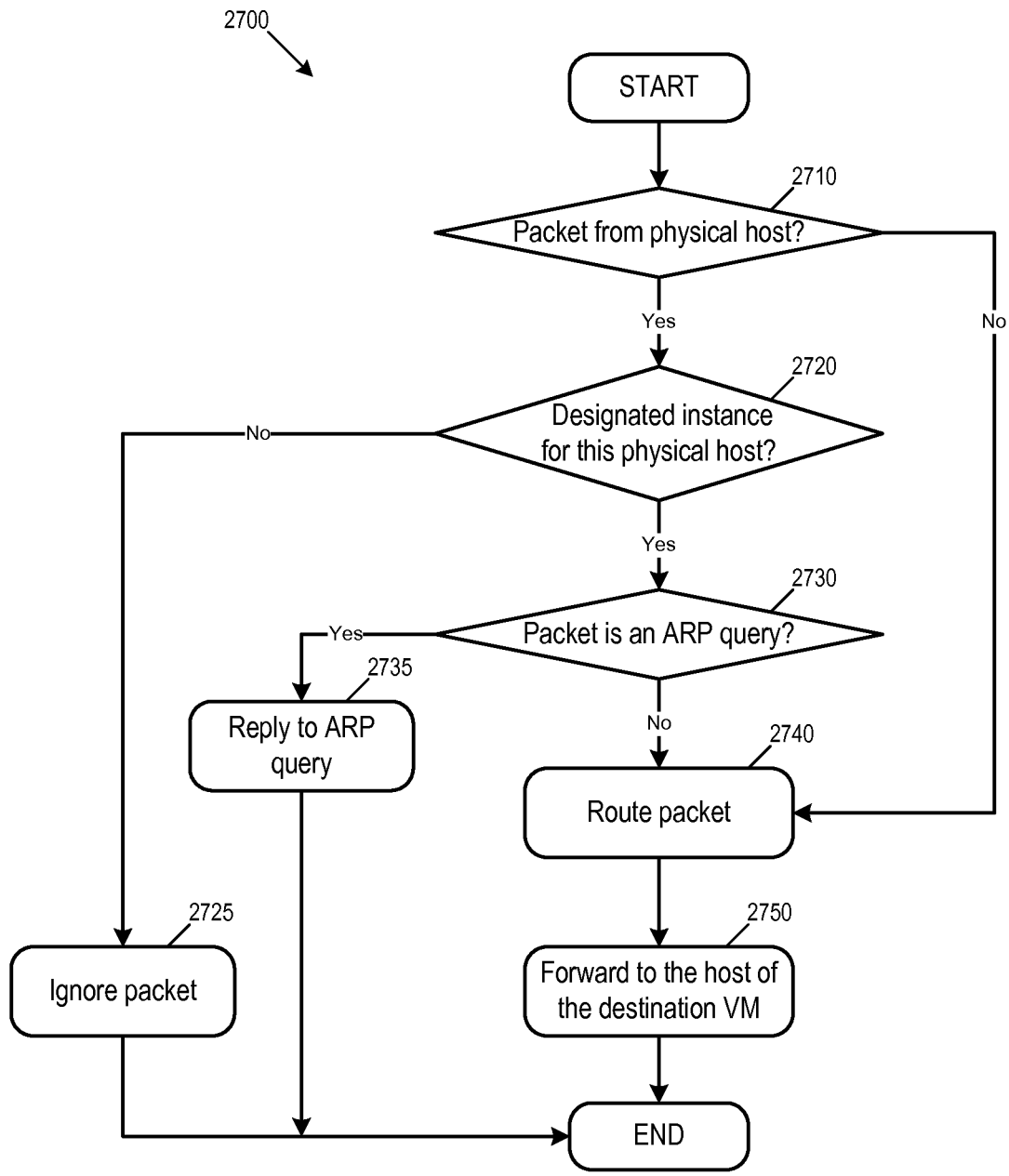
FIG. 27 conceptually illustrates a process for handling L3 layer traffic from a non-VDR physical host.

For some embodiments, FIG. 27 conceptually illustrates a process 2700 for handling L3 layer traffic from a non-VDR physical host. In some embodiment, the process 2700 is performed by a MPRE module within virtualization software running on a host machine. In some embodiments, this process is performed by MPREs 2311 and 2312 during the operations illustrated in FIGS. 26*a-b*.

The process 2700 starts when a host receives a data packet that requires L3 routing (i.e., a packet that comes from one segment of the network but is destined for another segment of the network). The process 2700 determines (at 2710) if the packet is from a non-MPRE physical host. In some embodiments, a MPRE makes this determination by examining the IP address in the data packet against a list of physical hosts and their IP addresses. In some embodiments, such a list is part of a set of configuration data from controllers of the network. If the packet is not from a known physical host, the process proceeds to 2740.

At 2720, the process determines if the MPRE is the designated instance for the physical host that sends the data packet. In some embodiments, each MPRE is configured by network controllers, and some of the MPREs are configured as designated instances for physical hosts. A MPRE in some of these embodiments would examine its own configuration data to see if it is the designated instance for the physical host as indicated in the data packet. In some other embodiments, each MPRE locally determines whether it is the designated instance for the indicated physical host by e.g., hashing the unique identifiers (e.g., the IP addresses) of the physical host and of itself. If the MPRE is not the designated instance for the particular physical host, the process ignores (at 2725) the data packet from the physical host and ends. Otherwise, the process proceeds to 2730.

At 2730, the process determines if the incoming data packet is an ARP query. If so, the process replies (at 2735) to the ARP query with the unique physical MAC of the MPRE and ends (e.g., as performed by the MPRE 2312 in FIG. 24). Otherwise, the process proceeds to 2740.

At 2740, the process performs L3 routing on the data packet by, e.g., resolving the destination's L3 IP address into its L2 MAC address (either by issuing an ARP query or by using a stored ARP result from its resolution table). The process then forwards (at 2750) the routed data packet to the destination virtual machine based on the resolved destination MAC address. If the destination VM is on the same host machine as the MPRE, the data packet will be forwarded to the VM through the MPSE on the host. If the destination VM is on a different host, the data packet will be forwarded to the other host through the physical network. After forwarding the packet, the process 2700 ends.

Figure 28:
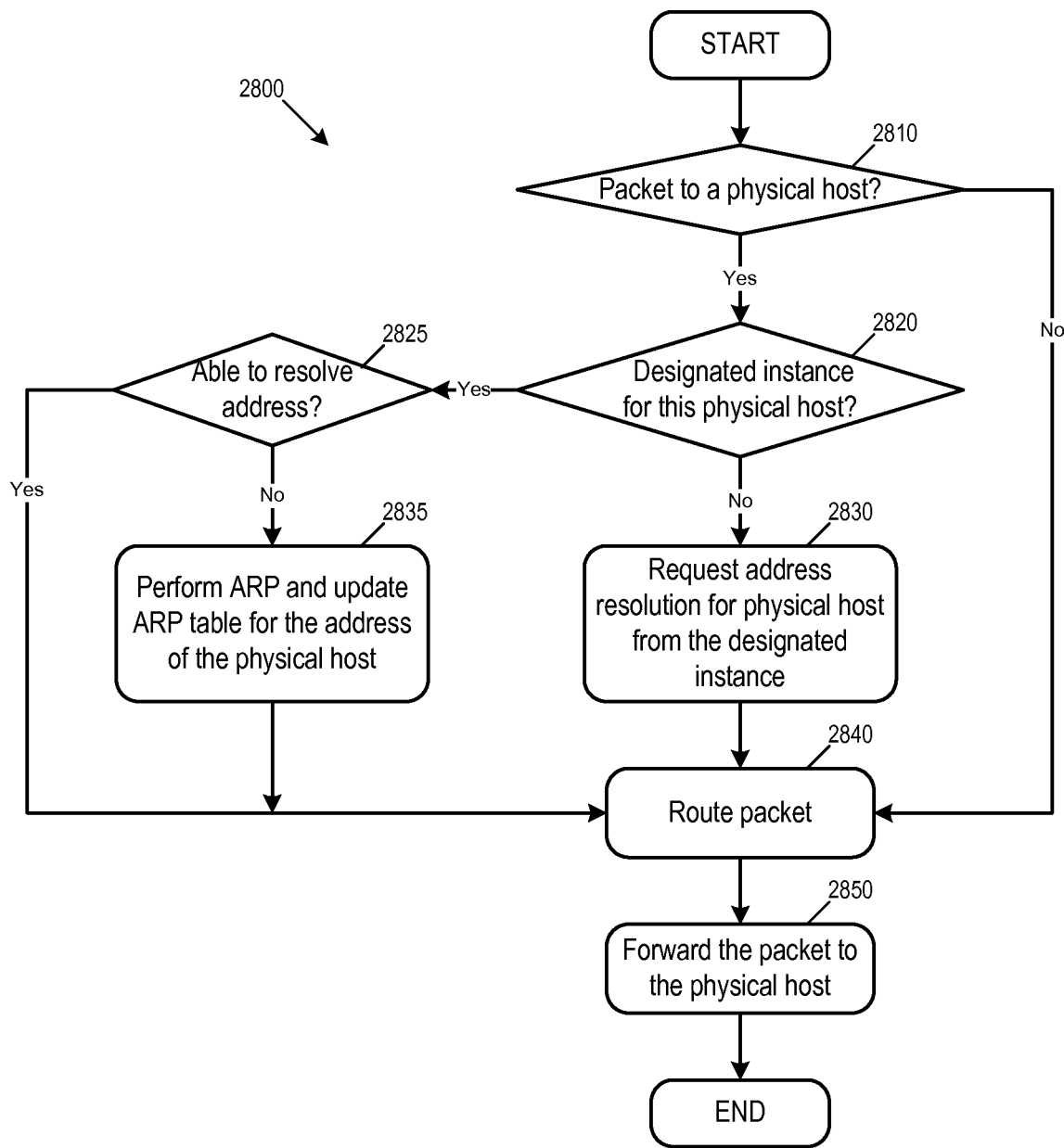
FIG. 28 conceptually illustrates a process 2800 for handling L3 layer traffic to a non-VDR physical host.

For some embodiments, FIG. 28 conceptually illustrates a process 2800 for handling L3 traffic to a non-VDR physical host (i.e., received from a VM on the same host as the MPRE performing the process). In some embodiments, this process is performed by MPREs 2311 and 2312 during the operations illustrated in FIG. 25.

The process 2800 starts when a host receives a data packet that requires L3 routing. The process 2800 determines (at 2810) if the packet is destined for a non-VDR physical host. If the packet is not destined for such a physical host, the process proceeds to 2840. If the packet is destined for such a physical host, the process proceeds to 2820.

At 2820, the process determines if the MPRE is the designated instance for the physical host to which the data packet is sent (e.g., based on the segment of which the physical host is a part). If so, the process proceeds to 2825. If the MPRE is not the designated instance, the process proceeds to 2830.

At 2830, the process request and obtain address resolution information from the designated instance. In some embodiments, this is accomplished by sending a request message through a UDP channel to the designated instance and receiving the address resolution information in a reply message. In some embodiments, a MPRE that is not the designated instance does not store address resolution information for the physical host, and sends requests through the UDP channel for each packet sent to the physical host. In other embodiments, after receiving the address resolution information, the MPRE stores this information for use in routing future packets.

At 2825, the process determines whether, as the designated instance, it is able to resolve the address for the physical host. In some embodiments, the process examines its own ARP table to see if there is a matching entry for the physical host. If the process is able to resolve the address, the process proceeds to 2840. Otherwise the process performs (at 2735) ARP request for the address of the physical host and update its ARP table upon the ARP reply. In some embodiments, only the designated instance keeps routing information for the physical host. The process then proceeds to 2840.

At 2840, the process performs L3 routing on the data packet by e.g., resolving the physical host's IP address to its MAC address. The process also sets the source MAC address to the unique PMAC of the MPRE, whether or not the MPRE is the designated instance for the physical host indicated in the data packet. The process then forwards (at 2850) the routed data packet to the physical host based on the resolved destination MAC address. After forwarding the packet, the process 2800 ends.

D. Using VDR as Bridge Between Different Overlay Networks

In some embodiment, a LRE operating in a host machine not only performs L3 routing (e.g., from one IP subnet to another IP subnet), but also bridging between different overlay networks (such as between a VXLAN network and a VLAN network) within the same subnet. In some embodiments, it is possible for a two different overlay networks to have VMs that are in the same IP subnet. In these circumstances, L3 routing is not used to send data packets from one overlay network to another. Instead, the forwarding relies on bridging, which is based on binding or pairing between a network segment identifier (e.g., a VNI, or its associated logical interface) and a link layer address (e.g., MAC address).

In some embodiments, at least one local LRE instantiation in a host machine is configured as a bridging MPRE rather than as a routing MPRE. A bridging MPRE is an MPRE that includes logical interfaces configured for bridging rather than for routing. A logical interface configured for routing (routing LIFs) perform L3 routing between different segments of the logical network by resolving IP into MAC addresses. A logical interface configured for bridging (bridging LIFs) performs bridging by binding MAC address with a network segment identifier (e.g., VNI) or a logical interface, and modifying the network segment identifier of packets when sending the packets from one network segment to another.

Figure 29:
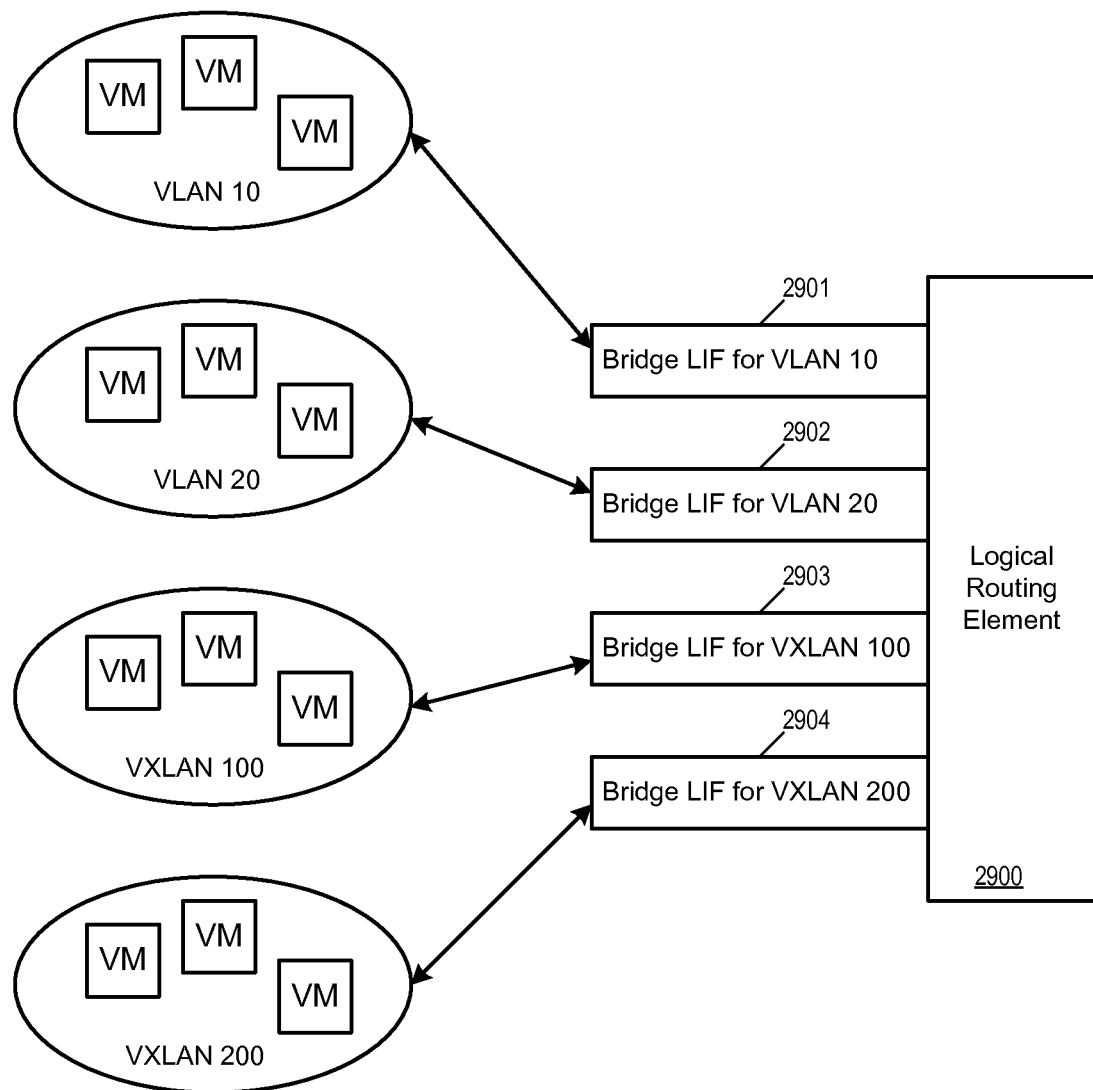
FIG. 29 illustrates a LRE that includes bridge LIFs for serving as a bridge between different overlay networks.

FIG. 29 illustrates a LRE 2900 that includes bridge LIFs for serving as a bridge between different overlay networks. The logical interfaces 2901-2904 of the LRE 2900 are configured as bridge LIFs. Specifically, the bridge LIF 2901 is for learning and bridging MAC addresses in the overlay network "VLAN10", the bridge LIF 2902 is for learning and bridging MAC addresses in the overlay network "VLAN20", the bridge LIF 2901 is for learning and bridging MAC addresses in the overlay network "VXLAN100", and the bridge LIF 2901 is for learning and bridging MAC addresses in the overlay network "VXLAN200". As illustrated, at least some of the VMs in the different overlay networks are in the same IP subnet "192.168.1.x".

Figure 30:
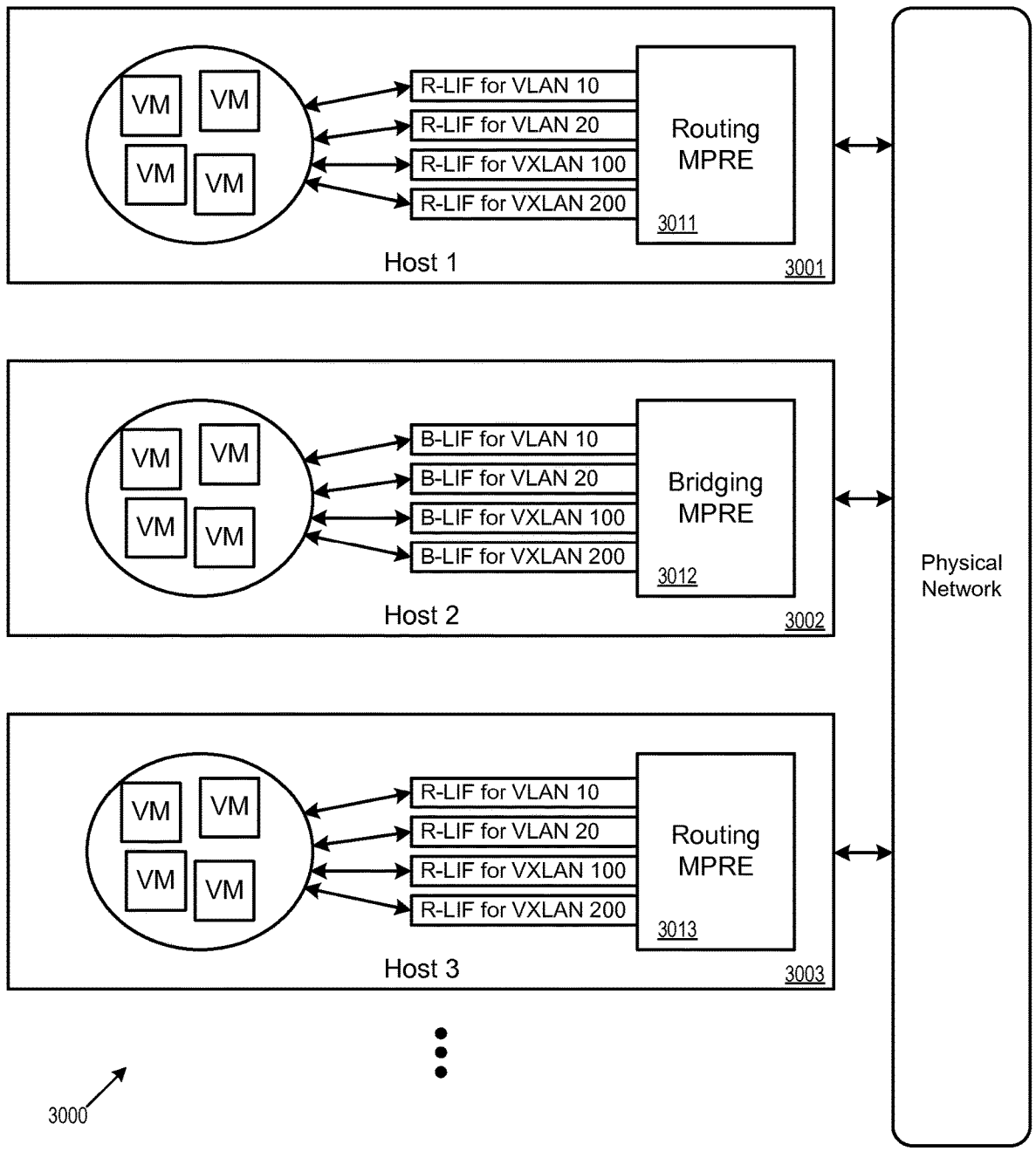
FIG. 30 illustrates a logical network that includes multiple host machines, at least one of which is a host machine having a MPRE that has logical interfaces configured as bridge LIFs.

FIG. 30 illustrates an implementation of a logical network 3000 that includes both bridge LIFs and routing LIFs. As illustrated, the logical network 3000 includes multiple host machines 3001-3009, each host machine operating a distributed instance of an LRE. The LRE has logical interfaces for interfacing with VLAN10, VLAN20, VXLAN100, and VXLAN200. The LRE is operating in the hosts 3001 and 3003 as routing MPREs 3011 and 3013, because the local LRE instances in those host machines only have routing LIFs. In contrast, the LRE is operating in the host 3002 as a bridging MPRE 3012, because all of its logical interfaces are configured as bridge LIFs. Though not illustrated, in some embodiments, a local LRE instance (i.e., an MPRE) operating in a host machine can have both B-LIFs and R-LIFs and hence act as both a bridging MPRE and a routing MPRE. Consequently, the VMs on such a host machine can still send packets to destinations in other IP subnets through its local MPRE.

In some embodiments, a local LRE instance is configured to act as a bridging MPRE (i.e., having only bridge LIFs) in only one host machine. In some embodiments, multiple host machines have their local LRE instances configured as bridging MPREs. In some embodiments, a bridging MPRE having a set of bridge LIFs also has at least one routing LIF for routing data packets to and from the bridge LIFs. In some embodiments, a LRE instance having bridge LIFs also has a sedimented LIF (S-LIF) for routing, which unlike other LIFs, is not distributed, but active only in one host in the logical network. Any packet that is to be routed by an S-LIF will be sent to the host machine with the active S-LIF.

In some embodiments, a bridging MPRE learns the logical interface (or associated network segment identifier) on which they first saw a particular MAC address, and associates that logical interface with that MAC address in a bridging table (or learning table). When the bridge subsequently receives a data frame or packet with a destination MAC address that matches an entry in its bridging table, it sends the frame out on a logical interface indicated by the matching entry in bridging table. In some embodiments, if the bridge has not yet seen the destination MAC address for a packet, it floods the packet out on all active logical interfaces except for the logical interface on which the data packet was received. When sending a packet out onto a particular bridging interface, the bridging MPRE of some embodiments modifies the packet to have the appropriate network segment identifier for the associated network segment (e.g., 8-bit VLAN tag, 24 bit VXLAN ID, MPLS label, etc.). In some embodiments, the content of a bridging table can be transferred from one host to another, such that in event that a host with a bridging MPRE fails, the controllers of the network can quickly anoint an MPRE running in another host machine to serve as a bridging MPRE.

Figure 31:
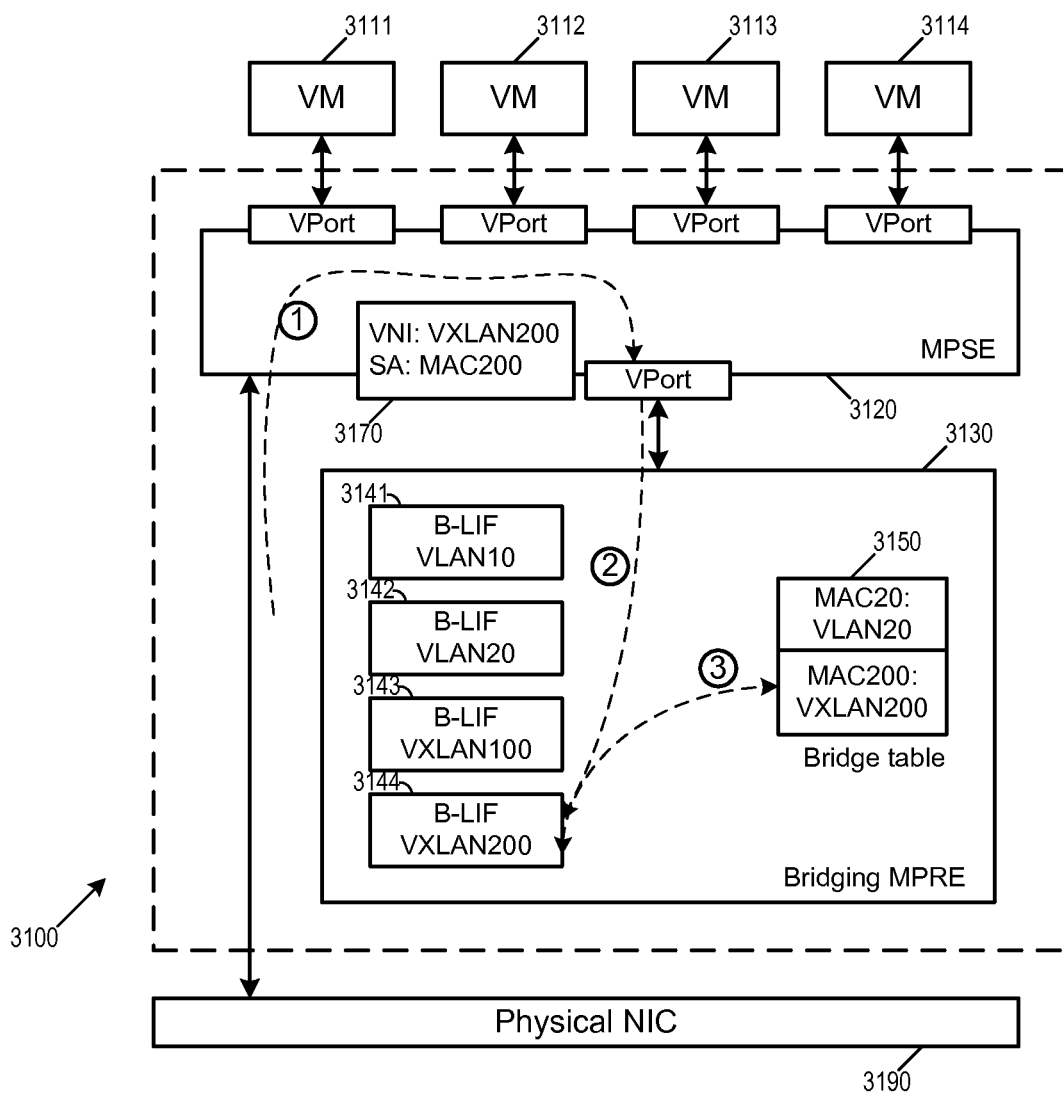
FIG. 31 illustrates the learning of MAC address by a MPRE.

FIG. 31 illustrates the learning of MAC address by a bridging MPRE. As illustrated, a host 3100 has MPSE 3120 having ports interfacing VMs 3111-3114 and a bridging MPRE 3130. The MPSE 3120 has an uplink (not illustrated) connected to a physical NIC 3190 and the physical network. The bridging MPRE 3130 has bridge LIFs 3141-3144 for overlay networks "VLAN10", "VLAN20", "VXLAN100", and "VXLAN200", respectively.

Unlike routing LIFs, which accept only packets that are addressed to the generic VMAC, bridge LIFs will learn any MAC address that it sees over the port with the MPSE. In some embodiments, the MPSE will send to the software bridge any data packet that the switch doesn't know how to forward, such as a data packet having a destination MAC address that cannot be found in the network segment or overlay network of the source MAC address. Such data packets are sent to the bridging MPRE for bridging, and the bridging MPRE would learn the network segment identifier or the logical interface that is associated with the source MAC address.

FIG. 31 illustrates this learning process in three operations '1', '2', and '3'. During operation '1', a packet 3170 having the source address "MAC200" and source VNI (VNI used herein to represent any network segment identifier) of "VXLAN200" is being sent to the VM 3112 from the physical NIC 3190. This packet also has a destination address that is on a different network segment than VXLAN200, and therefore switch 3120 forwards the packet to the bridging MPRE 3130 for bridging.

In operation '2', the bridging MPRE 3130 sees the packet and learns its source MAC address ("MAC200") and its network identifier ("VXLAN200"). In some embodiments, the logical interface 3144 for interfacing the network "VXLAN200" is used to learn the MAC address and the VNI of the packet. In operation '3', the learned MAC address and VNI pairing is stored in an entry of the bridging table 3150. The bridging table 3150 has already learned a pairing of "MAC20" with VNI "VLAN20". While not shown, the bridging MPRE 3130 will also send this packet out the correct bridging LIF with the appropriate network segment identifier for the MAC address. As described in the subsequent three figures, if the bridging tables of the bridging MPRE 3130 know the binding between this destination MAC and one of the bridge LIFs, the bridge LIF will modify the packet to include the correct VNI, then send the packet out over the identified LIF. Otherwise, as described below by reference to FIG. 34, the bridge will flood the LIFs to perform L2 learning.

Figure 32:
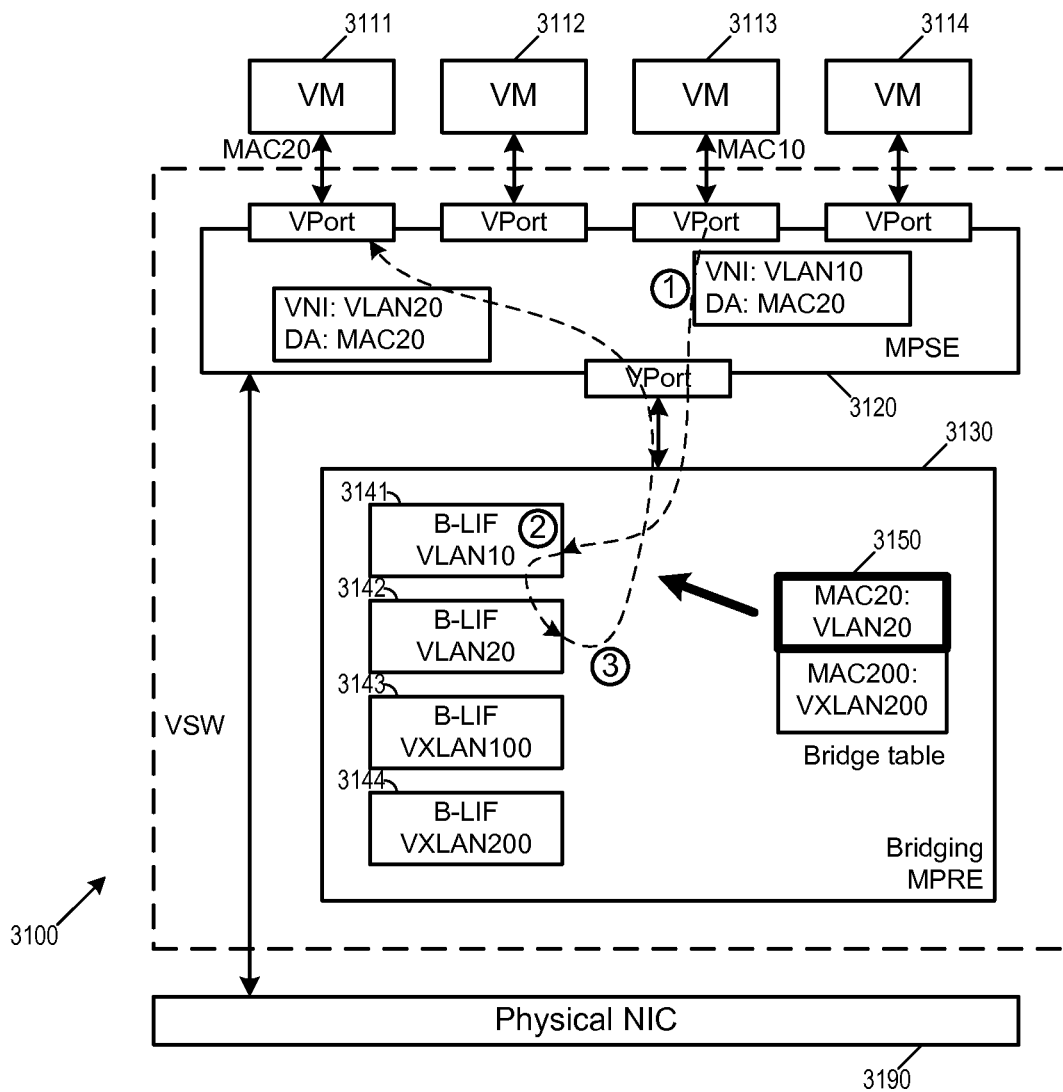
FIG. 32 illustrates the bridging between two VMs on two different overlay networks using a previously learned MAC-VNI pairing by a MPRE.

FIG. 32 illustrates the bridging between two VMs on two different overlay networks using a previously learned MAC-VNI pairing by the host 3100 and the bridging MPRE 3120. The figure illustrates this bridging process in three operations '1', '2', and '3'. During operation '1', the VM 3113 sends a packet from overlay network "VLAN10" with destination address "MAC20", but "MAC20" is not an address that is found in the overlay network "VLAN10" and therefore the packet is sent to the bridge BDR 3130. During operation '2', the bridge LIF 3141 for VLAN10 receives the packet and looks up an entry for the MAC address "MAC20" in the bridging table 3150, which has previously learned that "MAC20" is associated with VNI "VLAN20". Accordingly, during operation '3', the bridge LIF 3142 (which is associated with VNI "VLAN20") sends the data packet out into the VM 3111, which is in VLAN20 and has MAC address "MAC20". In order to perform the bridging between these two LIFs, the bridging MPRE 3130 of some embodiments first strips off the VNI for VLAN10 (i.e., the VLAN tag for this VLAN), and then adds the VNI for VLAN20 (i.e., the VLAN tag for this VLAN). In some embodiments, the bridging MPRE 3130 receives instructions for how to strip off and add VNIs for the different overlay networks as part of the configuration data from a controller cluster.

Figure 33:
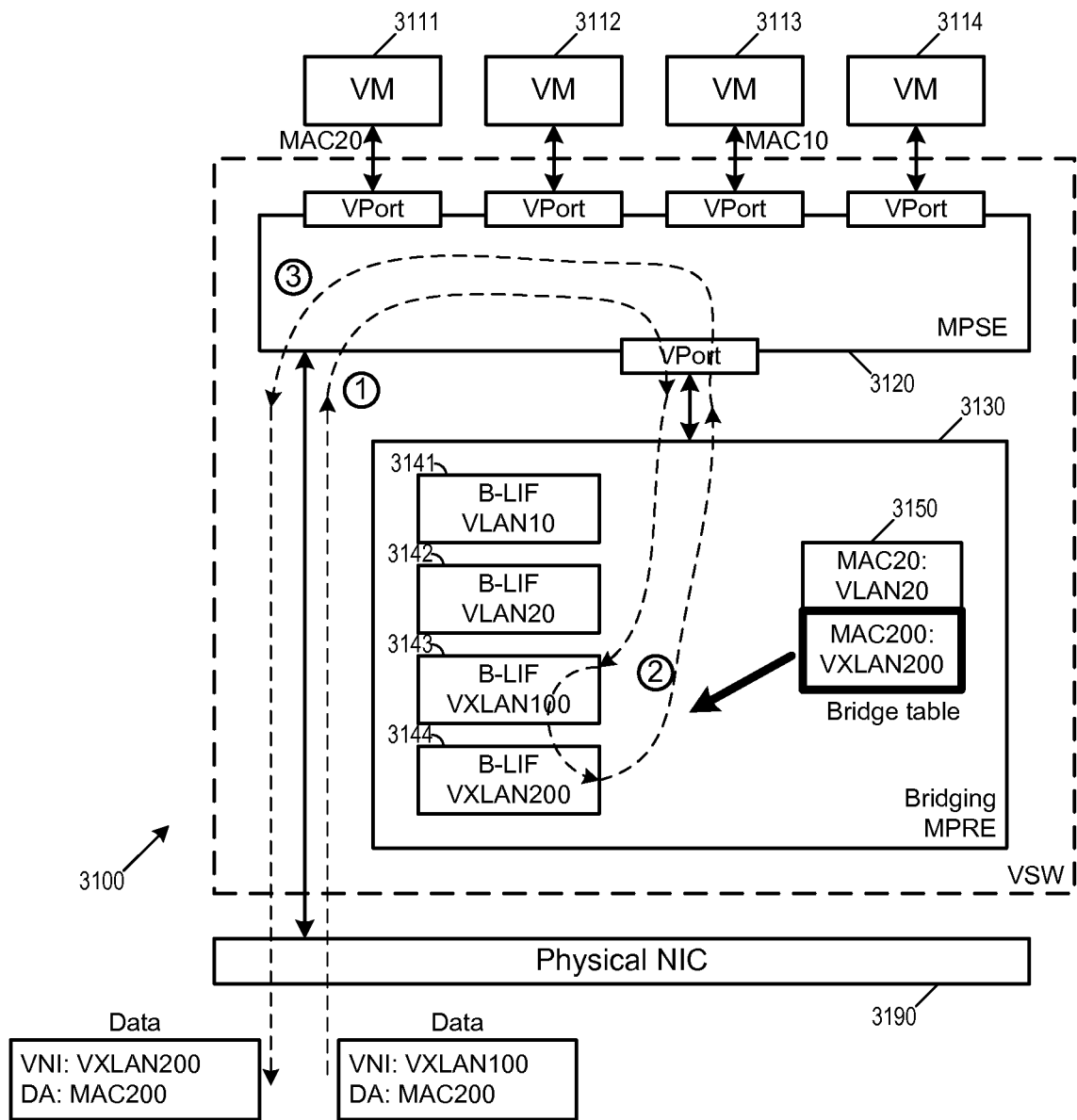
FIG. 33 illustrates the bridging between two VMs that are not operating in the same host as the bridging MPRE.

FIG. 33 illustrates the bridging between two VMs that are not operating in the host 3100, which is operating a bridging MPRE 3130. As mentioned, in some embodiments, not every host machine has its LRE instance configured as a bridge. In some of these embodiments, a bridging MPRE provides bridging functionality between two remote VMs in other host machines, or between a local VM (i.e., one of VMs 3111-3114) and a remote VM in another host machine.

The figure illustrates this bridging process in three operations '1', '2', and '3'. In operation '1', the host 3100 receives a packet from a remote VM through the physical NIC 3190. The packet is from overlay network "VXLAN100" with destination address "MAC200", but "MAC200" is not an address that is found in the overlay network "VXLAN100". During operation '2', the bridge LIF 3143 for VXLAN100 receives the packet and looks up an entry for the MAC address "MAC200" in the bridging table 3150, which has previously learned that "MAC200" is associated with VNI "VXLAN200". During operation '3', the bridge LIF 3144 (which is associated with VNI "VXLAN200") sends the data packet out to the physical network for a remote VM having the MAC address "MAC200" in the overlay network "VXLAN200". In order to perform the bridging between these two LIFs, the bridging MPRE 3130 of some embodiments first strips off the VNI for VXLAN100 (i.e., the 24-bit VXLAN ID), and then adds the VNI for VXLAN200 (i.e., the 24-bit VXLAN ID).

In both of these cases (FIGS. 32 and 33), though not shown, the incoming packet would have a source MAC address. As in FIG. 31, the bridging MPRE 3130 of some embodiments would store the binding of these source addresses with the incoming LIF. That is, the source address of the packet in FIG. 32 would be stored in the bridging table as bound to the VLAN10 LIF, and the source address of the packet in FIG. 33 would be stored in the bridging table as bound to the VXLAN100 LIF.

Figure 34A:
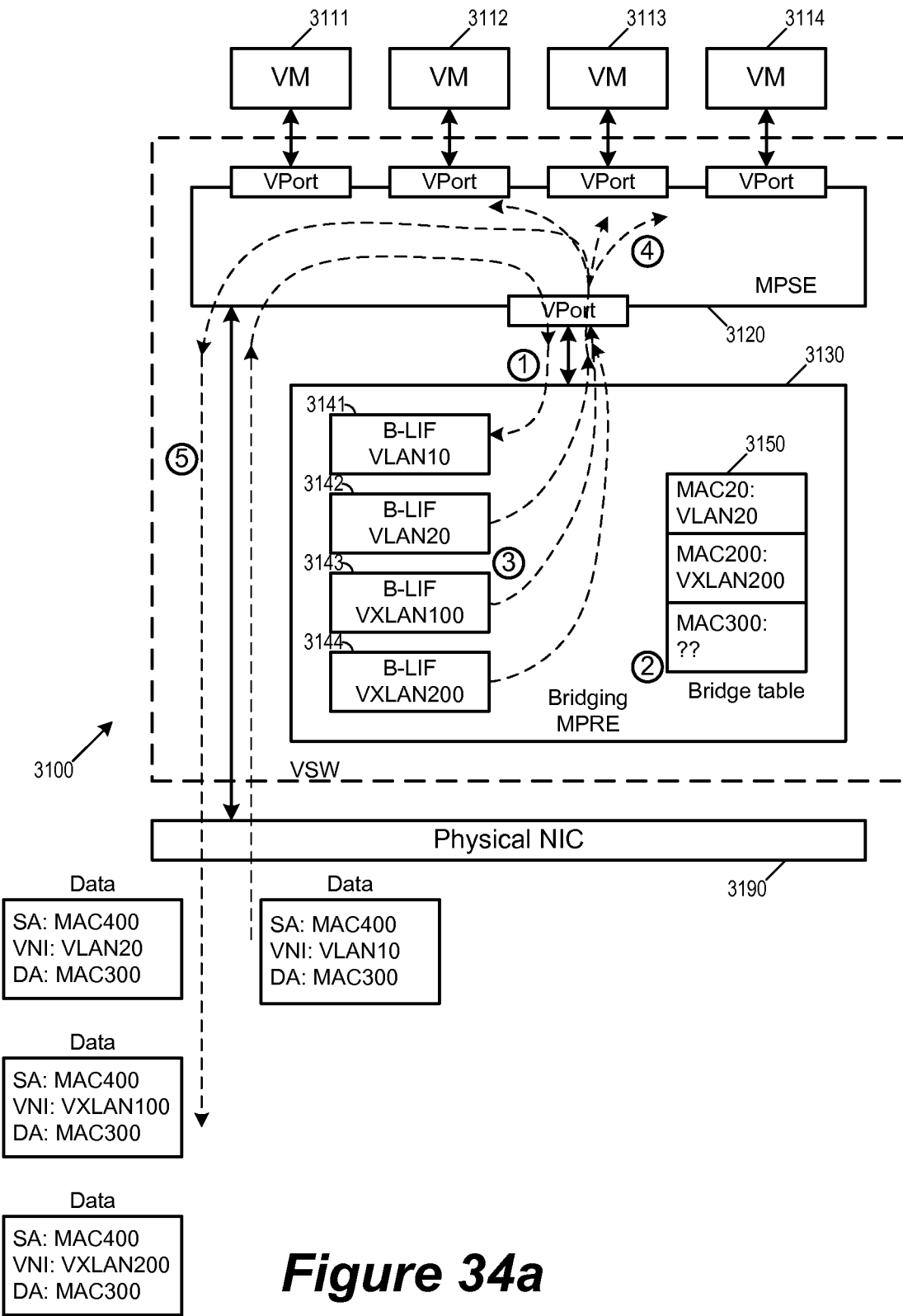
FIG. 34a illustrates a bridging operation in which the destination MAC address has no matching entry in the bridging table and the MPRE must flood the network to look for a pairing.

FIGS. 32 and 33 illustrates examples in which the bridging pair has already been previously learned and can be found in the bridging table. FIG. 34a illustrates a bridging operation in which the destination MAC address has no matching entry in the bridging table and the bridging MPRE 3130 would flood the network to look for a pairing. The figure illustrates this bridging process in five operations '1', '2', '3', '4', and '5'.

In operation '1', the host 3100 receives a packet from a remote VM through the physical NIC 3190. The packet is from overlay network "VLAN10" with destination address "MAC300", but "MAC300" is not an address that is found in the overlay network "VXLAN100" and therefore the packet requires bridging to the correct overlay network. The packet also has a source address of "MAC400", a VM on VLAN10.

During operation '2', the bridge LIF 3141 for VLAN10 receives the packet and look up an entry for the MAC address "MAC300" in the bridging table 3150, but is unable to find a matching pairing (i.e., the bridging MPRE 3130 has not yet learned the VNI to which MAC300 is bound). In addition, though not shown, the binding of "MAC400" to VLAN10 is stored. Therefore, in operation '3', the bridging MPRE 3130 floods all other bridge LIFs (3142-3144) by sending the data packet (still having destination address "MAC300") to all VNIs except VLAN10. The MPSE 3120 is then responsible for standard L2 operations within the overlay networks in order to get the packet to its correct destination.

In operation '4', the flooded data packets with different VNIs reach VMs operating on the host machine 3100, and in operation '5', the flooded data packets with different VNIs are sent out via the physical NIC for other host machines. In some embodiments, the MPSE 3120 floods the packet to all VMs on the correct overlay network. If the MPSE 3120 knows the destination of MAC300, then it can send the packet to this known destination. In addition, though packets for all three overlay networks are shown as being sent onto the physical network, in some embodiments the MPSE would discard the two on which the destination address is not located.

Figure 34B:
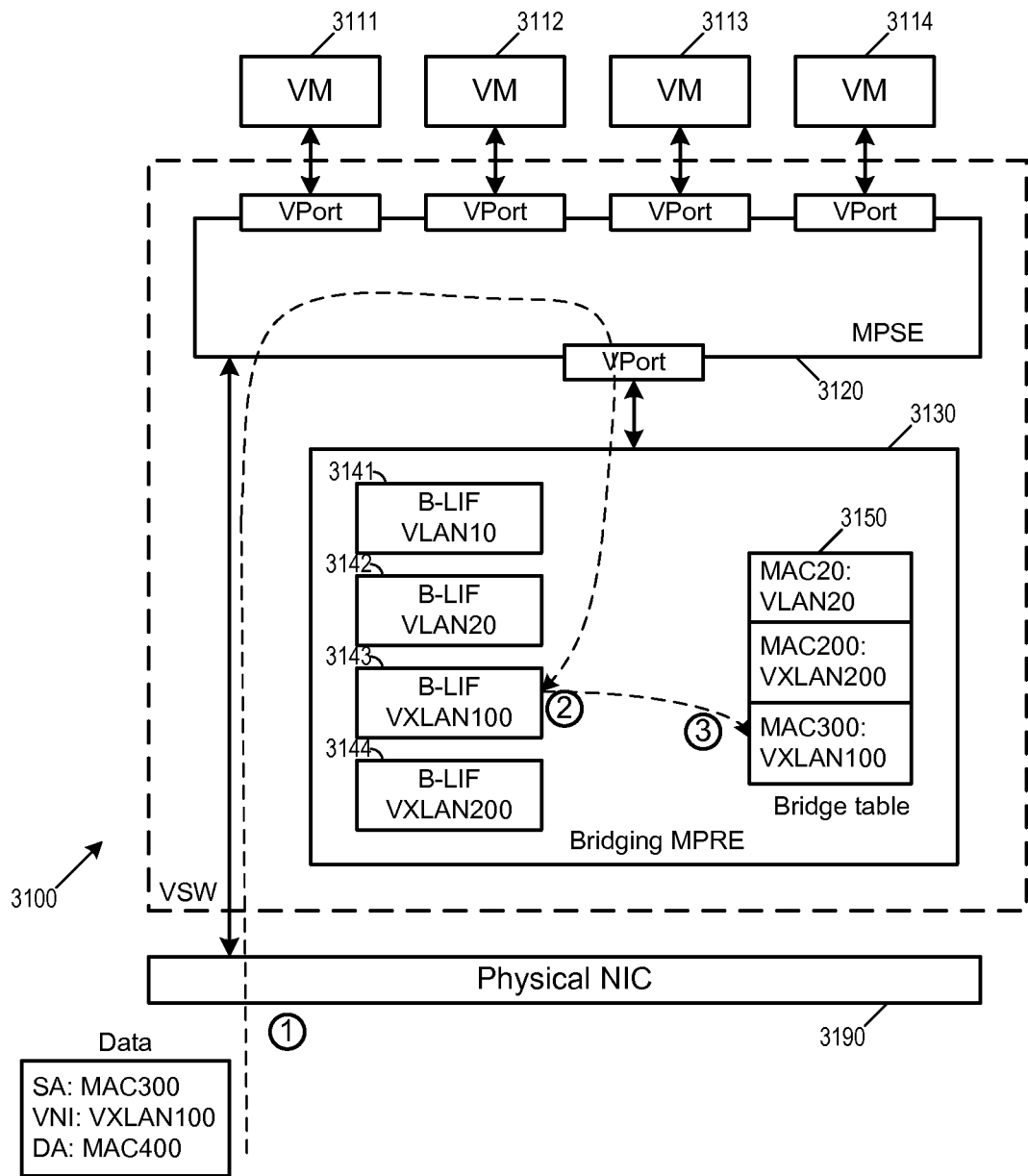
FIG. 34b illustrates the learning of the MAC address pairing from the response to the flooding.

FIG. 34b illustrates the learning of the MAC address pairing from the response to the flooding. The figure illustrates this response and learning process in four operations '1', '2', and '3'. In operation '1', a response from the "MAC300" having VNI for "VXLAN100" arrives at the host machine 3100. In some embodiments, such a response comes from the VM or other machine having the MAC address "MAC300" when the VM sends a packet back to the source of the original packet on VLAN10, "MAC400".

In operation '2', the data packet enters the bridging MPRE 3130 and is received by the bridge LIF 3143 for "VXLAN100". In operation '4', the bridging MPRE 3130 updates the bridge table 3150 with an entry that binds "MAC300" with "VXLAN100", and bridges the packet to VLAN10. From this point on, the bridging MPRE 3130 can bridge data packets destined for "MAC300" without resorting to flooding.

Figure 35:
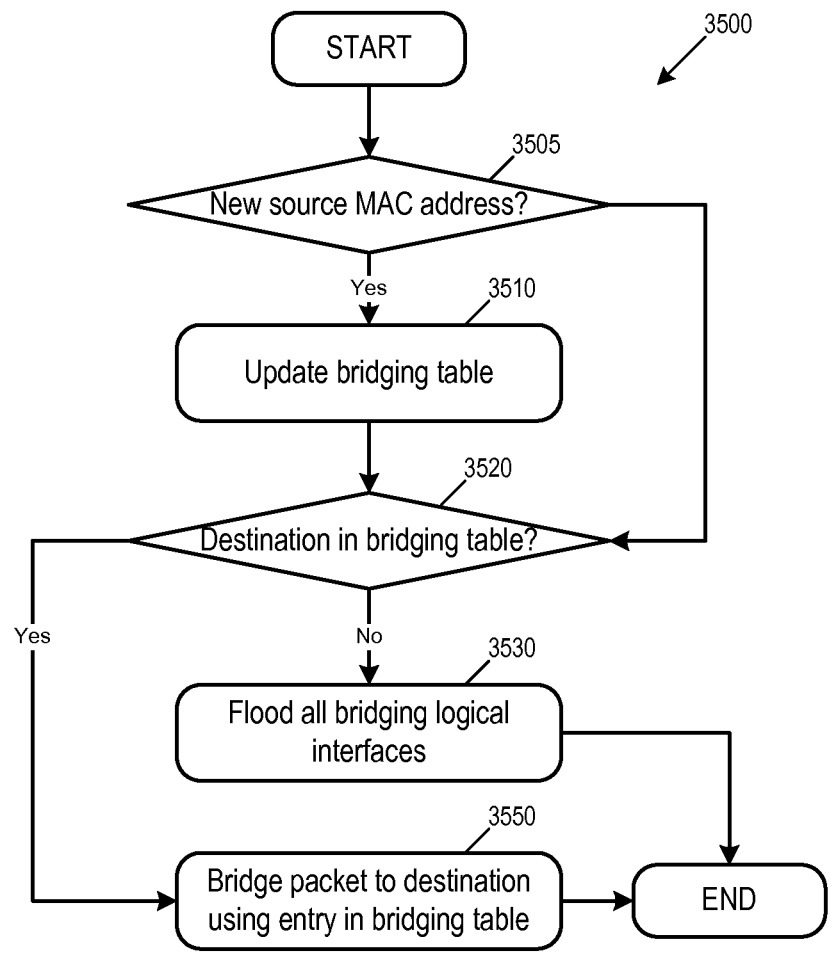
FIG. 35 conceptually illustrates a process for performing bridging at a MPRE.

For some embodiments, FIG. 35 conceptually illustrates a process 3500 for performing bridging at a logical network employing VDR. In some embodiments, the process is performed by an MPRE having bridge LIFs (i.e., a bridging MPRE). The process 3500 starts when the bridging MPRE receives a packet through its port with the MPSE. This packet will have a destination MAC address that does not match its current VNI, and was therefore sent to the bridge. The process determines (at 3505) whether the packet has a source MAC address that the bridging MPRE has never seen before (i.e., whether the source MAC address is stored in its bridging table as bound to a particular interface). If so, the process proceeds to 3510. If the bridging MPRE has seen the source MAC address before, the process proceeds to 3520.

At 3510, the process updates its bridging table with a new entry that pairs the source MAC address with the VNI of the overlay network (or the network segment) from which the bridging MPRE received the data packet (i.e., the VNI with which the packet was tagged upon receipt by the bridging MPRE). Since the source MAC is certain to be in a network segment identified by the VNI, this information is useful for bridging future packets that have the same MAC address as their destination address. This information is stored in the bridge table to provide pairing between this MAC address with its VNI.

The process then determines (at 3520) whether an entry for the destination MAC address can be found in its bridging table. When the bridging MPRE has previously bridged a packet from this MAC address, the address should be stored in its table as a MAC:VNI pairing (unless the bridging MPRE times out).

If the destination address is not in the bridging table, the process floods (at 3530) all bridge LIFs except for the bridge LIF of the overlay network from which the data packet was received. In some embodiments, the process floods all bridge LIFs by sending the same data packet to different overlay networks bearing different VNIs, but with the same destination MAC address. Assuming the packet reaches its destination, the bridging MPRE will likely receive a reply packet from the destination, at which point another instantiation of process 3500 will cause the bridging MPRE to learn the MAC:VNI pairing (at 3505).

When the destination address is in the bridging table, the process bridges (at 3550) the packet to its destination by using the VNI for the destination MAC. This VNI-MAC pairing is found in the bridging table, and in some embodiments the LIF configuration includes instructions on how to perform the bridging (i.e., how to append the VNI to the packet). After bridging the packet to its destination interface (or to all of the LIFs, in the case of flooding), the process 3500 ends.

III. Control and Configuration of VDR

In some embodiments, the LRE instantiations operating locally in host machines as MPREs (either for routing and/or bridging) as described above are configured by configuration data sets that are generated by a cluster of controllers. The controllers in some embodiments in turn generate these configuration data sets based on logical networks that are created and specified by different tenants or users. In some embodiments, a network manager for a network virtualization infrastructure allows users to generate different logical networks that can be implemented over the network virtualization infrastructure, and then pushes the parameters of these logical networks to the controllers so the controllers can generate host machine specific configuration data sets, including configuration data for LREs. In some embodiments, the network manager provides instructions to the host machines for fetching configuration data for LREs from the controllers.

Figure 36:
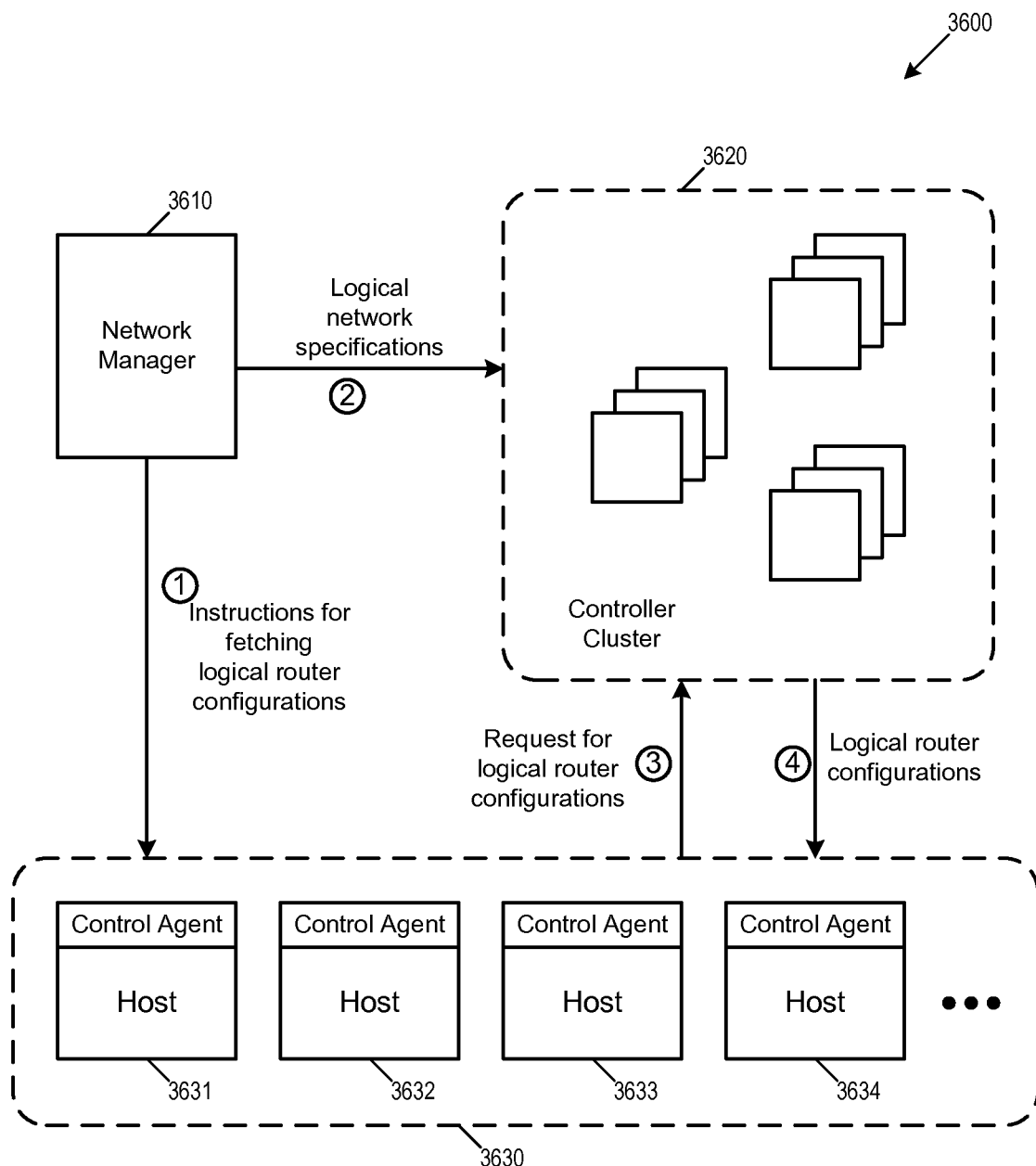
FIG. 36 illustrates a network virtualization infrastructure, in which logical network specifications are converted into configurations for LREs in host machines.

For some embodiments, FIG. 36 illustrates a network virtualization infrastructure 3600, in which logical network specifications are converted into configurations for LREs in host machines (to be MPREs/bridges). As illustrated, the network virtualization infrastructure 3600 includes a network manager 3610, one or more clusters of controllers 3620, and host machines 3630 that are interconnected by a physical network. The host machines 3630 includes host machines 3631-3639, though host machines 3635-3639 are not illustrated in this figure.

The network manager 3610 provides specifications for one or more user created logical networks. In some embodiments, the network manager includes a suite of applications that let users specify their own logical networks that can be virtualized over the network virtualization infrastructure 3600. In some embodiments the network manager provides an application programming interface (API) for users to specify logical networks in a programming environment. The network manager in turn pushes these created logical networks to the clusters of controllers 3620 for implementation at the host machines.

The controller cluster 3620 includes multiple controllers for controlling the operations of the host machines 3630 in the network virtualization infrastructure 3600. The controller creates configuration data sets for the host machines based on the logical networks that are created by the network managers. The controllers also dynamically provide configuration update and routing information to the host machines 3631-3634. In some embodiments, the controllers are organized in order to provide distributed or resilient control plane architecture in order to ensure that each host machines can still receive updates and routes even if a certain control plane node fails. In some embodiments, at least some of the controllers are virtual machines operating in host machines.

The host machines 3630 operate LREs and receive configuration data from the controller cluster 3620 for configuring the LREs as MPREs/bridges. Each of the host machines includes a controller agent for retrieving configuration data from the cluster of controllers 3620. In some embodiments, each host machine updates its MPRE forwarding table according to a VDR control plane. In some embodiments, the VDR control plane communicates by using standard route-exchange protocols such as OSPF (open shortest path first) or BGP (border gateway protocol) to routing peers to advertise/determine the best routes.

FIG. 36 also illustrates operations that take place in the network virtualization infrastructure 3600 in order to configure the LREs in the host machines 3630. In operation '1', the network manager 3610 communicates instructions to the host machines for fetching configuration for the LREs. In some embodiments, this instruction includes the address that points to specific locations in the clusters of controllers 3620. In operation '2', the network manager 3610 sends the logical network specifications to the controllers in the clusters 3620, and the controllers generate configuration data for individual host machines and LREs.

In operation '3', the controller agents operating in the host machines 3630 send requests for LRE configurations from the cluster of controllers 3620, based on the instructions received at operation '2'. That is, the controller agents contact the controllers to which they are pointed by the network manager 3610. In operation '4', the clusters of controllers 3620 provide LRE configurations to the host machines in response to the requests.

Figure 37:
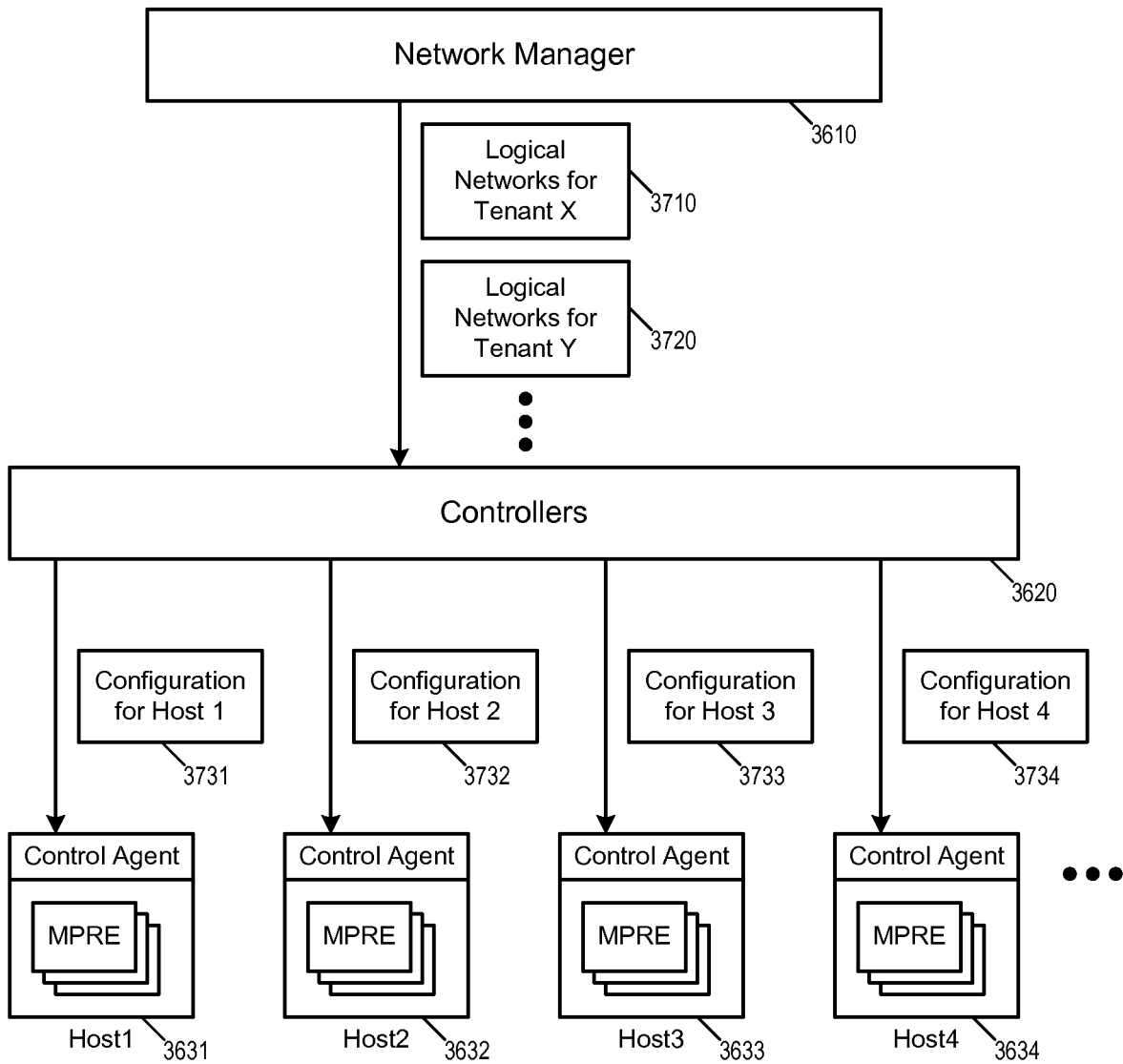
FIG. 37 conceptually illustrates the delivery of configuration data from the network manager to LREs operating in individual host machines.

FIG. 37 conceptually illustrates the delivery of configuration data from the network manager 3610 to LREs operating in individual host machines 3631-3634. As illustrated, the network manager 3610 creates logical networks for different tenants according to user specification. The network manager delivers the descriptions of the created logical networks 3710 and 3720 to the controllers 3620. The controller 3620 in turn processes the logical network descriptions 3710 and 3720 into configuration data sets 3731-3734 for delivery to individual host machines 3631-3634, respectively. In other embodiments, however, the network manager generates these configuration data sets, and the controllers are only responsible for the delivery to the host machines. These configuration data sets are in turn used to configure the LREs of the different logical networks to operate as MPREs in individual host machines.

Figure 38:
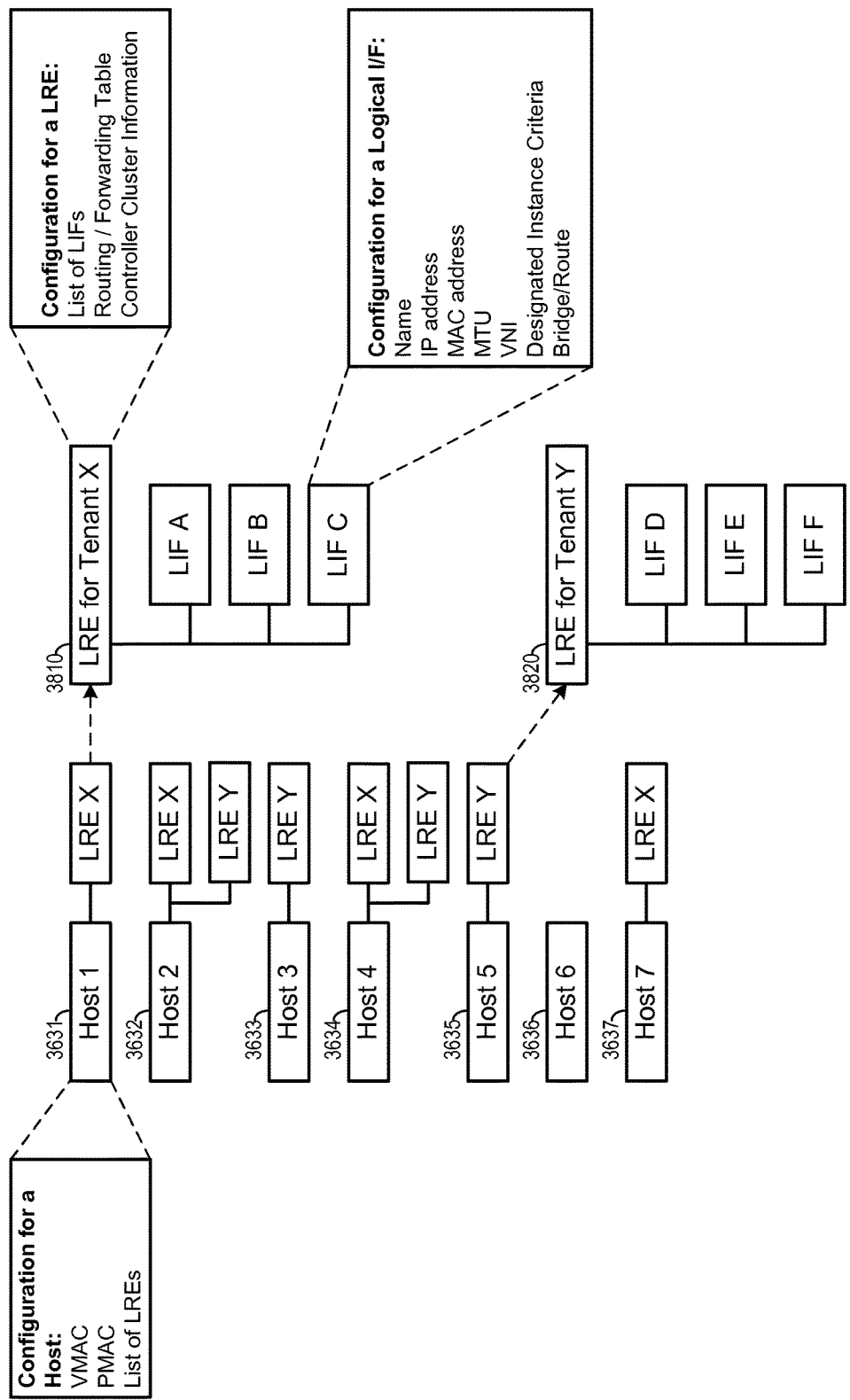
FIG. 38 illustrates the structure of the configuration data sets that are delivered to individual host machines.

FIG. 38 illustrates the structure of the configuration data sets that are delivered to individual host machines. The figure illustrates the configuration data sets 3731-3737 for host machines 3631-3639. The host machines are operating two LREs 3810 and 3820 for two different tenants X and Y. The host machines 3631, 3632, 3634, and 3637 are each configured to operate a MPRE of the LRE 3810 (of tenant X), while the host machines 3632, 3633, 3634, and 3635 are each configured to operate a MPRE of the LRE 3820 (for tenant Y). It is worth noting that different LREs for different logical networks of different tenants can reside in a same host machine, as discussed above by reference to FIG. 7. In the example of FIG. 38, the host machine 3632 is operating MPREs for both the LRE 3810 for tenant X and the LRE 3820 for tenant Y.

The LRE 3810 for tenant X includes LIFs for network segments A, B, and C. The LRE 3820 for tenant Y includes LIFs for network segments D, E, and F. In some embodiments, each logical interface is specific to a logical network, and no logical interface can appear in different LREs for different tenants.

The configuration data for a host in some embodiments includes its VMAC (which is generic for all hosts), its unique PMAC, and a list of LREs running on that host. For example, the configuration data for the host 3633 would show that the host 3633 is operating a MPRE for the LRE 3820, while the configuration data for the host 3634 would show that the host 3634 is operating MPREs for the LRE 3810 and the LRE 3820. In some embodiments, the MPRE for tenant X and the MPRE for tenant Y of a given host machine are both addressable by the same unique PMAC assigned to the host machine.

The configuration data for an LRE in some embodiments includes a list of LIFs, a routing/forwarding table, and controller cluster information. The controller cluster information, in some embodiments, informs the host where to obtain updated control and configuration information. In some embodiments, the configuration data for an LRE is replicated for all of the LRE's instantiations (i.e., MPREs) across the different host machines.

The configuration data for a LIF in some embodiments includes the name of the logical interface (e.g., a UUID), its IP address, its MAC address (i.e., LMAC or VMAC), its MTU (maximum transmission unit), its destination info (e.g., the VNI of the network segment with which it interfaces), whether it is active or inactive on the particular host, and whether it is a bridge LIF or a routing LIF. In some embodiments, the configuration data set for a logical interface also includes external facing parameters that indicate whether a LRE running on a host as its MPRE is a designated instance and needs to perform address resolution for physical (i.e., non-virtual, non-VDR) hosts.

In some embodiments, the LREs are configured or controlled by APIs operating in the network manager. For example, some embodiments provide APIs for creating a LRE, deleting an LRE, adding a LIF, and deleting a LIF. In some embodiments, the controllers not only provide static configuration data for configuring the LREs operating in the host machines (as MPRE/bridges), but also provide static and/or dynamic routing information to the local LRE instantiations running as MPREs. Some embodiments provide APIs for updating LIFs (e.g., to update the MTU/MAC/IP information of a LIF), and add or modify route entry for a given LRE. A routing entry in some embodiments includes information such as destination IP or subnet mask, next hop information, logical interface, metric, route type (neighbor entry or next hop or interface, etc.), route control flags, and actions (such as forward, blackhole, etc.).

Figure 39:
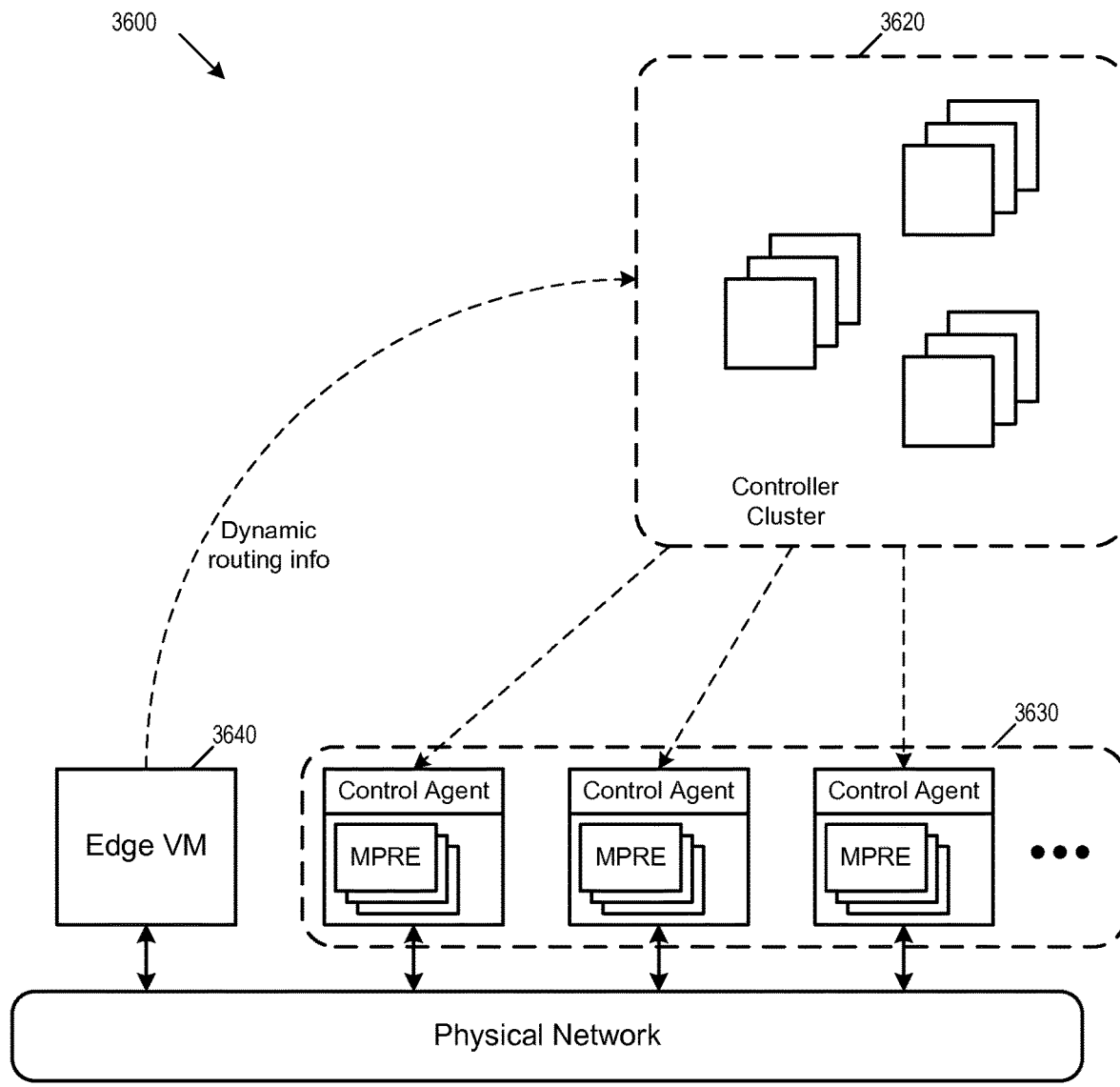
FIG. 39 illustrates the gathering and the delivery of dynamic routing information to MPREs of LREs.

Some embodiments dynamically gather and deliver routing information for the LREs operating as MPREs. FIG. 39 illustrates the gathering and the delivery of dynamic routing information for LREs. As illustrated, the network virtualization infrastructure 3600 not only includes the cluster of controllers 3620 and host machines 3630, it also includes a host machine 3640 that operates a virtual machine ("edge VM") for gathering and distributing dynamic routing information. In some embodiments, the edge VM 3640 executes OSPF or BGP protocols and appears as an external router for another LAN or other network. In some embodiments, the edge VM 3640 learns the network routes from other routers. After validating the learned route in its own network segment, the edge VM 3640 sends the learned routes to the controller clusters 3620. The controller cluster 3620 in turn propagates the learned routes to the MPREs in the host machines 3630.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 40:
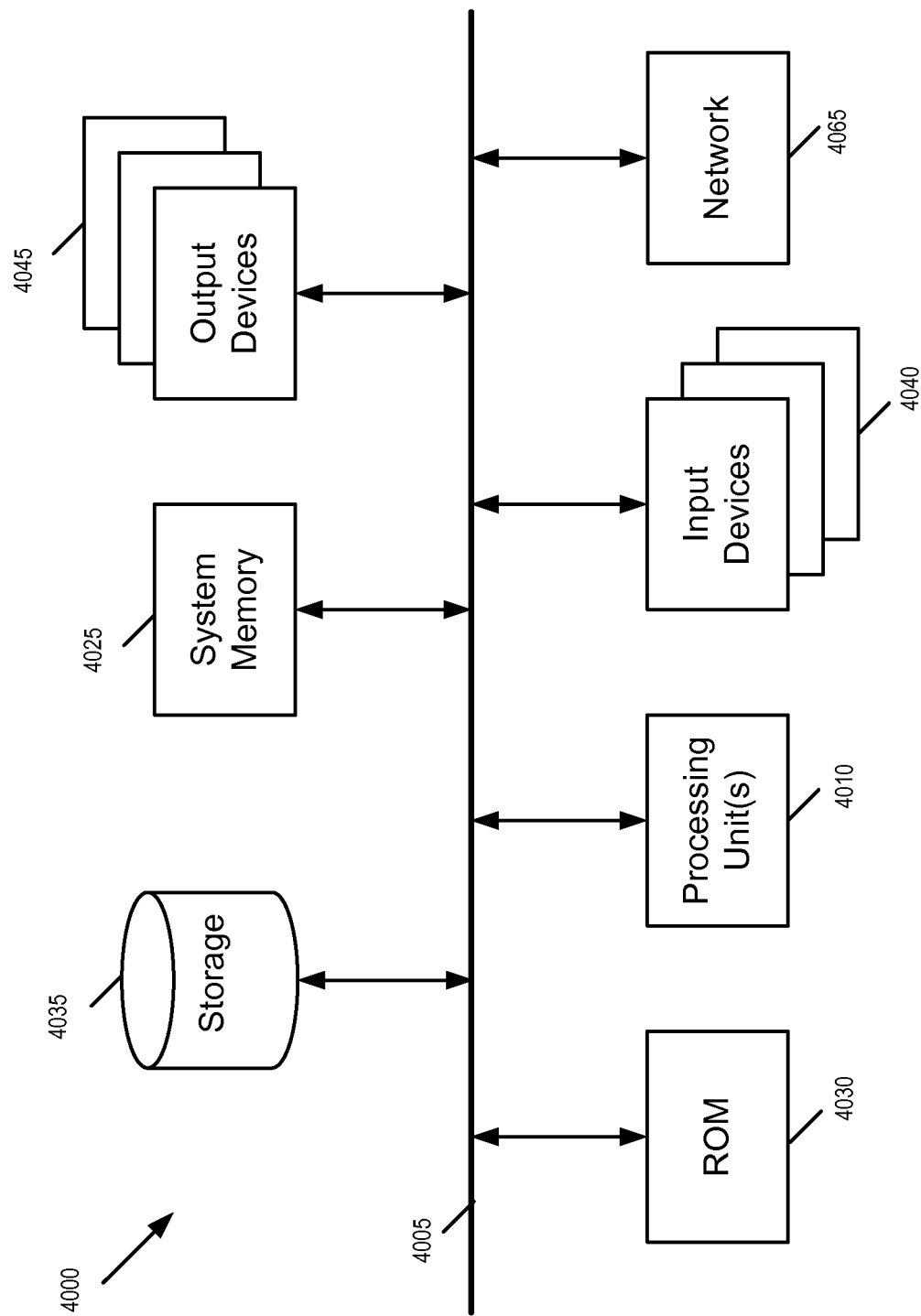
FIG. 40 conceptually illustrates an electronic system with which some embodiments of the invention are implemented.

FIG. 40 conceptually illustrates an electronic system 4000 with which some embodiments of the invention are implemented. The electronic system 4000 can be used to execute any of the control, virtualization, or operating system applications described above. The electronic system 4000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 4000 includes a bus 4005, processing unit(s) 4010, a system memory 4025, a read-only memory 4030, a permanent storage device 4035, input devices 4040, and output devices 4045.

The bus 4005 collectively represents all system, peripheral, and chipset buses that communicatively connect the numerous internal devices of the electronic system 4000. For instance, the bus 4005 communicatively connects the processing unit(s) 4010 with the read-only memory 4030, the system memory 4025, and the permanent storage device 4035.

From these various memory units, the processing unit(s) 4010 retrieves instructions to execute and data to process in order to execute the processes of the invention. The processing unit(s) may be a single processor or a multi-core processor in different embodiments.

The read-only-memory (ROM) 4030 stores static data and instructions that are needed by the processing unit(s) 4010 and other modules of the electronic system. The permanent storage device 4035, on the other hand, is a read-and-write memory device. This device is a non-volatile memory unit that stores instructions and data even when the electronic system 4000 is off. Some embodiments of the invention use a mass-storage device (such as a magnetic or optical disk and its corresponding disk drive) as the permanent storage device 4035.

Other embodiments use a removable storage device (such as a floppy disk, flash drive, etc.) as the permanent storage device. Like the permanent storage device 4035, the system memory 4025 is a read-and-write memory device. However, unlike storage device 4035, the system memory is a volatile read-and-write memory, such a random access memory. The system memory stores some of the instructions and data that the processor needs at runtime. In some embodiments, the invention's processes are stored in the system memory 4025, the permanent storage device 4035, and/or the read-only memory 4030. From these various memory units, the processing unit(s) 4010 retrieves instructions to execute and data to process in order to execute the processes of some embodiments.

The bus 4005 also connects to the input and output devices 4040 and 4045. The input devices enable the user to communicate information and select commands to the electronic system. The input devices 4040 include alphanumeric keyboards and pointing devices (also called "cursor control devices"). The output devices 4045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 40, bus 4005 also couples electronic system 4000 to a network 4065 through a network adapter (not shown). In this manner, the computer can be a part of a network of computers (such as a local area network ("LAN"), a wide area network ("WAN"), or an Intranet, or a network of networks, such as the Internet. Any or all components of electronic system 4000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 11, 14, 15, 22, and 35) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for configuring a plurality of host computers to implement a logical router for a logical network, the method comprising:
   receiving a description of a logical network that comprises a logical router;
   generating configuration data for a plurality of host computers, the configuration data for each host computer of the plurality of host computers comprising (i) instructions to execute a managed physical routing element (MPRE) for implementing the logical router, the MPRE connecting to a port of a managed physical switching element (MPSE) that also executes on the host computer and (ii) a list of logical interfaces (LIFs) of the logical router, each LIF corresponding to a different segment of the logical network; and
   providing the generated configuration data to the plurality of host computers.

2. The method of claim 1, wherein the configuration data for each host computer of the plurality of host computers further comprises (i) a first link layer address that is generic to all of the host computers of the plurality of host computers and (ii) a second link layer address that is unique to the host computer among the plurality of host computers.

3. The method of claim 2, wherein packets transmitted within a host computer between the MPSE executing on the host computer and the MPRE executing on the host computer to implement the logical router use the first link layer address to address the MPRE while packets transmitted between host computers use the second link layer address to address the MPRE.

4. The method of claim 1, wherein:
   the MPRE executing on a particular host computer is a first MPRE, the logical router is a first logical router, and the logical network is a first logical network;
   the configuration data for the particular host computer further comprises (i) instructions to execute a second MPRE for implementing a second logical router of a second logical network and (ii) a list of logical interfaces of the second logical router, each LIF of the second logical router corresponding to a different segment of the second logical network; and
   the second MPRE connects to the same port of the MPSE as the first MPRE.

5. The method of claim 1, wherein the configuration data generated for each host computer of the plurality of host computers further comprises data specifying a network controller address for retrieving updated configuration data.

6. The method of claim 1, wherein the configuration data generated for each host computer of the plurality of host computers further comprises a routing table.

7. The method of claim 1, wherein the configuration data generated for each host computer of the plurality of host computers further comprises a set of addresses for each logical interface of the logical router, wherein different network addresses are associated with each of the logical interfaces.

8. The method of claim 1, wherein providing the generated configuration data to the plurality of host computers comprises providing the configuration data to a local control agent executing at each of the host computers of the plurality of host computers.

9. The method of claim 1 further comprising distributing routes to the plurality of host computers for use by the MPREs implementing the logical router, at least a subset of the routes learned through dynamic routing protocols by an edge machine.

10. The method of claim 1, wherein the different network segments are different layer 2 domains, wherein each logical interface is a default gateway for its corresponding layer 2 domain.

11. A non-transitory machine readable medium storing a program which when executed by at least one processing unit configures a plurality of host computers to implement a logical router for a logical network, the program comprising set of instructions for:
   receiving a description of a logical network that comprises a logical router;
   generating configuration data for a plurality of host computers, the configuration data for each host computer of the plurality of host computers comprising (i) instructions to execute a managed physical routing element (MPRE) for implementing the logical router, the MPRE connecting to a port of a managed physical switching element (MPSE) that also executes on the host computer and (ii) a list of logical interfaces (LIFs) of the logical router, each LIF corresponding to a different segment of the logical network; and providing the generated configuration data to the plurality of host computers.

12. The non-transitory machine readable medium of claim 11, wherein the configuration data for each host computer of the plurality of host computers further comprises (i) a first link layer address that is generic to all of the host computers of the plurality of host computers and (ii) a second link layer address that is unique to the host computer among the plurality of host computers.

13. The non-transitory machine readable medium of claim 12, wherein packets transmitted within a host computer between the MPSE executing on the host computer and the MPRE executing on the host computer to implement the logical router use the first link layer address to address the MPRE while packets transmitted between host computers use the second link layer address to address the MPRE.

14. The non-transitory machine readable medium of claim 11, wherein:

the MPRE executing on a particular host computer is a first MPRE, the logical router is a first logical router, and the logical network is a first logical network;

the configuration data for the particular host computer further comprises (i) instructions to execute a second MPRE for implementing a second logical router of a second logical network and (ii) a list of logical interfaces of the second logical router, each LIF of the second logical router corresponding to a different segment of the second logical network; and the second MPRE connects to the same port of the MPSE as the first MPRE.

15. The non-transitory machine readable medium of claim 11, wherein the configuration data generated for each host computer of the plurality of host computers further comprises data specifying a network controller address for retrieving updated configuration data.

16. The non-transitory machine readable medium of claim 11, wherein the configuration data generated for each host computer of the plurality of host computers further comprises a routing table.

17. The non-transitory machine readable medium of claim 11, wherein the configuration data generated for each host computer of the plurality of host computers further comprises a set of addresses for each logical interface of the logical router, wherein different network addresses are associated with each of the logical interfaces.

18. The non-transitory machine readable medium of claim 11, wherein the set of instructions for providing the generated configuration data to the plurality of host computers comprises a set of instructions for providing the configuration data to a local control agent executing at each of the host computers of the plurality of host computers.

19. The non-transitory machine readable medium of claim 11, wherein the program further comprises a set of instructions for distributing routes to the plurality of host computers for use by the MPREs implementing the logical router, at least a subset of the routes learned through dynamic routing protocols by an edge machine.

20. The non-transitory machine readable medium of claim 11, wherein the different network segments are different layer 2 domains, wherein each logical interface is a default gateway for its corresponding layer 2 domain.

* * * * *